United States Patent
Taniguchi et al.

(10) Patent No.: US 11,643,489 B2
(45) Date of Patent: May 9, 2023

(54) (METH)ACRYLIC COPOLYMER, POLYMER SOLUTION, POLYMER-CONTAINING COMPOSITION, ANTI-FOULING COATING COMPOSITION, AND METHOD FOR PRODUCING (METH)ACRYLIC COPOLYMER

(71) Applicant: Mitsubishi Chemical Corporation, Tokyo (JP)

(72) Inventors: Kana Taniguchi, Tokyo (JP); Sho Katsumata, Tokyo (JP); Junichi Nakamura, Tokyo (JP); Masatoshi Ura, Tokyo (JP); Yoshihiro Kamon, Tokyo (JP); Takafumi Asai, Tokyo (JP)

(73) Assignee: Mitsubishi Chemical Corporation, Tokyo (JP)

( * ) Notice: Subject to any disclaimer, the term of this patent is extended or adjusted under 35 U.S.C. 154(b) by 0 days.

(21) Appl. No.: 17/539,237

(22) Filed: Dec. 1, 2021

(65) Prior Publication Data

US 2022/0144987 A1 May 12, 2022

Related U.S. Application Data

(63) Continuation of application No. 15/922,339, filed on Mar. 15, 2018, now abandoned, which is a
(Continued)

(30) Foreign Application Priority Data

Sep. 25, 2015 (JP) .............................. JP2015-188349
Sep. 29, 2015 (JP) .............................. JP2015-190946

(51) Int. Cl.
*C08F 220/28* (2006.01)
*C09D 5/16* (2006.01)
(Continued)

(52) U.S. Cl.
CPC .......... *C08F 220/281* (2020.02); *C08F 20/18* (2013.01); *C08F 220/382* (2020.02); *C08F 230/085* (2020.02); *C08F 265/06* (2013.01); *C08F 285/00* (2013.01); *C08K 3/22* (2013.01); *C08K 5/315* (2013.01); *C08K 5/3415* (2013.01); *C09D 5/165* (2013.01); *C09D 5/1668* (2013.01);
(Continued)

(58) Field of Classification Search
CPC .......... C09D 5/14; C09D 5/16; C09D 143/04; C08F 290/04; C08F 290/046; C08F 265/06
See application file for complete search history.

(56) References Cited

U.S. PATENT DOCUMENTS

| 4,659,781 A | 4/1987 | Okude et al. |
| 5,053,461 A | 10/1991 | Tone et al. |
| (Continued) | | |

FOREIGN PATENT DOCUMENTS

| CN | 1174860 A | 3/1998 |
| CN | 1442461 A | 9/2003 |
| (Continued) | | |

OTHER PUBLICATIONS

Office Action dated Oct. 26, 2021, in U.S. Appl. No. 16/582,074, filed Sep. 25, 2019.
International Search Report dated Dec. 20, 2016 in PCT/JP2016/078242, filed on Sep. 26, 2016 (with English Translation).
Taiwanese Office Action dated Mar. 16, 2017 in TW 105131022 (with English Translation).
Extended European Search Report dated Jul. 16, 2018 in Patent Application No. 16848710.6.
(Continued)

*Primary Examiner* — Brieann R Johnston
(74) *Attorney, Agent, or Firm* — Oblon, McClelland, Maier & Neustadt, L.L.P.

(57) ABSTRACT

First embodiment of a (meth)acrylic copolymer in the present invention includes following: a (meth)acrylic copolymer having at least one kind of constitutional unit selected from the group consisting of a constitutional unit (A1) having at least one kind of structure (I) selected from the group consisting of structures represented by the following formula (1), formula (2), or formula (3) and a constitutional unit (A2) having a triorganosilyloxycarbonyl group and a constitutional unit (B) derived from a macromonomer (b):

[Chem.1]

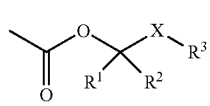

(1)

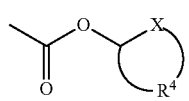

(2)

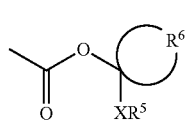

(3)

(where, X represents —O—, —S—, or —NR$^{14}$—, R$^{14}$ represents a hydrogen atom or an alkyl group, R$^1$ and R$^2$ each represent a hydrogen atom or an alkyl group having from 1 to 10 carbon atoms, R$^3$ and R$^5$ each represent an alkyl group having from 1 to 20 carbon atoms, a cycloalkyl group, or an aryl group, and R$^4$ and R$^6$ each represent an alkylene group having from 1 to 10 carbon atoms).

7 Claims, No Drawings

Related U.S. Application Data continuation of application No. PCT/JP2016/078242, filed on Sep. 26, 2016.

(51) Int. Cl.

| | |
|---|---|
| C08F 265/06 | (2006.01) |
| C09D 151/00 | (2006.01) |
| C09D 143/04 | (2006.01) |
| C08F 285/00 | (2006.01) |
| C08F 220/38 | (2006.01) |
| C08F 230/08 | (2006.01) |
| C08F 20/18 | (2006.01) |
| C08K 3/22 | (2006.01) |
| C08K 5/315 | (2006.01) |
| C08K 5/3415 | (2006.01) |
| C09D 133/08 | (2006.01) |
| C09D 133/10 | (2006.01) |
| C08F 222/20 | (2006.01) |

(52) U.S. Cl.
CPC ......... *C09D 5/1681* (2013.01); *C09D 133/08* (2013.01); *C09D 133/10* (2013.01); *C09D 143/04* (2013.01); *C09D 151/003* (2013.01); C08F 220/282 (2020.02); C08F 220/283 (2020.02); C08F 222/205 (2020.02); C08F 2500/02 (2013.01); C08K 2003/2248 (2013.01)

(56) References Cited

U.S. PATENT DOCUMENTS

| | | | |
|---|---|---|---|
| 5,436,284 | A | 7/1995 | Honda et al. |
| 5,548,081 | A | 8/1996 | Maekawa |
| 5,936,026 | A | 8/1999 | Huybrechts et al. |
| 6,110,990 | A | 8/2000 | Nakamura et al. |
| 6,172,132 | B1 | 1/2001 | Nakamura et al. |
| 6,201,040 | B1 | 3/2001 | Kitajima et al. |
| 6,458,878 | B1 | 10/2002 | Tsuboi et al. |
| 2003/0207962 | A1 | 11/2003 | Oya et al. |
| 2006/0258772 | A1 | 11/2006 | Sugihara et al. |
| 2011/0123478 | A1 | 5/2011 | Dahling |
| 2012/0202076 | A1 | 8/2012 | Ehara et al. |
| 2012/0294825 | A1 | 11/2012 | Ehara et al. |
| 2013/0058889 | A1 | 3/2013 | Iwamoto et al. |
| 2013/0136818 | A1 | 5/2013 | Uehara et al. |
| 2015/0118454 | A1 | 4/2015 | Kwon et al. |
| 2016/0282516 | A1 | 9/2016 | Imafuku |
| 2018/0051179 | A1 | 2/2018 | Katsumata et al. |
| 2019/0352514 | A1 | 11/2019 | Katsumata et al. |

FOREIGN PATENT DOCUMENTS

| | | |
|---|---|---|
| CN | 102083925 A | 6/2011 |
| CN | 102821872 | 12/2012 |
| CN | 104053690 A | 9/2014 |
| CN | 104334659 A | 2/2015 |
| CN | 108137751 A | 6/2018 |
| EP | 0 821 034 A2 | 1/1998 |
| EP | 3 075 753 | 10/2016 |
| EP | 3 354 667 A1 | 8/2018 |
| JP | 1-103671 | 4/1989 |
| JP | 2-67303 | 3/1990 |
| JP | 4-103671 | 4/1992 |
| JP | 07-102193 A | 4/1995 |
| JP | 08-269388 A | 10/1996 |
| JP | 08-269389 A | 10/1996 |
| JP | 10-95816 | 4/1998 |
| JP | 11-116857 A | 4/1999 |
| JP | 2000-63708 | 2/2000 |
| JP | 2000-248029 A | 9/2000 |
| JP | 2001-323208 | 11/2001 |
| JP | 2002-12630 | 1/2002 |
| JP | 2003-277680 | 10/2003 |
| JP | 2004-300410 A | 10/2004 |
| JP | 2005-146217 A | 6/2005 |
| JP | 2006-77095 | 3/2006 |
| JP | 2011-26357 A | 2/2011 |
| JP | 2011-523969 A | 8/2011 |
| JP | 2012-5934 | 1/2012 |
| JP | 2014-31418 | 2/2014 |
| JP | 5506672 | 5/2014 |
| JP | 6-056751 | 1/2017 |
| JP | 6056751 B2 | 1/2017 |
| JP | 2018-062555 A | 4/2018 |
| KR | 10-2012-0096112 A | 8/2012 |
| TW | 201341410 | 10/2013 |
| TW | 201502172 | 1/2015 |
| TW | 201700648 | 1/2017 |
| WO | WO 2011/046087 A1 | 4/2011 |
| WO | WO 2011/162129 A1 | 12/2011 |
| WO | WO 2012/018043 A1 | 2/2012 |
| WO | WO 2013/073580 | 5/2013 |
| WO | WO 2013/108880 | 7/2013 |
| WO | WO 2013/108880 A1 | 7/2013 |
| WO | WO 2016/167360 A1 | 10/2016 |
| WO | WO 2017/051922 A1 | 3/2017 |
| WO | WO 2017/065172 A1 | 4/2017 |

OTHER PUBLICATIONS

Office Action dated Jan. 28, 2019 in the corresponding Korean Application No. 10-2018-7007735 (with unedited computer generated English Translation).
European Office Action dated Apr. 4, 2019 in Patent Application No. 16 848 710.6, 7 pages.
Office Action dated Apr. 23, 2019 in corresponding Japanese Patent Application No. 2018-128599 (with English Translation), 9 pages.
Office Action dated Apr. 23, 2019 in corresponding Japanese Patent Application No. 2018-128600 (with English Translation), 9 pages.
Extended European Search Report dated Oct. 31, 2019 in Patent Application No. 19191208.8, 8 pages.
Combined Chinese Office Action and Search Report dated Nov. 11, 2019 in Patent Application No. 201680055192.3 (with unedited computer generated English translation), 34 pages.
Japanese Office Action dated Dec. 3, 2019 in Patent Application No. 2018-128599 (with English translation), 6 pages.
Japanese Office Action dated Dec. 3, 2019 in Patent Application No. 2018-128600 (with English translation), 6 pages.
European Office Action dated Mar. 6, 2020 in Patent Application No. 16 848 710.6.
Office Action dated Feb. 9, 2021, in Japan Patent Application No. 2020-036268, (with English-language Translation).
Office Action dated Jan. 8, 2021, in Chinese Patent Application No. 2016800551923 (with English-language Translation).
Office Action dated Feb. 9, 2021, in Japan Patent Application No. 2020-036071, (with English-language Translation).
International Search Report dated Jul. 3, 2018 in PCT/JP2018/012652 filed Mar. 28, 2018 (with English Translation).
Office Action dated Aug. 6, 2020, in U.S. Appl. No. 16/582,074.
Office Action dated Aug. 13, 2020, in U.S. Appl. No. 16/582,074.
Extended European Search Report dated Mar. 2, 2020 in European Patent Application No. 18776410.5.
Office Action dated Jul. 22, 2020 in corresponding Korean Patent Application No. 10-2019-7027421 (with English Translation).
Notice of Allowance dated Feb. 11, 2021, in U.S. Appl. No. 16/582,074.
European Search Report dated Jul. 27, 2021, in European Application No. 21 15 7324.
Office Action dated Sep. 7, 2021, in Japanese Patent Application No. 2020-036071 (with English-language Translation).
Office Action dated Sep. 7, 2021, in Japanese Patent Application No. 2020-036268 (with English-language Translation).
Office Action dated Aug. 18, 2021, in Chinese Patent Application No. 201880021086.2 (with Machine English-language Translation).
Office Action dated Aug. 24, 2021, in Japanese Patent Application No. 2019-509947 (with Machine English-language Translation).
Office Action dated Aug. 27, 2021, in Chinese Patent Application No. 201680055192.3 (with Machine English-language Translation).

(56) References Cited

OTHER PUBLICATIONS

Office Action dated Aug. 17, 2021, in Taiwan Patent Application No. 107110594 (with English-language Translation).

(METH)ACRYLIC COPOLYMER, POLYMER SOLUTION, POLYMER-CONTAINING COMPOSITION, ANTI-FOULING COATING COMPOSITION, AND METHOD FOR PRODUCING (METH)ACRYLIC COPOLYMER

CROSS REFERENCE TO RELATED APPLICATIONS

This application is a continuation application of prior U.S. application Ser. No. 15/922,339, filed Mar. 15, 2018, the disclosure of which is incorporated herein by reference in its entirety. U.S. application Ser. No. 15/922,339 is a continuation of PCT/JP2016/078242, filed Sep. 26, 2016, the disclosure of which is incorporated herein by reference in its entirety. U.S. application Ser. No. 15/922,339 claims the benefit of priority of the prior Japanese Patent Application No. 2015-188349 filed in Japan on Sep. 25, 2015 and the prior Japanese Patent Application No. 2015-190946 filed in Japan on Sep. 29, 2015, the entire contents of which are incorporated herein by reference.

TECHNICAL FIELD

The present invention relates to a (meth)acrylic copolymer, a polymer solution, a polymer-containing composition, an anti-fouling coating composition, and a method for producing a (meth)acrylic copolymer.

BACKGROUND ART

It has been known to paint marine structures and ships with anti-fouling coatings for the purpose of preventing corrosion of the parts in contact with the sea water and adhesion of marine organisms which cause a decrease in the sailing speed.

Self-polishing anti-fouling coatings are known as anti-fouling coatings. The self-polishing anti-fouling coatings typically contain a hydrolyzable resin and an anti-fouling agent. The coating film obtained from this anti-fouling coating exerts an anti-fouling effect over a long period of time as the surface of the coating film gradually dissolves in the sea water (self-polished) and the anti-fouling component is always exposed on the surface of the coating film.

As self-polishing anti-fouling coatings, for example, those using a resin composition containing a metal-containing polymer as to be described below have been proposed. Such a resin composition is blended with an anti-fouling agent and the like to be prepared into an anti-fouling coating. The metal-containing polymer contained in these resin compositions exhibits hydrolyzability, and the coating film containing this thus exhibits self-polishing properties.

(1) A resin composition obtained by copolymerizing a metal-containing monomer mixture composed of a reaction product of an inorganic metal compound with a carboxyl group-containing radically polymerizable monomer, an organic solvent containing at least an alcohol-based solvent, and a specific amount of water and another radically polymerizable unsaturated monomer (Patent Literature 1).

(2) A resin composition in which a vinyl-based polymer obtained by polymerizing a carboxyl group-containing ethylenically unsaturated monomer, a divalent metal-containing ethylenically unsaturated monomer, and a macromonomer having a radically polymerizable group according to a specific procedure is dispersed in a dispersion medium containing water (Patent Literature 2).

As self-polishing anti-fouling coatings, for example, those using a composition for anti-fouling coating which contains a vinyl polymer having a hemiacetal ester group and/or a hemiketal ester group in a side chain and an organic solvent have been proposed (Patent Literature 3). Such a composition for anti-fouling coating is blended with an anti-fouling agent and the like to be prepared into an anti-fouling coating. The vinyl polymer exhibits hydrolyzability, and the coating film containing this thus exhibits self-polishing properties.

In recent years, it has become important to decrease volatile organic compounds (hereinafter also referred to as "VOC") because of the influence thereof on the environment and the like, and it has been thus investigated to decrease VOC in the anti-fouling coatings as well.

As a composition for anti-fouling coating having a decreased content of an organic solvent, the resin composition of Patent Literature 2 has been proposed.

CITATION LIST

Patent Literature

Patent Literature 1: JP 2002-012630 A
Patent Literature 2: WO 2013/108880 A
Patent Literature 3: JP 4-103671 A

SUMMARY OF THE INVENTION

Problem to be Solved by the Invention

A coating film formed of an anti-fouling coating using the resin composition of Patent Literature 1 tends to exhibit insufficient hardness and water resistance. Hence, a long term anti-fouling effect of the coating film is not necessarily sufficient.

Furthermore, there is also a problem that it is difficult to increase the solid content of this resin composition since the viscosity of the resin composition increases and it is difficult to prepare and paint the anti-fouling coating when it is attempted to increase the solid content of the resin composition by decreasing the content of the organic solvent A coating film formed of the resin composition of Patent Literature 2 exhibits insufficient water resistance. In addition, there is a tendency that the coating film has a slow rate of dissolution (degree of consumption is low). Hence, a long term anti-fouling effect of the coating film is not necessarily sufficient.

A coating film formed of the anti-fouling coating using the composition for anti-fouling coating of Patent Literature 3 tends to be insufficient in either or both of hardness or water resistance. In particular, the hardness of the coating film tends to be insufficient when the viscosity of the anti-fouling coating composition is decreased. As the hardness of the coating film is low, marks due to contact with the frame are left when the coating film is temporarily placed after painting, and the marks are likely to be defects of the coating film.

Furthermore, this composition for anti-fouling coating contains a large amount of organic solvent, and the anti-fouling coating using this composition for anti-fouling coating has a high VOC content. The VOC decreases when the content of the organic solvent is decreased, but the viscosity increases as the solid content increases, and it is difficult to prepare and paint an anti-fouling coating.

An object of the present invention is to provide an anti-fouling coating composition capable of forming a coating film exhibiting excellent water resistance and hardness, a (meth)acrylic copolymer, a polymer solution, and a polymer-containing composition which are suitable for obtaining the anti-fouling coating composition, and a method for producing the (meth)acrylic copolymer.

Means for Solving Problem

The present invention has the following aspects.

[1] A (meth)acrylic copolymer having at least one kind of constitutional unit selected from the group consisting of a constitutional unit (A1) having at least one kind of structure (I) selected from the group consisting of structures represented by the following formula (1), formula (2), or formula (3) and a constitutional unit (A2) having a triorganosilyloxycarbonyl group and a constitutional unit (B) derived from a macromonomer (b):

[Chem.1]

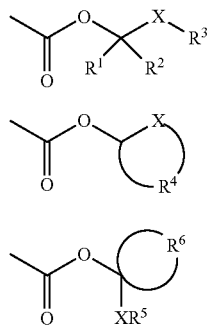

(where, X represents —O—, —S—, or —$NR^{14}$—, $R^{14}$ represents a hydrogen atom or an alkyl group, $R^1$ and $R^2$ each represent a hydrogen atom or an alkyl group having from 1 to 10 carbon atoms, $R^3$ and R each represent an alkyl group having from 1 to 20 carbon atoms, a cycloalkyl group, or an aryl group, and $R^1$ and $R^6$ each represent an alkylene group having from 1 to 10 carbon atoms).

[2] A polymer solution which contains a (meth)acrylic copolymer having a constitutional unit (A3) having at least one kind of structure (III) selected from the group consisting of structures represented by the following formula (4) or (5) and a constitutional unit (B) derived from a macromonomer (b); and
an organic solvent and
has a viscosity of $5 \times 10^4$ mPa·s or less at 25° C.:

—COO-M-OCO (4)

—COO-M-$R^{32}$ (5)

(where, M represents Zn, Cu, Mg, or Ca and $R^{32}$ represents an organic acid residue other than a (meth)acryloyloxy group).

[3] A polymer-containing composition containing the polymer solution according to [2], in which a content of an organic solvent is 30% by mass or more with respect to a total amount of the polymer-containing composition excluding the (meth)acrylic copolymer.

[4] The polymer-containing composition according to [3], in which a water content is 15% by mass or less.

[5] The (meth)acrylic copolymer according to [1], in which the macromonomer (b) is a macromonomer having two or more constitutional units represented by the following formula (b') and a number average molecular weight of from 500 to 50000:

[Chem. 2]

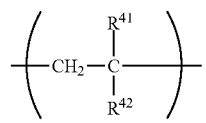

(where, $R^{41}$ represents a hydrogen atom, a methyl group, or $CH_2OH$ and $R^{42}$ represents $OR^{43}$, a halogen atom, $COR^{44}$, $COOR^{45}$, CN, $CONR^{46}R^{47}$, or $R^{48}$, where $R^{43}$ to $R^{47}$ each independently represent a hydrogen atom, an unsubstituted or substituted alkyl group, an unsubstituted or substituted alicyclic group, an unsubstituted or substituted aryl group, an unsubstituted or substituted heteroaryl group, an unsubstituted or substituted nonaromatic heterocyclic group, an unsubstituted or substituted aralkyl group, an unsubstituted or substituted alkaryl group, or an unsubstituted or substituted organosilyl group and $R^{48}$ represents an unsubstituted or substituted aryl group or an unsubstituted or substituted heteroaryl group).

[6] The polymer solution according to [2], in which the macromonomer (b) is a macromonomer having two or more constitutional units represented by the following formula (b') and a number average molecular weight of from 500 to 50000:

[Chem. 3]

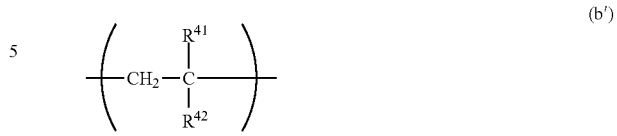

(where, $R^{41}$ represents a hydrogen atom, a methyl group, or $CH_2OH$ and $R^{42}$ represents $OR^{43}$, a halogen atom, $COR^{44}$, $COOR^{45}$, CN, $CONR^{46}R^{47}$, or $R^{48}$, where $R^{43}$ to $R^{47}$ each independently represent a hydrogen atom, an unsubstituted or substituted alkyl group, an unsubstituted or substituted alicyclic group, an unsubstituted or substituted aryl group, an unsubstituted or substituted heteroaryl group, an unsubstituted or substituted nonaromatic heterocyclic group, an unsubstituted or substituted aralkyl group, an unsubstituted or substituted alkaryl group, or an unsubstituted or substituted organosilyl group and $R^{48}$ represents an unsubstituted or substituted aryl group or an unsubstituted or substituted heteroaryl group).

[7] The polymer-containing composition according to [3] or [4], in which the macromonomer (b) is a macromonomer having two or more constitutional units represented by the following formula (b') and a number average molecular weight of from 500 to 50000:

[Chem. 4]

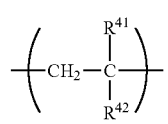

(where, $R^{41}$ represents a hydrogen atom, a methyl group, or $CH_2OH$ and $R^{42}$ represents $OR^{43}$, a halogen atom, COR$^{44}$, COOR$^{45}$, CN, CONR$^{46}$R$^{47}$, or R$^{48}$, where R$^{43}$ to R$^{47}$ each independently represent a hydrogen atom, an unsubstituted or substituted alkyl group, an unsubstituted or substituted alicyclic group, an unsubstituted or substituted aryl group, an unsubstituted or substituted heteroaryl group, an unsubstituted or substituted nonaromatic heterocyclic group, an unsubstituted or substituted aralkyl group, an unsubstituted or substituted alkaryl group, or an unsubstituted or substituted organosilyl group and R$^{48}$ represents an unsubstituted or substituted aryl group or an unsubstituted or substituted heteroaryl group).

[8] A polymer-containing composition containing the (meth)acrylic copolymer according to [1].

[9] The polymer-containing composition according to [8], further containing at least one kind of alkenyl compound selected from the group consisting of a compound represented by the following formula (11), a compound represented by the following formula (12), and a compound represented by the following formula (13), in which the (meth)acrylic copolymer has the constitutional unit (A1):

[Chem. 5]

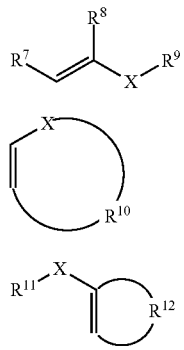

(11)

(12)

(13)

(where, X represents —O—, —S—, or —NR$^{14}$—, R$^{14}$ represents a hydrogen atom or an alkyl group, R$^{7}$ represents a hydrogen atom or an alkyl group having from 1 to 9 carbon atoms, R$^{8}$ represents a hydrogen atom or an alkyl group having from 1 to 10 carbon atoms, R$^{9}$ and R$^{11}$ each represent an alkyl group having from 1 to 20 carbon atoms, a cycloalkyl group, or an aryl group, R$^{10}$ represents a single bond or an alkylene group having from 1 to 9 carbon atoms, and R$^{12}$ represents an alkylene group having from 1 to 9 carbon atoms).

[10] An anti-fouling coating composition containing the polymer-containing composition according to any one of [3], [4], or [7] to [9].

[11] The anti-fouling coating composition according to [10], further containing an anti-fouling agent.

[12] The anti-fouling coating composition according to [11], in which the anti-fouling agent contains at least one kind selected from the group consisting of cuprous oxide, 4-bromo-2-(4-chlorophenyl)-5-(trifluoromethyl)-1H-pyrrole-3-carbonitrile, pyridine-triphenylborane, and medetomidine.

[13] The anti-fouling coating composition according to any one of [10] to [12], in which a viscosity of the anti-fouling coating composition at 25° C. is 5000 mPa·s or less.

[14] The anti-fouling coating composition according to any one of [10] to [13], in which a VOC content is 500 g/L or less.

[15] The anti-fouling coating composition according to any one of [10] to [14], further containing a thermoplastic resin other than the (meth)acrylic copolymer.

[16] A method for producing a (meth)acrylic copolymer, which includes a step of obtaining a (meth)acrylic copolymer by polymerizing a monomer mixture containing at least one kind of monomer (a) selected from the group consisting of a monomer (a1) having at least one kind of structure (I) selected from the group consisting of structures represented by the following formula (1), formula (2), or formula (3), a monomer (a2) having triorganosilyloxycarbonyl group, and at least one kind of monomer (a3) selected from the group consisting of a monomer represented by the following formula (a3-1) and a monomer represented by the following formula (a3-2) and a macromonomer (b):

[Chem.6]

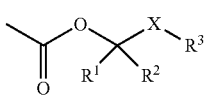
(1)

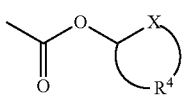
(2)

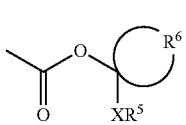
(3)

$(CH_2=C(R^{31})-CO-O)_2M$ (a3-1)

$CH_2=C(R^{31})-CO-O-M-R^{32}$ (a3-2)

(where, X represents —O—, —S—, or —NR$^{14}$—, R$^{14}$ represents a hydrogen atom or an alkyl group, R$^{1}$ and R$^{2}$ each represent a hydrogen atom or an alkyl group having from 1 to 10 carbon atoms, R$^{3}$ and R$^{5}$ each represent an alkyl group having from 1 to 20 carbon atoms, a cycloalkyl group, or an aryl group, R$^{4}$ and R$^{6}$ each represent an alkylene group having from 1 to 10 carbon atoms, M represents Zn, Cu, Mg, or Ca, R$^{31}$ represents a hydrogen atom or a methyl group, and R$^{32}$ represents an organic acid residue other than a (meth)acryloyloxy group).

Effect of the Invention

According to the present invention, it is possible to provide an anti-fouling coating composition capable of forming a coating film exhibiting excellent water resistance and hardness, a (meth)acrylic copolymer, a polymer solution, and a polymer-containing composition which are suitable for obtaining the anti-fouling coating composition, and a method for producing the (meth)acrylic copolymer.

MODE(S) FOR CARRYING OUT THE INVENTION

The following definitions of terms apply throughout this specification and the claims.

The term "VOC" means an organic compound (volatile organic compound) which easily volatilizes at normal temperature and normal pressure.

The "constitutional unit" may be one formed directly from a monomer by a polymerization reaction or a constitutional unit obtained by converting a part of the structure of the constitutional unit of a polymer obtained by a polymerization reaction into another structure by treating the polymer.

The term "monomer" means a compound exhibiting polymerizability (polymerizable monomer).

The "(meth)acrylate" is the general term for an acrylate and a methacrylate, "(meth)acrylic acid" is the general term for acrylic acid and methacrylic acid, the "(meth)acryloyl group" is the general term for an acryloyl group and a methacryloyl group, "(meth)acrylonitrile" is the general term for acrylonitrile and methacrylonitrile, and "(meth)acrylamide" is the general term for acrylamide and methacrylamide.

The term "(meth)acrylic copolymer" means a copolymer in which at least a part of the constitutional unit is a constitutional unit derived from a (meth)acrylic monomer. The (meth)acrylic polymer may further have a constitutional unit derived from a monomer (for example, a vinyl-based monomer such as styrene) other than a (meth)acrylic monomer.

The term "(meth)acrylic monomer" means a monomer having a (meth)acryloyl group.

The term "viscosity" means a value measured by using a B-type viscometer unless otherwise specified.

[(Meth)acrylic Copolymer]

A first aspect of the present invention is a (meth)acrylic copolymer (hereinafter also referred to as a "copolymer (A-1)") having at least one kind of constitutional unit selected from the group consisting of a constitutional unit (A1) having a structure (I) and a constitutional unit (A2) having a triorganosilyloxycarbonyl group and a constitutional unit (B) derived from a macromonomer (b).

The copolymer (A-1) can further have a constitutional unit (A3) having a structure (III) if necessary.

The copolymer (A-1) can further have a constitutional unit (C) other than the constitutional units (A1) to (A3) and the constitutional unit (B).

At least a part of the constitutional unit of the copolymer (A-1) is a constitutional unit derived from a (meth)acrylic monomer. The proportion of the constitutional unit derived from the (meth)acrylic monomer to the sum (100% by mass) of all the constitutional units in the copolymer (A-1) is preferably from 20% to 100% by mass and more preferably from 40% to 100% by mass.

(Constitutional Unit (A1))

The constitutional unit (A1) has at least one kind of structure (I) selected from the group consisting of structures represented by the following formula (1), formula (2), or formula (3).

[Chem. 7]

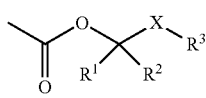

(1)

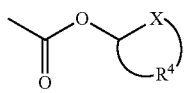

(2)

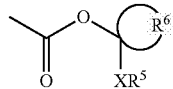

(3)

(Where, X represents —O—, —S—, or —NR$^{14}$—, R$^{14}$ represents a hydrogen atom or an alkyl group, R$^1$ and R$^2$ each represent a hydrogen atom or an alkyl group having from 1 to 10 carbon atoms, R$^3$ and R$^5$ each represent an alkyl group having from 1 to 20 carbon atoms, a cycloalkyl group, or an aryl group, and R$^4$ and R$^6$ each represent an alkylene group having from 1 to 10 carbon atoms.)

X may be any of —O— (etheric oxygen atom), —S— (sulfide-based sulfur atom), or —NR$^{14}$—, and X is preferably —O—.

Examples of the alkyl group having from 1 to 10 carbon atoms of R$^1$ and R$^2$ in the formula (1) may include a methyl group, an ethyl group, a propyl group, an isopropyl group, a butyl group, an isobutyl group, a pentyl group, a hexyl group, and a 2-ethylhexyl group.

The number of carbon atoms in the alkyl group of R$^1$ and R$^2$ is preferably from 1 to 4, more preferably from 1 to 3, and still more preferably 1 or 2.

Examples of a preferred combination of R$^1$ with R$^2$ may include a combination of a hydrogen atom with a methyl group, a combination of a methyl group with a methyl group, a combination of a hydrogen atom with an alkyl group having from 2 to 10 carbon atoms (hereinafter also referred to as a "long chain alkyl group"), a combination of a methyl group with a long chain alkyl group, a combination of a hydrogen atom with a hydrogen atom, and a combination of a long chain alkyl group with a long chain alkyl group. Among these, a combination of a hydrogen atom with a methyl group is preferable from the viewpoint of hydrolyzability.

Examples of the alkyl group having from 1 to 20 carbon atoms of R$^3$ may include the alkyl groups mentioned above as an alkyl group having from 1 to 10 carbon atoms, a decyl group, a dodecyl group, and a tetradecyl group. The number of carbon atoms in the alkyl group of R$^3$ is preferably from 1 to 10.

The cycloalkyl group is preferably a cycloalkyl group having from 4 to 8 carbon atoms, and examples thereof may include a cyclohexyl group and a cyclopentyl group.

The aryl group is preferably an aryl group having from 6 to 20 carbon atoms, and examples thereof may include a phenyl group and a naphthyl group.

As R$^3$, an alkyl group having from 1 to 10 carbon atoms or a cycloalkyl group is preferable.

The alkyl group, cycloalkyl group, and aryl group of R$^3$ may each have a substituent selected from the group consisting of a cycloalkyl group, an aryl group, an alkoxy group, an alkanoyloxy group, an aralkyl group, and an acetoxy group. The number of substituents may be one or two or more in the case of having a substituent.

Examples of the cycloalkyl group and the aryl group as a substituent may include the same groups as those described above. Examples of the alkoxy group may include a methoxy group, an ethoxy group, a propoxy group, and a butoxy group. Examples of the alkanoyloxy group may include an ethanoyloxy group. Examples of the aralkyl group may include a benzyl group.

Examples of the alkylene group having from 1 to 10 carbon atoms of R$^4$ in the formula (2) may include a methylene group, an ethylene group, a propylene group, a butylene group, and a hexylene group.

The number of carbon atoms in the alkylene group of $R^4$ is preferably from 2 to 7 and more preferably from 3 to 4.

The alkylene group may be substituted with a substituent selected from the group consisting of a cycloalkyl group, an aryl group, an alkoxyl group, an alkanoyloxy group, an aralkyl group, and an acetoxy group. The number of substituents may be one or two or more in the case of being substituted with a substituent. Specific examples of the substituent which may be substituted for the alkylene group may include the same substituents as those in $R^3$.

In the formula (3), $R^5$ is the same as $R^3$ in the formula (1), and the preferred aspect thereof is also the same.

$R^6$ is the same as $R^4$ in the formula (2), and the preferred aspect thereof is also the same.

The constitutional unit (A1) is typically a monomer (a1) unit having a structure (I).

Examples of the monomer (a1) may include a monomer having the structure (I) and an ethylenically unsaturated bond (polymerizable carbon-carbon double bond). In this case, the monomer (a1) unit has a structure in which the ethylenically unsaturated bond of the monomer (a1) is cleaved to form a single bond.

The monomer (a1) is preferably a monofunctional monomer having one ethylenically unsaturated bond from the viewpoint that the viscosity when the copolymer (A-1) is dissolved in an organic solvent decreases.

Examples of the monomer (a1) may include a monomer represented by the following formula (a1-1), a monomer represented by the following formula (a1-2), and a monomer represented by the following formula (a1-3).

[Chem. 8]

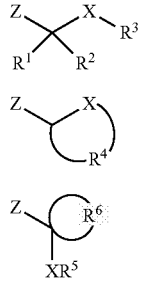

(a1-1)

(a1-2)

(a1-3)

(Where, Z represents $CH_2=CH-COO-$, $CH_2=C(CH_3)-COO-$, $CHR^X=CH-COO-$, $CH_2=C(CH_2R^X)-COO-$, or $CH_2=CR^X-CH_2COO-$, $R^X$ represents the above-described structure (I) or an alkyl ester group, X represents $-O-$, $-S-$, or $-NR^{14}-$, $R^{14}$ represents a hydrogen atom or an alkyl group, and $R^1$ to $R^6$ are synonymous with $R^1$ to $R^6$ defined above.)

In Z, $CH_2=CH-COO-$ is an acryloyloxy group and $CH=C(CH_3)-COO-$ is a methacryloyloxy group.

$CH(CH_3)=CH-COO-$ is a crotonoyloxy group (ethylenically unsaturated bond is in a trans form) or isocrotonoyloxy group (ethylenically unsaturated bond is in a cis form).

$CHR^X=CH-COO-$ is a maleinoyloxy group (ethylenically unsaturated bond is in a cis form) in which a carboxyl group is substituted with a hemiacetal ester group, a hemiketal ester group, or an alkyl ester group or a fumaroyloxy group (ethylenically unsaturated bond is in a trans form).

The structure (I) of $R^X$ is the same as the structure (I) described above. $R^{X1}$ preferably has the same structure as the group to which Z is bonded in a case in which $R^X$ is the structure (I). $R^X$ is preferably a group represented by $-CR^1R^2-XR^3$, for example, in the case of a compound represented by the formula (a1-1).

The alkyl ester group of $R^X$ is represented by $-COOR^{X1}$. $R^{X1}$ represents an alkyl group. As the alkyl group of $R^{X1}$, an alkyl group having from 1 to 6 carbon atoms is preferable and a methyl group is particularly preferable.

$CH_2=C(CH_2R^X)-COO-$ or $CH_2=CR^X-CH_2COO-$ is an itaconoyloxy group in which the carboxyl group is substituted with a hemiacetal ester group, a hemiketal ester group, or an alkyl ester group. $R^X$ is the same as $R^X$ described above.

As Z, $CH_2=CH-COO-$ or $CH(CH_3)=CH-COO-$ is preferable.

Examples of the monomer (a1) may include those to be presented below.

[Chem. 9]

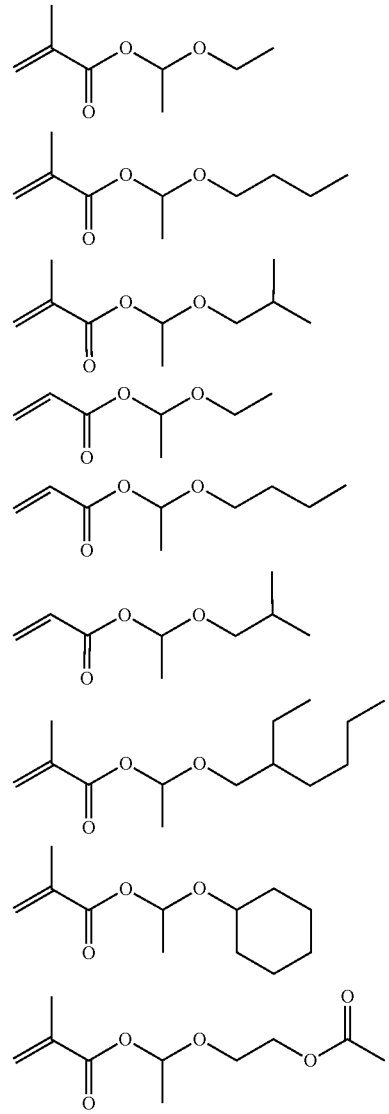

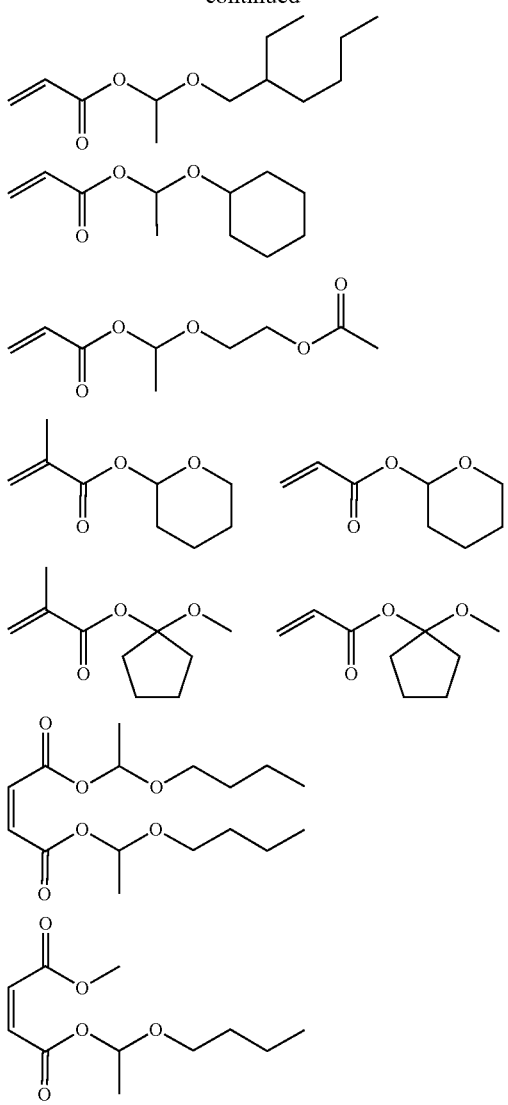

It is possible to purchase the monomer (a1) as a commercially available product or to appropriately synthesize the monomer (a1) by a known method.

For example, the monomer (a1) can be synthesized by converting the carboxyl group of a monomer (a0) having a carboxyl group into the structure (I).

Examples of the monomer (a0) may include (meth)acrylic acid, crotonic acid, isocrotonic acid, maleic acid, fumaric acid, itaconic acid, monomethyl maleate, and monomethyl fumarate.

Examples of a method for converting the carboxyl group of the monomer (a0) into the structure (I) may include a method in which the monomer (a) is reacted (addition reaction) with at least one kind of alkenyl compound selected from the group consisting of a compound represented by the following formula (11), a compound represented by the following formula (12), and a compound represented by the following formula (13). The alkenyl compound may be used singly or in combination of two or more kinds thereof.

[Chem. 10]

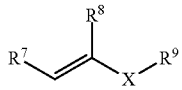 (11)

 (12)

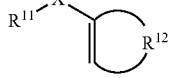 (13)

(Where, X represents —O—, —S—, or —NR$^{14}$—, R$^{14}$ represents a hydrogen atom or an alkyl group. R$^7$ represents a hydrogen atom or an alkyl group having from 1 to 9 carbon atoms, R$^8$ represents a hydrogen atom or an alkyl group having from 1 to 10 carbon atoms, R$^9$ and R$^{11}$ each represent an alkyl group having from 1 to 20 carbon atoms, a cycloalkyl group, or an aryl group, R$^{10}$ represents a single bond or an alkylene group having from 1 to 9 carbon atoms, and R$^{12}$ represents an alkylene group having from 1 to 9 carbon atoms.)

When a compound represented by the formula (11) is used as the alkenyl compound, a compound in which R$^1$ in the formula (a1-1) is CH$_2$R$^7$, R$^2$ is R$^8$, and R$^3$ is R$^9$ is obtained.

In the formula (11), the alkyl group having from 1 to 9 carbon atoms of R$^7$ is the same as the alkyl group having from 1 to 10 carbon atoms of R$^1$ except that the number of carbon atoms is 9 or fewer. R$^8$ and R$^9$ are the same as R$^2$ and R$^3$, respectively.

Examples of the compound represented by the formula (11) may include vinyl ethers such as alkyl vinyl ethers (for example, ethyl vinyl ether, butyl vinyl ether, isobutyl vinyl ether, t-butyl vinyl ether, and 2-ethylhexyl vinyl ether) and cycloalkyl vinyl ethers (for example, cyclohexyl vinyl ether); 1-propenyl ethers such as ethyl-1-propenyl ether; and 1-butenyl ethers such as ethyl-1-butenyl ether. Among these, vinyl ethers and 1-propenyl ethers are preferable.

When a compound represented by the formula (12) is used as the alkenyl compound, a compound in which R$^4$ in the formula (a1-2) is CH$_2$—R$^{10}$ is obtained.

In the formula (12), the alkylene group having from 1 to 9 carbon atoms of R$^{10}$ is the same as R$^4$ except that the number of carbon atoms is 9 or fewer.

Examples of the compound represented by the formula (12) may include dihydrofurans such as 2,3-dihydrofuran and 5-methyl-2,3-dihydrofuran; and dihydropyrans such as 3,4-dihydro-2H-pyran and 5,6-dihydro-4-methoxy-2H-pyran.

When a compound represented by the formula (13) is used as the alkenyl compound, a compound in which R$^5$ in the formula (a1-3) is R$^{11}$ and R$^6$ is CH$_2$-R$^{12}$ is obtained.

In the formula (13). R$^{11}$ is the same as R$^5$. R$^{12}$ is the same as R$^6$ except that the number of carbon atoms is 9 or fewer.

Examples of the compound represented by the formula (13) may include 1-alkoxy-1-cycloalkylenes such as 1-methoxy-1-cyclopentene, 1-methoxy-1-cyclohexene, 1-methoxy-1-cycloheptene, 1-ethoxy-1-cyclopentene, 1-ethoxy-1-cyclohexene, 1-butoxy-1-cyclopentene, and 1-butoxy-1-cyclohexene; and substituent-containing 1-alkoxy-1-cycloalkylenes such as 1-ethoxy-3-methyl-1-cyclohexene.

The reaction of the monomer (a0) with the alkenyl compound proceeds under a relatively mild condition. For example, an intended product can be obtained by conducting the reaction at a reaction temperature of from 40° C. to 100° C. for from 5 to 10 hours in the presence or absence of an acidic catalyst such as hydrochloric acid, sulfuric acid, or phosphoric acid. After the reaction was completed, the intended monomer can be recovered by conducting vacuum distillation under a predetermined conditions.

(Constitutional Unit (A2))

The constitutional unit (A2) has a triorganosilyloxycarbonyl group. Examples of the triorganosilyloxycarbonyl group may include a group represented by the following formula (II).

(Where, $R^{21}$ to $R^{23}$ each represent a hydrocarbon group having from 1 to 20 carbon atoms.)

Examples of the hydrocarbon group of $R^{21}$ to $R^{23}$ may include alkyl groups having from 1 to 20 carbon atoms such as a methyl group, an ethyl group, an n-propyl group, an isopropyl group, an n-butyl group, an isobutyl group, a sec-butyl group, a tert-butyl group, a pentyl group, a hexyl group, a heptyl group, an octyl group, a nonyl group, a decyl group, an undecyl group, a dodecyl group, a tridecyl group, and a tetradecyl group; cycloalkyl groups such as a cyclohexyl group; and aryl groups such as a phenyl group and a naphthyl group.

Each of the cycloalkyl group and the aryl group may have a substituent. Examples of the substituent may include a halogen atom, an alkyl group, an acyl group, a nitro group, and an amino group. The number of carbon atoms in the alkyl group as the substituent is preferably about from 1 to 18.

$R^{21}$ to $R^{23}$ may be the same as or different from one another.

It is preferable that at least one of $R^{21}$ to $R^{23}$ is an isopropyl group and it is particularly preferable that all of $R^{21}$ to $R^{23}$ are an isopropyl group from the viewpoint that a coating film having a stable polishing rate is obtained and the anti-fouling performance can be stably maintained for a long period of time.

Typically, the constitutional unit (A2) is a monomer (a2) unit having a triorganosilyloxycarbonyl group.

Examples of the monomer (a2) may include a monomer having a triorganosilyloxycarbonyl group and an ethylenically unsaturated bond.

The monomer (a2) is preferably a monofunctional monomer having one ethylenically unsaturated bond from the viewpoint that the viscosity when the copolymer (A-1) is dissolved in an organic solvent decreases.

Examples of the monomer (a2) may include a monomer represented by the following formula (a2-1) and a monomer represented by the following formula (a2-2). Among these, the monomer represented by the formula (a2-1) is preferable.

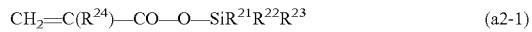

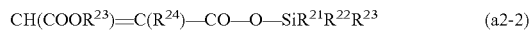

(Where, $R^{21}$ to $R^{23}$ are synonymous with $R^{21}$ to $R^{23}$ defined above, $R^{24}$ represents a hydrogen atom or a methyl group, and $R^{25}$ represents an alkyl group.)

Specific examples of the monomer represented by the formula (a2-1) may include the following compounds.

Trimethylsilyl (meth)acrylate, triethylsilyl (meth)acrylate, tri-n-propylsilyl (meth)acrylate, tri-n-butylsilyl (meth)acrylate, tri-n-amylsilyl (meth)acrylate, tri-n-hexylsilyl (meth)acrylate, tri-n-octylsilyl (meth)acrylate, tri-n-dodecylsilyl (meth)acrylate, triphenylsilyl (meth)acrylate, tri-p-methylphenylsilyl (meth)acrylate, tribenzylsilyl (meth)acrylate, triisopropylsilyl (meth)acrylate, triisobutylsilyl (meth)acrylate, tri-s-butylsilyl (meth)acrylate, tri-2-methylisopropylsilyl (meth)acrylate, tri-t-butylsilyl (meth)acrylate, ethyldimethylsilyl (meth)acrylate, n-butyldimethylsilyl (meth)acrylate, diisopropyl-n-butylsilyl (meth)acrylate, n-octyl-di-n-butylsilyl (meth)acrylate, diisopropylstearylsilyl (meth)acrylate, dicyclohexylphenylsilyl (meth)acrylate, t-butyldiphenylsilyl (meth)acrylate, lauryldiphenylsilyl (meth)acrylate, and the like.

In the formula (a2-2), examples of the alkyl group of $R^{25}$ may include an alkyl group having from 1 to 5 carbon atoms.

Specific examples of the compound represented by the formula (a2-2) may include the following compounds.

Triisopropylsilylmethyl maleate, triisopropylsilylamyl maleate, tri-n-butylsilyl-n-butyl maleate, t-butyldiphenylsilylmethyl maleate, t-butyldiphenylsilyl-n-butyl maleate, triisopropylsilylmethyl fumarate, triisopropylsilylamyl fumarate, tri-n-butylsilyl-n-butyl fumarate, t-butyldiphenylsilylmethyl fumarate, t-butyldiphenylsilyl-n-butyl fumarate, and the like.

It is possible to purchase the monomer (a2) as a commercially available product or to appropriately synthesize the monomer (a2) by a known method.

(Constitutional Unit (A3))

The constitutional unit (A3) has at least one kind of structure (III) selected from the group consisting of structures represented by the following formula (4) or (5).

(Where, M represents Zn, Cu, Mg, or Ca and $R^{32}$ represents an organic acid residue other than a (meth)acryloyloxy group.

The constitutional unit (A3) is typically the monomer (a3) unit having the structure (III). The constitutional unit (A3) and the monomer (a3) will be described later in detail.

Incidentally, the constitutional units (A1) to (A3) are common in that they have a structure hydrolyzable in the sea water and the like.

The monomers (a1) to (a3) are monomers which do not correspond to the macromonomer (b), respectively.

(Constitutional Unit (B))

The constitutional unit (B) is a constitutional unit derived from the macromonomer (b).

The macromonomer (b) is a compound which has a radically polymerizable group and two or more constitutional units derived from a monomer having a radically polymerizable group (hereinafter also referred to as a "monomer (b1)"). The two or more constitutional units of the macromonomer (b) may be the same as or different from each other.

The radically polymerizable group of the macromonomer (b) is preferably a group having an ethylenically unsaturated bond. Examples of the group having an ethylenically unsaturated bond may include $CH_2=C(COOR)-CH_2-$, a (meth)acryloyl group, a 2-(hydroxymethyl)acryloyl group, and a vinyl group.

Here, R represents a hydrogen atom, an unsubstituted or substituted alkyl group, an unsubstituted or substituted alicyclic group, an unsubstituted or substituted aryl group, or an unsubstituted or substituted heterocyclic group.

Examples of the alkyl group of R may include a branched or straight chain alkyl group having from 1 to 20 carbon atoms. Specific examples of the branched or straight chain alkyl group having from 1 to 20 carbon atoms may include a methyl group, an ethyl group, an n-propyl group, an i-propyl group, an n-butyl group, a t-butyl group, an i-butyl group, a pentyl group, a hexyl group, a heptyl group, an octyl group, a nonyl group, a decyl group, an undecyl group, a dodecyl group, a tridecyl group, a tetradecyl group, a pentadecyl group, a hexadecyl group, a heptadecyl group, an octadecyl group, a nonadecyl group, and an icosyl group.

The alicyclic group of R may be monocyclic or polycyclic, and examples thereof may include an alicyclic group having from 3 to 20 carbon atoms. The alicyclic group is preferably a saturated alicyclic group such as a cycloalkyl group, and specific examples thereof may include a cyclopropyl group, a cyclobutyl group, a cyclopentyl group, a cyclohexyl group, a cycloheptyl group, a bicyclo[2.2.1]heptyl group, a cyclooctyl group, and an adamantyl group.

Examples of the aryl group of R may include an aryl group having from 6 to 18 carbon atoms. Specific examples of the aryl group having from 6 to 18 carbon atoms may include a phenyl group and a naphthyl group.

Examples of the heterocyclic group of R may include a heterocyclic group having from 5 to 18 carbon atoms. Specific examples of the heterocyclic group having from 5 to 18 carbon atoms may include oxygen atom-containing heterocyclic groups such as a γ-butyrolactone group and an ε-caprolactone group, nitrogen atom-containing heterocyclic groups such as a pyridyl group, a carbazolyl group, a pyrrolidinyl group, a and pyrrolidone group, and a morpholino group.

The alkyl group, the alicyclic group, the aryl group, and the heterocyclic group may each have a substituent. Examples of the substituent may include at least one kind selected from the group consisting of an alkyl group (however, a case in which R is an alkyl group having a substituent is excluded), an aryl group, —COOR$^{51}$, a cyano group, —OR$^{52}$, —NR$^{53}$R$^{54}$, —CONR$^{55}$R$^{56}$, a halogen atom, an allyl group, an epoxy group, a siloxy group, and a group exhibiting hydrophilicity or ionicity.

Here, R$^{51}$ to R$^{56}$ each independently represent a hydrogen atom, an alkyl group, an alicyclic group, or an aryl group. Examples of each of these groups may include the same groups as those described above.

Examples of the alkyl group and the aryl group as a substituent may include the same groups as the alkyl group and aryl group of R$^{1}$, respectively.

As R$^{51}$ of —COOR$^{51}$ of the substituent is preferably a hydrogen atom or an alkyl group. In other words, —COOR$^{51}$ is preferably a carboxyl group or an alkoxycarbonyl group. Examples of the alkoxycarbonyl group may include a methoxycarbonyl group.

R$^{52}$ of —OR$^{52}$ of the substituent is preferably a hydrogen atom or an unsubstituted alkyl group. In other words, —OR$^{52}$ is preferably a hydroxyl group or an alkoxy group. Examples of the alkoxy group may include an alkoxy group having from 1 to 12 carbon atoms, and specific examples thereof may include a methoxy group.

Examples of —NR$^{53}$R$^{54}$ of the substituent may include an amino group, a monomethylamino group, and a dimethylamino group.

Examples of —CONR$^{55}$R$^{56}$ of the substituent may include a carbamoyl group (—CONH$_2$), an N-methylcarbamoyl group (—CONHCH$_3$), and N,N-dimethylcarbamoyl group (dimethylamide group: —CON(CH$_3$)$_2$).

Examples of the halogen atom of the substituent may include a fluorine atom, a chlorine atom, a bromine atom, and an iodine atom.

Examples of the group exhibiting hydrophilicity or ionicity of the substituent may include cationic substituents such as an alkali salt of a carboxyl group or an alkali salt of a sulfoxy group, poly(alkylene oxide) groups such as a polyethylene oxide group and a polypropylene oxide group, and quaternary ammonium base.

As R, an alkyl group or a saturated alicyclic group is preferable and an alkyl group or a saturated alicyclic group having an unsubstituted or substituted alkyl group is more preferable.

Among these, a methyl group, an ethyl group, a n-propyl group, an i-propyl group, a n-butyl group, a t-butyl group, a pentyl group, a hexyl group, a heptyl group, and an octyl group are preferable from the viewpoint of ease of availability, and a methyl group, an ethyl group, a n-propyl group, an i-propyl group, a n-butyl group, a t-butyl group, a cyclopropyl group, a cyclobutyl group, an isobornyl group, and an adamantyl group are preferable.

As the radically polymerizable group of the monomer (b1), a group having an ethylenically unsaturated bond is preferable in the same manner as the radically polymerizable group of the macromonomer (b).

As the monomer (b1), various monomers can be used, but examples thereof may include hydrocarbon group-containing (meth)acrylic acid esters such as methyl (meth)acrylate, ethyl (meth)acrylate, n-propyl (meth)acrylate, isopropyl (meth)acrylate, isobutyl (meth)acrylate, t-butyl (meth)acrylate, isoamyl (meth)acrylate, hexyl (meth)acrylate, 2-ethylhexyl (meth)acrylate, octyl (meth)acrylate, lauryl (meth)acrylate, stearyl (meth)acrylate, isostearyl (meth)acrylate, hexadecyl (meth)acrylate, nonyl (meth)acrylate, isononyl (meth)acrylate, phenyl (meth)acrylate, benzyl (meth)acrylate, cyclohexyl (meth)acrylate, tetrahydrofurfuryl (meth)acrylate, isobornyl (meth)acrylate, 3,5,5-trimethylcyclohexyl (meth)acrylate, dicyclopentanyl (meth)acrylate, dicyclopentenyl (meth)acrylate, dicyclopentenyloxyethyl (meth)acrylate, terpene acrylate and any derivative thereof, hydrogenated rosin acrylate and any derivative thereof, and docosyl (meth)acrylate;

hydroxyl group-containing (meth)acrylic acid esters such as 2-hydroxyethyl (meth)acrylate, 2-hydroxypropyl (meth)acrylate, 2-hydroxybutyl (meth)acrylate, 3-hydroxybutyl (meth)acrylate, 4-hydroxybutyl (meth)acrylate, and glycerol (meth)acrylate;

carboxyl group-containing vinyl-based monomers such as (meth)acrylic acid, 2-(meth)acryloyloxyethyl hexahydrophthalic acid, 2-(meth)acryloyloxypropyl hexahydrophthalic acid, 2-(meth)acryloyloxyethyl phthalic acid, 2-(meth)acryloyloxypropyl phthalic acid, 2-(meth)acryloyloxyethyl maleic acid, 2-(meth)acryloyloxypropyl maleic acid, 2-(meth)acryloyloxyethyl succinic acid, 2-(meth)acryloyloxypropyl succinic acid, crotonic acid, fumaric acid, maleic acid, itaconic acid, citraconic acid, monomethyl maleate, monoethyl maleate, monooctyl maleate, monomethyl itaconate, monoethyl itaconate, monobutyl itaconate, monooctyl itaconate, monomethyl fumarate, monoethyl fumarate, monobutyl fumarate, monooctyl fumarate, and monoethyl citraconate;

acid anhydride group-containing vinyl-based monomers such as anhydrous maleic acid and anhydrous itaconic acid;

unsaturated dicarboxylic acid diester monomers such as dimethyl maleate, dibutyl maleate, dimethyl fumarate, dibutyl fumarate, dibutyl itaconate, and diperfluorocyclohexyl fumarate;

epoxy group-containing vinyl-based monomers such as glycidyl (meth)acrylate, glycidyl α-ethylacrylate, and 3,4-epoxybutyl (meth)acrylate;

amino group-containing (meth)acrylic acid ester-based vinyl-based monomers such as dimethylaminoethyl (meth)acrylate and diethylaminoethyl (meth)acrylate;

vinyl-based monomers containing an amide group such as (meth)acrylamide, N-t-butyl(meth)acrylamide, N-methylol (meth)acrylamide, N-isopropylacrylamide, hydroxyethylacrylamide, N-methoxymethyl(meth)acrylamide, N-butoxymethyl(meth)acrylamide, diacetone acrylamide, maleic acid amide, and maleimide;

vinyl-based monomers such as styrene, α-methylstyrene, vinyltoluene, (meth)acrylonitrile, vinyl chloride, vinyl acetate, and vinyl propionate;

polyfunctional vinyl-based monomers such as divinylbenzene, ethylene glycol di(meth)acrylate, 1,3-butylene glycol di(meth)acrylate, 1,4-butanediol di(meth)acrylate, 1,6-hexanediol di(meth)acrylate, diethylene glycol di(meth)acrylate, triethylene glycol di(meth)acrylate, tetraethylene glycol di(meth)acrylate, polyethylene glycol di(meth)acrylate, tripropylene glycol di(meth)acrylate, neopentyl glycol di(meth)acrylate, 1,9-nonanediol di(meth)acrylate, 1,10-decanediol di(meth)acrylate, trimethylolpropane tri(meth)acrylate, pentaerythritol tetra(meth)acrylate, dipentaerythritol hexa(meth)acrylate, allyl (meth)acrylate, triallyl cyanurate, diallyl maleate, polypropylene glycol diallyl ether, and N,N'-methylenebis(meth)acrylamide;

acryloyl morpholine, polyethylene glycol (meth)acrylate, polypropylene glycol (meth)acrylate, methoxyethyl (meth)acrylate, ethoxyethyl (meth)acrylate, n-butoxyethyl (meth)acrylate, isobutoxyethyl (meth)acrylate, t-butoxyethyl (meth)acrylate, ethoxyethoxyethyl (meth)acrylate, phenoxyethyl (meth)acrylate, nonylphenoxyethyl (meth)acrylate, 3-methoxybutyl (meth)acrylate, acetoxyethyl (meth)acrylate, "Placcel FM" (trade name, manufactured by DAICEL CORPORATION, caprolactone-added monomer), "BLEMMER PME-100" (trade name, manufactured by NOF CORPORATION, methoxypolyethylene glycol methacrylate (one having two ethylene glycol chains)), "BLENMER PME-200" (trade name, manufactured by NOF CORPORATION, methoxypolyethylene glycol methacrylate (one having four ethylene glycol chains)), "BLENMER PME-400" (trade name, manufactured by NOF CORPORATION, methoxypolyethylene glycol methacrylate (one having nine ethylene glycol chains)), "BLENMER 50POEP-800B" (trade name, manufactured by NOF CORPORATION, octoxypolyethylene glycol-polypropylene glycol-methacrylate (one having eight ethylene glycol chains and six propylene glycol chains), and "BLENMER 20ANEP-600" (trade name, manufactured by NOF CORPORATION, nonylphenoxy(ethylene glycol-polypropylene glycol) monoacrylate), "BLENMER AME-100" (trade name, manufactured by NOF CORPORATION). "BLENMER AME-200" (trade name, manufactured by NOF CORPORATION), and "BLENMER 50AOEP-800B" (trade name, manufactured by NOF CORPORATION), Silaplane FM-0711 (trade name, manufactured by JNC Corporation), Silaplane FM-0721 (trade name, manufactured by JNC Corporation), Silaplane FM-0725 (trade name, manufactured by JNC Corporation), Silaplane TM-0701 (trade name, manufactured by JNC Corporation), Silaplane TM-0701T (trade name, manufactured by JNC Corporation), X-22-174DX (trade name, manufactured by Shin-Etsu Chemical Co., Ltd.), X-22-2426 (trade name, manufactured by Shin-Etsu Chemical Co., Ltd.), X-22-2475 (trade name, manufactured by Shin-Etsu Chemical Co., Ltd.);

silane coupling agent-containing monomers such as 3-(meth)acryloxypropyltrimethoxysilane, 3-(meth)acryloxypropylmethyldiethoxysilane, 3-(meth)acryloxypropyltriethoxysilane, 3-acryloxypropyltrimethoxysilane, vinyltrimethoxysilane, and vinyltriethoxysilane;

organosilyl group-containing monomers other than the silane coupling agent-containing monomers such as the monomer (a2) described above;

halogenated olefins such as vinyl chloride, vinylidene chloride, vinyl fluoride, vinylidene fluoride, and chlorotrifluoroethylene;

fluorine-containing monomers (however, halogenated olefins are excluded) such as (meth)acrylic acid 2-isocyanatoethyl 2,2,2-trifluoroethyl (meth)acrylate, 2,2,3,3,3-pentafluorophenyl (meth)acrylate, 2-(perfluorobutyl)ethyl (meth)acrylate, 3-(perfluorobutyl)-2-hydroxypropyl (meth)acrylate, 2-(perfluorohexyl)ethyl (meth)acrylate, 3-perfluorohexyl-2-hydroxypropyl (meth)acrylate, 3-(perfluoro-3-methylbutyl)-2-hydroxypropyl (meth)acrylate, 2,2,3,3-tetrafluoropropyl (meth)acrylate, 1H,1H,5H-octafluoropentyl (meth)acrylate, 1H,1H,5H-octafluoropentyl (meth)acrylate, 1H,1H,2H,2H-tridecafluorooctyl (meth)acrylate, 1H-1-(trifluoromethyl) trifluoroethyl (meth)acrylate, 1H,1H,3H-hexafluorobutyl (meth)acrylate, and 1,2,2,2-tetrafluoro-1-(trifluoromethyl) ethyl (meth)acrylate;

monomers having an acetal structure such as 1-butoxyethyl (meth)acrylate, 1-(2-ethylhexyloxy)ethyl (meth)acrylate, 1-(cyclohexyloxy)ethyl (meth)acrylate, and 2-tetrahydropyranyl (meth)acrylate; and 4-methacryloyloxybenzophenone, and 2-isocyanatoethyl (meth)acrylate. One kind of these monomers may be used singly or two or more kinds thereof may be used concurrently.

It is preferable that at least a part of the monomer (b1) is a (meth)acrylic monomer.

As the constitutional unit derived from the monomer (b1), a constitutional unit represented by the following formula (b') (hereinafter also referred to as a "constitutional unit (b')") is preferable. In other words, it is preferable that the macromonomer (b) has a radically polymerizable group and two or more constitutional units (b').

[Chem. 11]

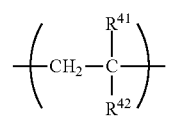

(b')

(Where, $R^{41}$ represents a hydrogen atom, a methyl group, or $CH_2OH$ and $R^{42}$ represents $OR^{43}$, a halogen atom, $COR^{44}$, $COOR^{45}$, CN, $CON^{46}R^{47}$, or $R^{48}$. $R^{43}$ to $R^{47}$ each independently represent a hydrogen atom, an unsubstituted or substituted alkyl group, an unsubstituted or substituted alicyclic group, an unsubstituted or substituted aryl group, an unsubstituted or substituted heteroaryl group, an unsubstituted or substituted nonaromatic heterocyclic group, an unsubstituted or substituted aralkyl group, an unsubstituted or substituted alkaryl group, or an unsubstituted or substituted organosilyl group and RV represents an unsubstituted or substituted aryl group or an unsubstituted or substituted heteroaryl group.)

Examples of the alkyl group, alicyclic group, and aryl group of $R^{43}$ to $R^{47}$ may include the same groups as the alkyl group, alicyclic group, and aryl group of R described above.

Examples of the heteroaryl group may include a pyridyl group and a carbazolyl group.

Examples of the nonaromatic heterocyclic group may include a pyrrolidinyl group and a pyrrolidone group.

Examples of the aralkyl group may include a benzyl group and a phenylethyl group.

Examples of the organosilyl group may include a triorganosilyl group.

Examples of the triorganosilyl group may include the triorganosilyl group (for example, $-SiR^{21}R^{22}R^{23}$) in the triorganosilyloxycarbonyl group.

The alkyl group, the alicyclic group, the aryl group, the heteroaryl group, the nonaromatic heterocyclic group, the aralkyl group, the alkaryl group, and the organosilyl group may each have a substituent. Examples of the substituent may include a carboxylic acid group (COOH), a carboxylic acid ester group, an epoxy group, a hydroxyl group, an alkoxy group, a primary amino group, a secondary amino group, a tertiary amino group, an isocyanato group, a sulfonic acid group ($SO_3H$), and a halogen atom.

Examples of the carboxylic acid ester group may include the groups which have been mentioned in the description of R and in which $R^{51}$ of $-COOR^{51}$ is an alkyl group, an alicyclic group, or an aryl group.

Examples of the alkoxy group may include the groups in which $R^{52}$ of $-OR^{52}$ is an alkyl group.

Examples of the secondary amino group may include the groups in which $R^{53}$ of $-NR^{53}R^{54}$ is a hydrogen atom and $R^{54}$ is an alkyl group, an alicyclic group, or an aryl group.

Examples of the tertiary amino group may include the groups in which $R^{53}$ and $R^{54}$ of $-NR^{53}R^{54}$ are each an alkyl group, an alicyclic group, or an aryl group.

Examples of each of the alkyl group, the aryl group, and the halogen atom may include the same groups as those described above.

Examples of each of the aryl group and heteroaryl group of $R^{48}$ may include the same groups as those described above.

The aryl group and the heteroaryl group may each have a substituent. Examples of the substituent may include a carboxylic acid group, a carboxylic acid ester group, an epoxy group, a hydroxyl group, an alkoxy group, a primary amino group, a secondary amino group, a tertiary amino group, an isocyanato group, a sulfonic acid group, and a halogen atom.

Examples of each of the carboxylic acid ester group, the alkoxy group, the primary amino group, the secondary amino group, the tertiary amino group, the alkyl group, the aryl group, and the halogen atom may include the same groups as those described above.

Examples of the olefin group may include an allyl group. The olefin group may have a substituent. Examples of the substituent in the olefin group may include the same substituents as those in $R^{48}$.

As the constitutional unit (b'), a constitutional unit in which $R^{41}$ is a hydrogen atom or a methyl group and $R^{42}$ is $COOR^{45}$ is preferable. $R^{45}$ is preferably a hydrogen atom, an alkyl group, a saturated alicyclic group, an aryl group, a heteroaryl group, or a nonaromatic heterocyclic group.

The constitutional unit (b') is a constitutional unit derived from $CH_2=CR^{41}R^{42}$. Specific examples of $CH_2=CR^{41}R^{42}$ may include the following compounds.

Hydrophobic group-containing (meth)acrylic acid ester monomers such as substituted or unsubstituted alkyl (meth)acrylates [for example, methyl (meth)acrylate, ethyl (meth)acrylate, n-propyl (meth)acrylate, i-propyl (meth)acrylate, n-butyl (meth)acrylate, i-butyl (meth)acrylate, t-butyl (meth)acrylate, 2-ethylhexyl (meth)acrylate, lauryl (meth)acrylate, stearyl (meth)acrylate, behenyl (meth)acrylate, 1-methyl-2-methoxyethyl (meth)acrylate, 3-methoxybutyl (meth)acrylate, and 3-methyl-3-methoxybutyl (meth)acrylate], substituted or unsubstituted aralkyl (meth)acrylates [for example, benzyl (meth)acrylate, m-methoxyphenylethyl (meth)acrylate, and p-methoxyphenylethyl (meth)acrylate], substituted or unsubstituted aryl (meth)acrylates [for example, phenyl (meth)acrylate, m-methoxyphenyl (meth)acrylate, p-methoxyphenyl (meth)acrylate, and o-methoxyphenylethyl (meth)acrylate], alicyclic (meth)acrylates [for example, isobornyl (meth)acrylate and cyclohexyl (meth)acrylate], and halogen atom-containing (meth)acrylates [for example, trifluoroethyl (meth)acrylate, perfluorooctyl (meth)acrylate, and perfluorocyclohexyl (meth)acrylate];

oxyethylene group-containing (meth)acrylic acid ester monomers such as 2-methoxyethyl (meth)acrylate, 2-ethoxyethyl (meth)acrylate, 2-butoxyethyl (meth)acrylate, butoxy diethylene glycol (meth)acrylate, methoxy triethylene glycol (meth)acrylate, methoxy polyethylene glycol (meth)acrylate, phenoxyethyl (meth)acrylate, and 2-(2-ethylhexaoxy)ethyl (meth)acrylate:

hydroxyl group-containing (meth)acrylic acid ester monomers such as 2-hydroxyethyl (meth)acrylate, 2-hydroxypropyl (meth)acrylate, 4-hydroxybutyl (meth)acrylate, and glycerol (meth)acrylate;

terminal-alkoxyallylated polyether monomers such as methoxy polyethylene glycol allyl ether, methoxypolypropylene glycol allyl ether, butoxy polyethylene glycol allyl ether, butoxy polypropylene glycol allyl ether, methoxy-polyethylene glycol-polypropylene glycol allyl ether, and butoxy polyethylene glycol-polypropylene glycol allyl ether;

epoxy group-containing vinyl monomers such as glycidyl (meth)acrylate, glycidyl α-ethylacrylate, and 3,4-epoxybutyl (meth)acrylate;

primary or secondary amino group-containing vinyl monomers such as butylaminoethyl (meth)acrylate and (meth)acrylamide;

tertiary amino group-containing vinyl monomers such as dimethylaminoethyl (meth)acrylate, diethylaminoethyl (meth)acrylate, dimethylaminopropyl (meth)acrylate, dimethylaminobutyl (meth)acrylate, dibutylaminoethyl (meth)acrylate, dimethylaminoethyl (meth)acrylamide, and dimethylaminopropyl (meth)acrylamide;

heterocycle-based basic monomers such as vinyl pyrrolidone, vinyl pyridine, and vinyl carbazole;

organosilyl group-containing vinyl monomers such as trimethylsilyl (meth)acrylate, triethylsilyl (meth)acrylate, tri-n-propylsilyl (meth)acrylate, tri-n-butylsilyl (meth)acrylate, tri-n-amylsilyl (meth)acrylate, tri-n-hexylsilyl (meth)acrylate, tri-n-octylsilyl (meth)acrylate, tri-n-dodecylsilyl (meth)acrylate, triphenylsilyl (meth)acrylate, tri-p-methylphenylsilyl (meth)acrylate, tribenzylsilyl (meth)acrylate, triisopropylsilyl (meth)acrylate, triisobutylsilyl (meth)acrylate, tri-s-butylsilyl (meth)acrylate, tri-2-methylisopropylsilyl (meth)acrylate, tri-t-butylsilyl (meth)acrylate, ethyldimethylsilyl (meth)acrylate, n-butyldimethylsilyl (meth)

acrylate, diisopropyl-n-butylsilyl (meth)acrylate, n-octyl-di-n-butylsilyl (meth)acrylate, diisopropylstearylsilyl (meth)acrylate, dicyclohexylphenylsilyl (meth)acrylate, t-butyldiphenylsilyl (meth)acrylate, and lauryldiphenylsilyl (meth)acrylate;

carboxyl group-containing ethylenically unsaturated monomers such as methacrylic acid, acrylic acid, vinylbenzoic acid, tetrahydrophthalic acid monohydroxyethyl (meth)acrylate, tetrahydrophthalic acid monohydroxypropyl (meth)acrylate, tetrahydrophthalic acid monohydroxybutyl (meth)acrylate, phthalic acid monohydroxyethyl (meth)acrylate, phthalic acid monohydroxypropyl (meth)acrylate, succinic acid monohydroxyethyl (meth)acrylate, succinic acid monohydroxypropyl (meth)acrylate, maleic acid monohydroxyethyl (meth)acrylate, and maleic acid monohydroxypropyl (meth)acrylate;

cyano group-containing vinyl monomers such as acrylonitrile and methacrylonitrile;

vinyl ether monomers such as alkyl vinyl ethers [for example, ethyl vinyl ether, propyl vinyl ether, butyl vinyl ether, hexyl vinyl ether, and 2-ethylhexyl vinyl ether] and cycloalkyl vinyl ethers [for example, cyclohexyl vinyl ether];

vinyl ester monomers such as vinyl acetate, vinyl propionate, vinyl butyrate, and vinyl benzoate;

aromatic vinyl monomers such as styrene, vinyltoluene, and α-methylstyrene; and halogenated olefins such as vinyl chloride and vinyl fluoride;

The macromonomer (b) may further have constitutional units other than the constitutional unit (b'). Examples of the other constitutional units may include constitutional units derived from monomers which do not correspond to $CH_2=CR^1R^2$ among the monomers (b1) described above.

Preferred specific examples of the other constitutional units may include the following monomer-derived constitutional units.

Organosilyl group-containing vinyl monomers such as triisopropylsilylmethyl maleate, triisopropylsilylamyl maleate, tri-n-butylsilyl-n-butyl maleate, t-butyldiphenylsilylmethyl maleate, t-butyldiphenylsilyl-n-butyl maleate, triisopropylsilylmethyl fumarate, triisopropylsilylamyl fumarate, tri-n-butylsilyl-n-butyl fumarate, t-butyldiphenylsilylmethyl fumarate, and t-butyldiphenylsilyl-n-butyl fumarate;

acid anhydride group-containing vinyl monomers such as anhydrous maleic acid and anhydrous itaconic acid;

carboxyl group-containing ethylenically unsaturated monomers such as crotonic acid, fumaric acid, itaconic acid, maleic acid, citraconic acid, monomethyl maleate, monoethyl maleate, monobutyl maleate, monooctyl maleate, monomethyl itaconate, monoethyl itaconate, monobutyl itaconate, monooctyl itaconate, monomethyl fumarate, monoethyl fumarate, monobutyl fumarate, monooctyl fumarate, and monoethyl citraconate;

unsaturated dicarboxylic acid diester monomers such as dimethyl maleate, dibutyl maleate, dimethyl fumarate, dibutyl fumarate, dibutyl itaconate, and diperfluorocyclohexyl fumarate;

halogenated olefins such as vinylidene chloride, vinylidene fluoride, and chlorotrifluoroethylene; and polyfunctional monomers such as ethylene glycol di(meth)acrylate, diethylene glycol di(meth)acrylate, triethylene glycol di(meth)acrylate, polyethylene glycol di(meth)acrylate, 1,4-butanediol di(meth)acrylate, 1,6-hexanediol di(meth)acrylate, neopentyl glycol di(meth)acrylate, 1,9-nonanediol di(meth)acrylate, 1,10-decanediol di(meth)acrylate, trimethylolpropane tri(meth)acrylate, pentaerythritol tetra (meth)acrylate, dipentaerythritol hexa(meth)acrylate, allyl methacrylate, triallyl cyanurate, diallyl maleate, and polypropylene glycol diallyl ether.

As the macromonomer (b), a macromonomer in which a radically polymerizable group is introduced into the terminal of the main chain containing two or more constitutional units (b') is preferable, and a macromonomer represented by the following formula (b-1) is more preferable.

[Chem. 12]

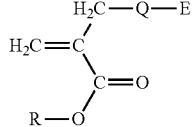

(b-1)

(Where, R is synonymous with R defined above, Q represents the main chain moiety containing two or more constitutional units (b'), and E represents a terminal group.)

In the formula (1), R is the same as R in $CH_2=C(COOR)-CH_2-$ described above, and a preferred aspect thereof is also the same.

Two or more constitutional units (b') contained in Q may be the same as or different from each other.

Q may be composed only of the constitutional unit (b') or may further contain constitutional units other than the constitutional unit (b').

The number of constitutional units constituting Q is preferably a value at which the number average molecular weight of the macromonomer (b) falls within the preferred range to be described later.

Examples of E may include a hydrogen atom, a group derived from a radical polymerization initiator, and a radically polymerizable group in the same manner as the terminal group of a polymer to be obtained by known radical polymerization.

As the macromonomer (b), a macromonomer represented by the following formula (b-2) is particularly preferable.

[Chem. 13]

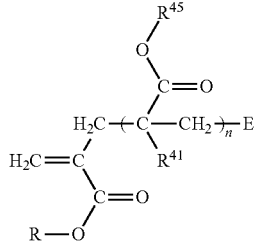

(b-2)

(Where, R, $R^{41}$, $R^{45}$, and E are synonymous with those defined above, respectively, and n represents a natural number 2 or greater.)

n is a natural number 2 or greater, n is preferably within a range in which the number average molecular weight (Mn) of the macromonomer (b) is from 500 to 50000. A more preferred range of the number average molecular weight is as follows. The n $R^{41}$s may be the same as or different from one another. The n $R^{42}$s may be the same as or different from one another.

The number average molecular weight (Mn) of the macromonomer (b) is preferably from 500 to 50,000, more preferably 500 or more and less than 50,000, still more preferably from 800 to 30,000, and particularly preferably from 1000 to 20,000. When the number average molecular weight of the macromonomer (b) is equal to or higher than the lower limit value of the above range, the hardness and water resistance of the coating film are superior. When the number average molecular weight of the macromonomer (b) is equal to or lower than the upper limit value of the above range, the storage stability of a solution of the copolymer (A-1) and a polymer-containing composition and an anti-fouling coating composition which contain this is superior.

The number average molecular weight of the macromonomer (b) is measured by gel permeation chromatography (GPC) using polystyrene as a reference substance.

The number average molecular weight of the macromonomer (b) can be adjusted by the amount of polymerization initiator or chain transfer agent used at the time of the production of the macromonomer (b), and the like.

Hence, a macromonomer having two or more constitutional units (b') and a number average molecular weight (Mn) of from 500 to 50,000 is preferable as the macromonomer (b). A preferred kind of the constitutional unit (b') in this macromonomer and a more preferred range of the number average molecular weight are the same as those described above.

The glass transition temperature of the macromonomer (b) is preferably from −50° C. to 120° C., more preferably from −20° C. to 100° C., and still more preferably from 20° C. to 80° C. When the glass transition temperature of the macromonomer (b) is equal to or higher than the lower limit value of the above range, the hardness and water resistance of the coating film are superior. When the glass transition temperature of the macromonomer (b) is equal to or lower than the upper limit value of the above range, the storage stability of a solution of the copolymer (A-1) and a composition containing this (polymer-containing composition and anti-fouling coating composition) is superior. In addition, these solution and compositions are likely to have a low viscosity even though the solid content thereof is high.

The glass transition temperature of the macromonomer (b) can be measured by using a differential scanning calorimeter (DSC).

The glass transition temperature of the macromonomer (b) can be adjusted by the composition of the monomer forming the macromonomer (b) and the like.

As the macromonomer (b), one produced by a known method or a commercially available one may be used.

Examples of a method for producing the macromonomer (b) may include a method in which the macromonomer (b) is produced by using a cobalt chain transfer agent, a method in which an α-substituted unsaturated compound such as α-methylstyrene dimer is used as a chain transfer agent, and a method in which a radically polymerizable group is chemically bonded to a polymer, and a method by thermal decomposition.

Among these, as a method for producing the macromonomer (b), a method in which the macromonomer (b) is produced by using a cobalt chain transfer agent is preferable from the viewpoint of having a smaller number of production steps and using a catalyst having a high chain transfer constant. Incidentally, the macromonomer (b) in the case of being produced by using a cobalt chain transfer agent has the structure represented by the formula (b-1).

Examples of a method for producing the macromonomer (b) by using a cobalt chain transfer agent may include a bulk polymerization method, a solution polymerization method, and a water-based dispersion polymerization method such as a suspension polymerization method or an emulsion polymerization method. A water-based dispersion polymerization method is preferable from the viewpoint that the recovery step is simple.

Examples of a method for chemically bonding a radically polymerizable group to a polymer may include a method in which the halogen group of a polymer having a halogen group is substituted with a compound having a radically polymerizable carbon-carbon double bond to produce the macromonomer (b), a method in which a vinyl-based monomer having an acid group is reacted with a vinyl-based polymer having an epoxy group, a method in which a vinyl-based polymer having an epoxy group is reacted with a vinyl-based monomer having an acid group, and a method in which a vinyl-based polymer having a hydroxyl group is reacted with a diisocyanate compound to obtain a vinyl-based polymer having an isocyanate group and this vinyl-based polymer is reacted with a vinyl-based monomer having a hydroxyl group, and the macromonomer (b) may be produced by any method.

(Constitutional Unit (C))

The constitutional unit (C) is not particularly limited, and examples thereof may include monomer (c) units other than the monomer (a1), the monomer (a2), the monomer (a3), and the macromonomer (b).

The monomer (c) is not particularly limited as long as it is copolymerizable with the monomer (a1), the monomer (a2), and the macromonomer (b), and various monomers having a radically polymerizable group such as an ethylenically unsaturated bond can be used. For example, the same monomer as the monomer (b1) for obtaining the macromonomer (b) mentioned above can be used (however, the monomer (a1), the monomer (a2), and the monomer (a3) are excluded). One kind or two or more kinds of monomers (c) can be appropriately selected and used if necessary.

From the viewpoint that a solution obtained when the copolymer (A-1) is dissolved in an organic solvent is likely to have a low viscosity even though the solid content thereof is high, the monomer (c) is preferably a monofunctional monomer having one ethylenically unsaturated bond and it is particularly preferable that the ethylenically unsaturated bond is derived from an acryloyl group. In other words, the monomer (c) is particularly preferably a monofunctional monomer having one acryloyl group.

The monomer (c) preferably contains a hydrophobic group-containing (meth)acrylic acid ester monomer from the viewpoint that the flexibility and crack resistance/peeling resistance of the coating film to be formed and long-term self-polishing properties can be favorably exhibited in a well-balanced manner.

Examples of the hydrophobic group-containing (meth)acrylic acid ester monomer may include substituted or unsubstituted alkyl (meth)acrylates [for example, methyl (meth)acrylate, ethyl (meth)acrylate, n-propyl (meth)acrylate, i-propyl (meth)acrylate, n-butyl (meth)acrylate, i-butyl (meth)acrylate, t-butyl (meth)acrylate, 2-ethylhexyl (meth)acrylate, lauryl (meth)acrylate, stearyl (meth)acrylate, behenyl (meth)acrylate, 1-methyl-2-methoxyethyl (meth)acrylate, 3-methoxybutyl (meth)acrylate, and 3-methyl-3-methoxybutyl (meth)acrylate], substituted or unsubstituted aralkyl (meth)acrylates [for example, benzyl (meth)acrylate, m-methoxyphenylethyl (meth)acrylate, and p-methoxyphenylethyl (meth)acrylate], substituted or unsubstituted aryl (meth)acrylates [for example, phenyl (meth)acrylate, m-methoxyphenyl (meth)acrylate, p-methoxyphenyl (meth)

acrylate, and o-methoxyphenylethyl (meth)acrylate], alicyclic (meth)acrylates [for example, isobornyl (meth)acrylate and cyclohexyl (meth)acrylate], trifluoroethyl (meth)acrylate, perfluorooctyl (meth)acrylate, and perfluorocyclohexyl (meth)acrylate, and alkyl (meth)acrylates are preferable.

The monomer (c) preferably contains an oxyethylene group-containing (meth)acrylic acid ester monomer from the viewpoint of solubility and crack resistance of the coating film to be formed.

As the oxyethylene group-containing (meth)acrylic acid ester monomer, a monomer represented by the following formula (c-1) is preferable.

$$Z^1\text{—}(CH_2CH_2O)_pR^{57} \qquad (c\text{-}1)$$

(Where, $Z^1$ represents a (meth)acryloyloxy group, $R^{57}$ represents a hydrogen atom, an alkyl group having from 1 to 10 carbon atoms, or an aryl group, and p represents an integer from 1 to 15).

The hydrolysis rate tends to be faster in the case of an acryloyloxy group between a case in which $Z^1$ in the formula (c-1) is an acryloyloxy group and a case in which $Z^1$ is a methacryloyloxy group, and $Z^1$ can be arbitrarily selected according to the rate of dissolution.

Examples of each of the alkyl group having from 1 to 10 carbon atoms and the aryl group of $R^{57}$ may include the same groups as those of $R^3$ mentioned above.

From the viewpoint of water resistance and crack resistance, p is preferably an integer from 1 to 10, more preferably an integer from 1 to 5, still more preferably an integer from 1 to 3, and particularly preferably 1 or 2.

It is preferable that the monomer (c) does not have a carboxyl group from the viewpoint of the water resistance and degree of consumption of the coating film to be formed.

It is possible to purchase the monomer (c) as a commercially available product or to appropriately synthesize the monomer (c) by a known method.

(Content of Constitutional Unit)

The content (including a case in which any one of the constitutional units is not contained) of the sum of the constitutional unit (A1) and the constitutional unit (A2) in the copolymer (A-1) is preferably from 1% to 80% by mass, more preferably from 10% to 70% by mass, and still more preferably from 20% to 60% by mass with respect to the sum (100% by mass) of all the constitutional units. The self-polishing properties of the coating film to be formed are superior when the content of the sum of the constitutional unit (A1) and the constitutional unit (A2) is equal to or higher than the lower limit value of the above range. When the content of the sum of the constitutional unit (A1) and the constitutional unit (A2) is equal to or lower than the upper limit value of the above range, the coating film to be formed exhibits proper hydrolyzability, the self-polishing properties are maintained over a long period of time, and the anti-fouling effect is superior.

The content of the constitutional unit (B) in the copolymer (A-1) is preferably from 1% to 60% by mass, more preferably from 2% to 40% by mass, and still more preferably from 5% to 30% by mass with respect to the sum (100% by mass) of all the constitutional units. The hardness and water resistance of the coating film to be formed are superior when the content of the constitutional unit (B) is equal to or higher than the lower limit value of the above range. When the content of the constitutional unit (B) is equal to or lower than the upper limit value of the above range, the viscosity of a solution obtained when the copolymer (A-1) is dissolved in an organic solvent and the viscosity of the polymer composition and anti-fouling coating composition which contain this solution are lower.

The content of the constitutional unit (A3) in the copolymer (A-1) may be, for example, 0% to 97% by mass with respect to the sum (100% by mass) of all the constitutional units.

The content of the constitutional unit (C) is preferably from 0% to 98% by mass, more preferably from 5% to 88% by mass, and still more preferably from 10% to 75% by mass with respect to the sum (100% by mass) of all the constitutional units.

In a case in which the constitutional unit (C) has a constitutional unit derived from a hydrophobic group-containing (meth)acrylic acid ester monomer, the content of this constitutional unit is preferably from 1% to 90% by mass and more preferably from 10% to 80% by mass with respect to the sum of all the constitutional units in the copolymer (A-1). When the content of this constitutional unit is within the above range, flexibility, crack resistance, and peeling resistance of the coating film to be formed are further enhanced and the anti-fouling effect is superior. When the content of this constitutional unit is equal to or lower than the upper limit value of the above range, the coating film to be formed exhibits proper hydrolyzability, the self-polishing properties are maintained over a long period of time, and the anti-fouling effect is superior.

In a case in which the constitutional unit (C) has a constitutional unit derived from an oxyethylene group-containing (meth)acrylic acid ester monomer, the content of this constitutional unit is preferably from 1% to 80% by mass, and more preferably from 5% to 60% by mass, and still more preferably from 20% to 50% by mass with respect to the sum of all the constitutional units in the copolymer (A-1). When the content of this constitutional unit is equal to or higher than the lower limit value of the above range, the hydrophilicity of the coating film to be formed is further enhanced and the self-polishing properties are superior. When the content of this constitutional unit is equal to or lower than the upper limit value of the above range, the coating film to be formed exhibits proper hydrolyzability, the self-polishing properties are maintained over a long period of time, and the anti-fouling effect is superior.

Incidentally, the sum of the constitutional unit (A1), the constitutional unit (A2), the constitutional unit (A3), the constitutional unit (B), and the constitutional unit (C) is 100% by mass.

The content (% by mass) of each constitutional unit in the copolymer can be measured by known methods such as gas chromatography, high performance liquid chromatography, and nuclear magnetic resonance spectroscopy.

The copolymer (A-1) is preferably a copolymer obtained by polymerizing a monomer mixture containing at least one kind of monomer (a') selected from the group consisting of the monomer (a1) and the monomer (a2) and the macromonomer (b). Such a copolymer exhibits superior water resistance to a copolymer obtained by polymerizing a monomer mixture (β1) containing the monomer (a0) having an ethylenically unsaturated bond and a carboxyl group and the macromonomer (b) to obtain a copolymer (A0) having a carboxyl group and converting the carboxyl group of this copolymer (A0) into the structure (I).

The monomer mixture is preferably composed of from 1% to 80% by mass of the monomer (a'), from 1% to 60% by mass of the macromonomer (b), and from 0 to 98% by mass of the monomer (c). The content of each monomer is the proportion with respect to the total amount of the monomer mixture. A more preferred content range of each monomer is the same as the preferred content range of the constitutional unit derived from each monomer.

The weight average molecular weight (Mw) of the copolymer (A-1) is preferably from 2,000 to 100,000, more preferably from 3,000 to 50,000, still more preferably from 5,000 to 30,000, and particularly preferably from 10,000 to 20,000.

When the weight average molecular weight of the copolymer (A-1) is equal to or lower than the upper limit value of the above range, the viscosity of a solution in which the copolymer (A-1) is dissolved in an organic solvent is lower and one having a high solid content but a low viscosity is likely to be obtained as an anti-fouling coating composition containing this solution. The hardness, durability, and the like of the coating film to be formed are superior when the weight average molecular weight of the copolymer (A-1) is equal to or higher than the lower limit value of the above range.

The number average molecular weight (Mn) of the copolymer (A-1) is preferably from 1,000 to 50,000, more preferably from 2,000 to 25,000, still more preferably from 2,500 to 15,000, and particularly preferably from 5,000 to 10,000.

The weight average molecular weight and the number average molecular weight are measured by gel permeation chromatography (GPC) using polystyrene as a reference substance, respectively.

The acid value of the copolymer (A-1) is preferably 5 mg KOH/g or less and more preferably 1 mg KOH/g or less, and may be 0 mg KOH/g. The water resistance of the coating film to be formed and the storage stability of the coating are superior when the acid value of the copolymer (A-1) is equal to or lower than the upper limit value.

The acid value is measured by neutralization titration using a potassium hydroxide solution.

The copolymer (A-1) is preferably a chain polymer which does not have a crosslinked structure. When the copolymer (A-1) is in a chain form, the viscosity of the solution in which the copolymer (A-1) is dissolved in an organic solvent is lower as compared to a case in which the copolymer (A-1) has a crosslinked structure.

(Method for Producing Copolymer (A-1))

Examples of a method for producing the copolymer (A-1) may include the following production method ($\alpha$).

Production method ($\alpha$): a method in which a monomer mixture ($\alpha$1) containing at least one kind of monomer (a') selected from the group consisting of the monomer (a1) and the monomer (a2) and the macromonomer (b) is polymerized.

The monomer mixture ($\alpha$1) may further contain the monomer (a3) and the other monomers (c).

The copolymer (A-1) can also be produced by the following production method ($\beta$) in a case in which the copolymer (A-1) has the constitutional unit (A1).

Production method ($\beta$): a method in which a monomer mixture ($\beta$1) containing the monomer (a0) having an ethylenically unsaturated bond and a carboxyl group and the macromonomer (b) is polymerized to obtain a copolymer (A0) having a carboxyl group and the carboxyl group of this copolymer (A0) is converted into the structure (I).

The monomer mixture ($\beta$1) may further contain the monomer (a2), the monomer (a3), and the other monomers (c).

"Production Method ($\alpha$)"

In the production method ($\alpha$), the composition of the monomer mixture ($\alpha$1), namely, the kinds of the monomers constituting the monomer mixture ($\alpha$1) and the content (% by mass) of each monomer with respect to the total mass of all the monomers is the same as the composition of the copolymer (A-1), namely, the kinds of the constitutional units derived from the respective monomers constituting the copolymer (A-1) and the content (% by mass) of each constitutional unit with respect to the total mass of all the constitutional units.

The polymerization of the monomer mixture ($\alpha$1) can be conducted in the same manner as the polymerization of the monomer mixture in the method for producing a (meth) acrylic copolymer of the sixth aspect to be described later.

"Production Method ($\beta$)" In the production method ($\beta$), the composition of the monomer mixture ($\beta$1) is the same as the composition of the copolymer (A-1) except that the monomer (a1) is the monomer (a0). The monomer (a0) is the same as that mentioned in the description of the monomer (a1). The polymerization of the monomer mixture ($\beta$1) can be conducted in the same manner as the polymerization of the monomer mixture ($\alpha$1) in the production method ($\alpha$).

Examples of a method for converting the carboxyl group of the copolymer (A0) into the structure (I) may include a method in which the copolymer (A0) is reacted (addition reaction) with at least one kind of alkenyl compound selected from the group consisting of a compound represented by the formula (11), a compound represented by the formula (12), and a compound represented by the formula (13).

Examples of the alkenyl compound may include the same compounds as those described above.

The reaction of the copolymer (A0) with 1-alkenyl ether can be conducted in the same manner as the reaction of the monomer (a0) with an alkenyl compound.

(Effect)

The copolymer (A-1) is hydrolyzable in the sea water and the like since it has at least one kind of constitutional unit selected from the group consisting of the constitutional unit (A1) and the constitutional unit (A2). Hence, the coating film containing the copolymer (A-1) exhibits self-polishing properties in the sea water and the like. In other words, the copolymer (A-1) has either or both of the structure (I) and the triorganosilyloxycarbonyl group, and it does not dissolve in the sea water in this state, but the copolymer (A-1) dissolves in the sea water as a carboxyl group and the like are generated when the structure (I) and the triorganosilyloxycarbonyl group are hydrolyzed by contact with the sea water. The surface of the coating film gradually dissolves in the sea water and the surface to be renewed (self-polished). Hence, the coating film formed of the anti-fouling coating composition containing the copolymer (A-1) also exhibits self-polishing properties. The surface of this coating film is renewed in the seawater to exhibit anti-fouling properties. Particularly in a case in which the coating film contains an anti-fouling agent, the anti-fouling agent is always exposed on the surface of the coating film and an excellent anti-fouling effect is exerted over a long period of time.

In addition, it is possible to form a coating film which exhibits excellent water resistance and hardness since the copolymer (A-1) has at least one kind of constitutional unit selected from the group consisting of the constitutional unit (A1) and the constitutional unit (A2) and the constitutional unit (B). Furthermore, this coating film can exhibit an excellent degree of consumption and excellent adhesive properties to a substrate. The damage or peeling off of the coating film to cause a decrease in the anti-fouling effect and a time dependent decrease in the degree of consumption hardly occur. Hence, the coating film exhibits excellent static anti-fouling properties in the sea water and the like and stably exerts the anti-fouling effect over a long period of time.

In addition, a polymer-containing composition containing the copolymer (A-1) and an organic solvent can be prepared in the form of a solution having a high solid content but a low viscosity and also exhibits excellent storage stability as the copolymer (A-1) has at least one kind of constitutional unit selected from the group consisting of the constitutional unit (A1) and the constitutional unit (A2) and the constitutional unit (B). When the polymer-containing composition has a high solid content but a low viscosity, an anti-fouling coating composition exhibiting paintability can be obtained even without adding an organic solvent at the time of production of the anti-fouling coating composition. In addition, the polymer-containing composition can be favorably mixed with an anti-fouling agent and the like without adding an organic solvent in the case of adding an anti-fouling agent and the like. Hence, an anti-fouling coating composition having a low VOC content (for example, 430 g/L or less) can be obtained.

Conventionally, the hardness of the coating film tends to decrease when it is attempted to obtain an anti-fouling coating composition having a high solid content but a low viscosity. By using the copolymer (A-1) in the anti-fouling coating composition, a coating film having an excellent hardness can be formed even when the anti-fouling coating composition has a high solid content but a low viscosity.

In addition, in the copolymer (A-1), there is a tendency that the rate of increase in the hardness of the coating film immediately after painting is fast and the block resistance of the coating film is high after a coating containing the copolymer (A-1) is painted to form a coating film. It takes time to sufficiently increase the hardness of the coating film when this rate of increase is slow. The coating film is deformed and the appearance and the like deteriorate when the painted article is moved before the hardness of the coating film is sufficiently increased, and it thus takes time to advance the next step after painting. It is preferable that the rate of increase in the hardness of the coating film is fast from the viewpoint of productivity.

The copolymer (A-1) is suitable for an anti-fouling coating composition. However, the application of the copolymer (A-1) is not limited to an anti-fouling coating composition, and the copolymer (A-1) can also be used in other applications, for example, an anti-fogging coating composition and the like.

[Polymer Solution]

A second aspect of the present invention is a polymer solution which contains a (meth)acrylic copolymer (hereinafter also referred to as a "copolymer (A-2)") having a constitutional unit (A3) and a constitutional unit (B) and an organic solvent and has a viscosity of $5 \times 10^4$ mPa·s or less at 25° C.

In the polymer solution, a polymer is dissolved in an organic solvent.

<Copolymer (A-2)>

The copolymer (A-2) can further have a constitutional unit (A1), a constitutional unit (A2), and a constitutional unit (C).

The constitutional unit (B), the constitutional unit (A1), the constitutional unit (A2), and the constitutional unit (C) are the same as those described above, respectively.

At least a part of the constitutional unit of the copolymer (A-2) is a constitutional unit derived from a (meth)acrylic monomer. The proportion of the constitutional unit derived from a (meth)acrylic monomer with respect to the sum (100% by mass) of all the constitutional units in the copolymer (A-2) is preferably from 20% to 100% by mass and more preferably from 40% to 100%.

(Constitutional Unit (A3))

The constitutional unit (A3) has at least one kind of structure (III) selected from the group consisting of structures represented by the following formula (4) or (5).

—COO-M-OCO  (4)

—COO-M-$R^{32}$  (5)

(Where, M represents Zn, Cu, Mg, or Ca and $R^{32}$ represents an organic acid residue other than a (meth)acryloyloxy group.)

As M, Zn or Cu is preferable.

The organic acid residue of $R^{32}$ refers to the residual part (for example, the residual part after the proton is removed from the carboxyl group of carboxylic acid) after one proton is removed from an organic acid, and it is ionically bonded to M instead of this proton.

As the organic acid, carboxylic acid is preferable, and examples thereof may include monocarboxylic acids such as monochloroacetic acid, monofluoroacetic acid, acetic acid, propionic acid, octylic acid, versatic acid, isostearic acid, palmitic acid, cresotic acid, α-naphthoic acid, β-naphthoic acid, benzoic acid, 2,4,5-trichlorophenoxyacetic acid, 2,4-dichlorophenoxyacetic acid, quinolinecarboxylic acid, nitrobenzoic acid, nitronaphthalenecarboxylic acid, pyruvic acid, naphthenic acid, abietic acid, and hydrogenated abietic acid.

$R^{32}$ is preferably a fatty acid residue having from 1 to 20 carbon atoms (aliphatic monocarboxylic acid residue) from the viewpoint of obtaining a highly durable coating film capable of being prevented from cracking and peeling off over a long period of time.

The constitutional unit (A3) is typically a monomer (a3) unit having the structure (III).

Examples of the monomer (a3) having the structure (III) may include a monomer in which an unsubstituted or substituted vinyl group is bonded to both terminals of a group represented by the formula (4) and a monomer in which an unsubstituted or substituted vinyl group is bonded to one terminal (opposite side to the $R^{32}$ side) of a group represented by the formula (5).

Examples of the monomer in which a vinyl group is bonded to both terminals of a group represented by the formula (4) may include a monomer (hereinafter also referred to as a "monomer (a3-1)" represented by the following formula (a3-1).

Examples of the monomer in which a vinyl group is bonded to one terminal of a group represented by the formula (5) may include a monomer (hereinafter also referred to as a "monomer (a3-2)" represented by the following formula (a3-2).

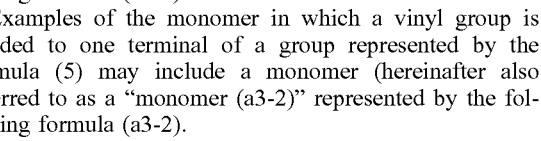

$(CH_2=C(R^{31})-CO-O)_2M$  (a3-1)

$CH_2=C(R^{31})-CO-O-M-R^{32}$  (a3-2)

Where, M represents Zn, Cu, Mg, or Ca, $R^{31}$ represents a hydrogen atom or a methyl group, and $R^{32}$ represents an organic acid residue other than a (meth)acryloyloxy group.

M and $R^{32}$ are the same as those described above, respectively, and preferred aspects thereof are also the same.

Examples of the monomer (a3-1) may include zinc acrylate $[(CH_2=CHCOO)_2Zn]$, zinc methacrylate $[(CH_2=C(CH)COO)_2 Zn]$, copper acrylate $[(CH_2=CHCOO)_2Cu]$, copper methacrylate $[(CH_2=C(CH_3)COO)_2Cu]$, magnesium acrylate [(CH$_2$=CHCOO)$_2$Mg], magnesium methacrylate [(CH$_2$=C(CH$_3$)COO)$_2$Mg], calcium acrylate [(CH$_2$=CHCOO)$_2$Ca], and calcium methacrylate [(CH$_2$=C(CH$_3$)COO)$_2$Ca]. Any one kind of these may be used singly or two or more kinds thereof may be used in combination.

Among these, zinc (meth)acrylate and copper (meth)acrylate are preferable from the viewpoint that the transparency of the copolymer (A-2) increases and the color tone of the coating film containing this tends to be beautiful.

Examples of the monomer (a3-2) may include monochloroacetic acid magnesium (meth)acrylate, monochloroacetic acid calcium (meth)acrylate, monochloroacetic acid zinc (meth)acrylate, and monochloroacetic acid copper (meth)acrylate; monofluoroacetic acid magnesium (meth)acrylate, monofluoroacetic acid calcium (meth)acrylate, monofluoroacetic acid zinc (meth)acrylate, and monofluoroacetic acid copper (meth)acrylate; acetic acid magnesium (meth)acrylate, acetic acid calcium (meth)acrylate, acetic acid zinc (meth)acrylate, and acetic acid copper (meth)acrylate; propionic acid magnesium (meth)acrylate, propionic acid calcium (meth)acrylate, propionic acid zinc (meth)acrylate, and propionic acid copper (meth)acrylate; octylic acid magnesium (meth)acrylate, octylic acid calcium (meth)acrylate, octylic acid zinc (meth)acrylate, and octylic acid copper (meth)acrylate; versatic acid magnesium (meth)acrylate, versatic acid calcium (meth)acrylate, versatic acid zinc (meth)acrylate, and versatic acid copper (meth)acrylate; isostearic acid magnesium (meth)acrylate, isostearic acid calcium (meth)acrylate, isostearic acid zinc (meth)acrylate, and isostearic acid copper (meth)acrylate; palmitic acid magnesium (meth)acrylate, palmitic acid calcium (meth)acrylate, palmitic acid zinc (meth)acrylate, and palmitic acid copper (meth)acrylate; cresotinic acid magnesium (meth)acrylate, cresotinic acid calcium (meth)acrylate, cresotinic acid zinc (meth)acrylate, and cresotinic acid copper (meth)acrylate; α-naphthoic acid magnesium (meth)acrylate, α-naphthoic acid calcium (meth)acrylate, α-naphthoic acid zinc (meth)acrylate, and α-naphthoic acid copper (meth)acrylate; β-naphthoic acid magnesium (meth)acrylate, β-naphthoic acid calcium (meth)acrylate, β-naphthoic acid zinc (meth)acrylate, and β-naphthoic acid copper (meth)acrylate; benzoic acid magnesium (meth)acrylate, benzoic acid calcium (meth)acrylate, benzoic acid zinc (meth)acrylate, and benzoic acid copper (meth)acrylate; 2,4,5-trichlorophenoxyacetic acid magnesium (meth)acrylate, 2,4,5-trichlorophenoxyacetic acid calcium (meth)acrylate, 2,4,5-trichlorophenoxyacetic acid zinc (meth)acrylate, and 2,4,5-trichlorophenoxyacetic acid copper (meth)acrylate; 2,4-dichlorophenoxyacetic acid magnesium (meth)acrylate, 2,4-dichlorophenoxyacetic acid calcium (meth)acrylate, 2,4-dichlorophenoxyacetic acid zinc (meth)acrylate, and 2,4-dichlorophenoxyacetic acid copper (meth)acrylate; quinolinecarboxylic acid magnesium (meth)acrylate, quinolinecarboxylic acid calcium (meth)acrylate, quinolinecarboxylic acid zinc (meth)acrylate, and quinolinecarboxylic acid copper (meth)acrylate; nitrobenzoic acid magnesium (meth)acrylate, nitrobenzoic acid calcium (meth)acrylate, nitrobenzoic acid zinc (meth)acrylate, and nitrobenzoic acid copper (meth)acrylate; nitronaphthalenecarboxylic acid magnesium (meth)acrylate, nitronaphthalenecarboxylic acid calcium (meth)acrylate, nitronaphthalenecarboxylic acid zinc (meth)acrylate, and nitronaphthalenecarboxylic acid copper (meth)acrylate; pyruvic acid magnesium (meth)acrylate, pyruvic acid calcium (meth)acrylate, pyruvic acid zinc (meth)acrylate, and pyruvic acid copper (meth)acrylate. Any one kind of these may be used singly or two or more kinds thereof may be used in combination.

Among these, a zinc-containing monomer in which M is Zn is preferable from the viewpoint that the transparency of the copolymer (A-2) increases and the color tone of the coating film containing this tends to be beautiful. Furthermore, a fatty acid zinc (meth)acrylate (in which M in the formula (a3-2) is Zn and $R^{22}$ is a fatty acid residue) or a fatty acid copper (meth)acrylate (M in the formula (a3-2) is Cu and $R^{22}$ is a fatty acid residue) is more preferable from the viewpoint of the durability of the coating film to be obtained.

From the viewpoint of maintaining the self-polishing properties of the coating film to be obtained for a long period of time and obtaining favorable anti-fouling properties, the monomer (a3) can contain both the monomer (a3-1) and the monomer (a3-2). In other words, the copolymer (A-2) can have both the monomer (a3-1) unit and the monomer (a3-2) unit.

As a combination of the monomer (a3-1) with the monomer (a3-2), a combination of zinc (meth)acrylate with a fatty acid zinc (meth)acrylate or a combination of copper (meth)acrylate with a fatty acid copper (meth)acrylate is preferable.

In a case in which the copolymer (A-2) has both the monomer (a3-1) unit and the monomer (a3-2) unit, the ratio (molar ratio) of the monomer (a3-1) unit to the monomer (a3-2) unit in the copolymer (A-2) is that monomer (a3-1) unit/monomer (a3-2) unit is preferably from 10/90 to 90/10, more preferably from 20/80 to 80/20, and still more preferably from 30/70 to 70/30. The crack resistance and adhesive properties of the coating film are excellent when this ratio is 90/10 or less, and the coating tends to have a lower viscosity when this ratio is 10/90 or more.

As the monomer (a3), one produced by a known method or a commercially available one may be used.

The monomer (a3-1) is obtained, for example, by a method in which an inorganic metal compound containing a metal element corresponding to M in the formula (a3-1) is reacted with (meth)acrylic acid in a diluent such as an organic solvent or a reactive diluent having a polymerizable unsaturated group such as an ethylenically unsaturated monomer. The mixture which contains a metal-containing polymerizable monomer and is obtained by this method exhibits excellent compatibility with an organic solvent and other monomers and can be easily polymerized. The reaction is preferably conducted in the presence of water, and the content of water in the reaction product is preferably set to be in a range of from 0.01% to 30% by mass. Examples of the inorganic metal compound may include an oxide, a hydroxide, and a chloride of a metal selected from Zn, Cu, Mg, or Ca.

The monomer (a3-2) is obtained, for example, by a method in which an inorganic metal compound containing a metal element corresponding to M in the formula (a3-2) is reacted with (meth)acrylic acid and an organic acid corresponding to the organic acid residue $R^{32}$ in the formula (a3-2) in a diluent such as an organic solvent or a reactive diluent having a polymerizable unsaturated group such as an ethylenically unsaturated monomer. Examples of the inorganic metal compound may include the same inorganic metal compounds as those for obtaining the monomer (a3-1).

The monomer mixture containing the monomer (a3-1) and the monomer (a3-2) is obtained, for example, by a method in which an inorganic metal compound containing the metal element corresponding to M in the formulas (a3-1) and (a3-2) is reacted with (meth)acrylic acid and an organic acid corresponding to the organic acid residue $R^{32}$ in the formula (a 3-2) in a diluent such as an organic solvent or a reactive diluent such as an ethylenically unsaturated monomer.

At this time, the amount of the organic acid corresponding to $R^{22}$ used is preferably from 0.01 to 3 times by mole, more preferably from 0.01 to 0.95 time by mole, and still more preferably from 0.1 to 0.7 time by mole the amount of the inorganic metal compound. When the content of this organic acid is 0.01 time by mole or more, the self-polishing properties and crack resistance of the coating film to be obtained are more favorable as well as precipitation of solids is suppressed in the production process of the monomer mixture. When the content is 3 times by mole or less, the anti-fouling properties of the coating film to be obtained tend to be maintained for a longer period of time.

(Content of Constitutional Unit)

The content of the constitutional unit (A3) in the copolymer (A-2) is preferably from 1% to 40% by mass and more preferably from 5% to 30% by mass with respect to the sum (100% by mass) of all the constitutional units. The self-polishing properties of the coating film to be formed are superior when the content of the constitutional unit (A3) is equal to or higher than the lower limit value of the above range. The storage stability of the polymer solution and the polymer composition, anti-fouling coating composition, and the like which contain the polymer solution and the adhesive properties of the coating film to be formed, the water resistance thereof in the sea water, and the balance between the hardness and the crack resistance thereof tend to be improved when the content of the constitutional unit (A3) is equal to or lower than the upper limit value of the above range.

The content of the constitutional unit (B) in the copolymer (A-2) is preferably from 1% to 60% by mass, more preferably from 2% to 40% by mass, and still more preferably from 5% to 30% by mass with respect to the sum (100% by mass) of all the constitutional units. The hardness, water resistance in the sea water, and adhesive properties of the coating film to be formed are superior when the content of the constitutional unit (B) is equal to or higher than the lower limit value of the above range. In addition, the polymer solution and the polymer composition and anti-fouling coating composition which contain the polymer solution can have a low viscosity even though the solid content thereof is high. When the content of the constitutional unit (B) is equal to or lower than the upper limit value of the above range, the crack resistance of the coating film to be formed and the storage stability of the polymer solution and the polymer composition, anti-fouling coating composition, and the like which contain the polymer solution are superior.

The total content of the constitutional unit (A1) and the constitutional unit (A2) in the copolymer (A-2) is, for example, from 0% to 30% by mass with respect to the sum (100% by mass) of all the constitutional units.

In a case in which the copolymer (A-2) contains the constitutional unit (C), the content of the constitutional unit (C) is preferably from 10% to 98% by mass, more preferably from 20% to 93% by mass, and still more preferably from 30% to 90% by mass with respect to the sum (100% by mass) of all the constitutional units.

In the copolymer (A-2), the content of a constitutional unit derived from a carboxyl group-containing unsaturated monomer is preferably 10% by mass or less, more preferably 5% by mass or less, and particularly preferably 0% by mass with respect to the sum (100% by mass) of all the constitutional units. In other words, it is particularly preferable that the copolymer (A-2) does not contain a constitutional unit derived from a carboxyl group-containing unsaturated monomer. When the content of a constitutional unit derived from a carboxyl group-containing unsaturated monomer is equal to or lower than the upper limit value, the water resistance of the coating film to be formed and the storage stability of the polymer solution and the polymer composition, anti-fouling coating composition, and the like which contain the polymer solution are superior and the anti-fouling coating composition tends to have a low viscosity even though the solid content thereof is high.

The copolymer (A-2) is preferably a copolymer obtained by polymerizing a monomer mixture containing the monomer (a3) and the macromonomer (b). Such a copolymer exhibits superior water resistance to a copolymer obtained by polymerizing a monomer mixture containing a monomer having an ethylenically unsaturated bond and a carboxyl group and a macromonomer to obtain a copolymer having a carboxyl group and converting the carboxyl group of this copolymer into the structure (III).

The monomer mixture is preferably composed of from 1% to 40% by mass of the monomer (a3), from 1% to 60% by mass of the macromonomer (b), and from 10% to 98% by mass of the monomer (c). The content of each monomer is the proportion with respect to the total amount of the monomer mixture. A more preferred content range of each monomer is the same as the preferred content range of the constitutional unit derived from each monomer.

The weight average molecular weight (Mw) of the copolymer (A-2) is preferably from 2,000 to 100,000, more preferably from 3,000 to 50,000, and still more preferably from 4,000 to 20,000.

The hardness of the coating film is superior when the weight average molecular weight of the copolymer (A-2) is equal to or lower than the upper limit value of the above range. In addition, it is easy to obtain a polymer solution which has a low viscosity even though the solid content thereof is high and a polymer composition, anti-fouling coating composition, and the like which contain the polymer solution and have a low viscosity even though the solid content thereof is high. In addition, the anti-fouling properties of the coating film to be formed are excellent. The hardness and durability of the coating film to be formed are superior when the weight average molecular weight of the copolymer (A-2) is equal to or higher than the lower limit value of the above range.

The number average molecular weight (Mn) of the copolymer (A-2) is preferably from 1,000 to 50,000 and more preferably from 2,000 to 25,000.

The polydispersity (Mw/Mn) of the copolymer (A-2) is preferably from 1.5 to 5.0 and more preferably from 2.2 to 3.0.

The acid value of the copolymer (A-2) is preferably from 1 to 140 mg KOH/g, more preferably from 5 to 130 mg KOH/g, and still more preferably from 10 to 120 mg KOH/g. The water resistance and crack resistance of the coating film are superior when the acid value of the copolymer (A) is equal to or lower than the upper limit value of the above range.

The acid value of the copolymer (A-2) is measured by a known method such as neutralization titration using a potassium hydroxide solution.

The copolymer (A-2) to be contained in the polymer solution of the present aspect may be one kind or two or more kinds.

The content of the copolymer (A-2) in the polymer solution of the present aspect is preferably 85% by mass or less, more preferably from 10% to 80% by mass, still more preferably from 30% to 75% by mass, and particularly preferably from 55% to 75% by mass with respect to the total amount of the polymer solution. A coating film exhibiting excellent water resistance, hardness, and the like tends to be easily obtained when the content of the copolymer (A-2) is equal to or lower than the upper limit value. It is possible to easily obtain an anti-fouling coating composition having a low VOC content when the content of the copolymer (A-2) is equal to or higher than the lower limit value.

<Organic Solvent>

The organic solvent is not particularly limited as long as it can dissolve the copolymer (A-2), and examples thereof may include monohydric alcohol-based solvents such as methyl alcohol, ethyl alcohol, and isopropyl alcohol; polyhydric alcohol-based solvents such as ethylene glycol and 1,2-propylene glycol; ketone-based solvents such as acetone, methyl ethyl ketone, acetyl acetone, and methyl isobutyl ketone; ether-based solvents such as methyl ethyl ether and dioxane; glycol ether-based solvents such as ethylene glycol monoethyl ether, propylene glycol monomethyl ether, propylene glycol monoethyl ether, propylene glycol mono-n-propyl ether, ethylene glycol dimethyl ether, diethylene glycol monomethyl ether, diethylene glycol dimethyl ether, and dipropylene glycol monopropyl ether; glycol acetate-based solvents such as ethylene glycol monoacetate, ethylene glycol diacetate, ethylene glycol monomethyl ether acetate, and propylene glycol monomethyl ether acetate; other ester-based solvents such as n-butyl acetate and ethyl 3-ethoxypropionate; aliphatic hydrocarbon-based solvents such as n-pentane and n-hexane; and aromatic hydrocarbon-based solvents such as toluene, xylene, and solvent naphtha. Any one kind of these organic solvents may be used singly or two or more kinds thereof may be used in combination.

The content of the organic solvent in the polymer solution of the present aspect is not particularly limited as long as it is an amount in which the viscosity of the polymer solution at 25° C. is $5 \times 10^4$ mPa·s or less, but it is typically 30% by mass or more, preferably 45% by mass or more, more preferably 50% by mass or more, and still more preferably 60% by mass or more and may be 100% by mass with respect to the total amount of the polymer solution excluding the copolymer (A-2). A coating film exhibiting excellent water resistance and drying properties tends to be obtained when the content of the organic solvent is equal to or higher than the lower limit value. It is possible to easily obtain an anti-fouling coating composition having a low VOC content when the content of the organic solvent is equal to or lower than the upper limit value.

<Other Components>

The polymer solution of the present aspect may further contain components other than the copolymer (A-2) and the organic solvent.

Examples of the other components may include the same components as the other components in the anti-fouling coating composition to be described later.

The content of the other components is preferably 200% by mass or less and may be 0% by mass with respect to the copolymer (A-2) (100% by mass).

<Viscosity>

The viscosity of the polymer solution of the present aspect at 25° C. is $5 \times 10^4$ mPa·s or less, preferably 5,000 mPa·s or less, more preferably less than 5000 mPa·s, still more preferably less than 4000 mPa·s, still more preferably less than 3000 mPa·s, still more preferably less than 2,000 mPa·s, and particularly preferably less than 1,000 mPa·s. When the viscosity of the polymer solution is equal to or lower than the upper limit value, it is possible to conduct blending of an anti-fouling agent and the like and painting of the polymer solution or the polymer composition containing the polymer solution even without adding an organic solvent thereto for dilution and to obtain an anti-fouling coating composition having a low VOC content.

It is preferable that the viscosity of the polymer solution of the present aspect is equal to or lower than the preferred upper limit value at least at a solid content of 55% by mass.

The lower limit of the viscosity of the polymer solution is not particularly limited, but it is preferably 100 mPa·s or more from the viewpoint of suppressing coating sag at the time of painting.

Hence, the viscosity of the polymer solution at 25° C. is preferably from 100 to $5 \times 10^4$ mPa·s, more preferably from 100 to 5000 mPa·s, still more preferably 100 mPa·s or more and less than 5,000 mPa·s, still more preferably 100 mPa·s or more and less than 4,000 mPa·s, still more preferably 100 mPa·s or more and less than 3,000 mPa·s, still more preferably 100 mPa·s or more and less than 2,000 mPa·s, and particularly preferably 100 mPa·s or more and less than 1,000 mPa·s.

The viscosity of the polymer solution can be adjusted by the solid amount (the contents of the copolymer (A-2) and other components) in the polymer solution, the weight average molecular weight of the copolymer (A-2), the glass transition temperature thereof, the presence or absence of the crosslinked structure therein, and the like. For example, the viscosity tends to be lower as the solid amount, particularly the content of the copolymer (A-2) is lower. In addition, the viscosity tends to be lower as the weight average molecular weight of the copolymer (A-2) is lower or the glass transition temperature thereof is lower.

In the polymer solution of the present aspect, the ratio (VX) determined by the following formula (i) is preferably 20 or less, more preferably 17 or less, and still more preferably 10 or less.

$$\text{Ratio (VX)=viscosity (VB)/solid amount (NV)} \qquad \text{(i)}$$

The viscosity (VB) indicates the viscosity (mPa·s) of a sample (polymer solution) measured at 25° C. by using a B-type viscometer, and the solid amount (NV) indicates the heating residue (% by mass) of the sample. For example, the ratio (VX) is 10 when the viscosity (VB) is 600 mPa·s and the solid amount (NV) is 60% by mass. The solid amount (heating residual) of the sample is measured by the method to be described in Examples later.

When the ratio (VX) is equal to or smaller than the upper limit value, it is possible to blend an anti-fouling agent and the like or to paint the polymer solution or the polymer composition containing the polymer solution even without adding an organic solvent thereto for dilution and to obtain an anti-fouling coating composition having a low VOC content.

(Method for Producing Polymer Solution)

Examples of a method for producing the polymer solution of the present aspect may include a method in which the copolymer (A-2) is produced by the following production method (γ) or (δ), and if necessary, an organic solvent is added to the copolymer (A-2). Among these, a method in which the copolymer (A-2) is produced by the production method (γ), and if necessary, an organic solvent is added to the copolymer (A-2) is preferable from the viewpoint of water resistance.

Production method (γ): a method in which a monomer mixture (γ1) containing the monomer (a3) and the macromonomer (b) is polymerized.

Production method (δ): a method in which a monomer mixture (δ1) containing the monomer (a0) having an ethylenically unsaturated bond and a carboxyl group and the macromonomer (b) is polymerized to obtain a copolymer (A0') having a carboxyl group and the carboxyl group of this copolymer (A0') is converted into the structure (III).

In the production method (γ), the monomer mixture (γ1) may further contain the monomer (a1), the monomer (a2), and the monomer (c). The composition of the monomer mixture (γ1) is the same as the composition of the copolymer (A-2).

The polymerization of the monomer mixture (γ1) can be conducted in the same manner as the polymerization of the monomer mixture in the method for producing a (meth) acrylic copolymer of the sixth aspect to be described later.

In a case in which the polymerization product obtained by polymerization of the monomer mixture (γ1) contains an organic solvent and the viscosity thereof at 25° C. is equal to or lower than the upper limit value, this polymerization product can be used as the polymer solution of the present aspect as it is. An organic solvent may be further added to the polymerization product for decreasing the viscosity, improving handling properties, and the like.

In cases other than the case in which the polymerization product contains an organic solvent and the viscosity thereof at 25° C. is equal to or lower than the upper limit value, an organic solvent is added to the polymerization product or the copolymer (A-2) recovered from the polymerization product to obtain a polymer solution of the present aspect.

In the production method (δ), the monomer mixture (δ1) may further contain the monomer (a1), the monomer (a2), and the monomer (c). The composition of the monomer mixture (δ1) is the same as the composition of the copolymer (A-2) except that the monomer (a3) is the monomer (a0).

The polymerization of the monomer mixture (δ1) can be conducted in the same manner as the polymerization of the monomer mixture in the method for producing a (meth) acrylic copolymer of the sixth aspect to be described later.

Examples of a method for converting the carboxyl group of the copolymer (A0') into the structure (III) may include a method in which the copolymer (A0') is reacted with an organic acid metal salt such as copper acetate or zinc acetate. The metal in the organic acid metal salt corresponds to M described above.

The reaction between the copolymer (A0') and the organic acid metal salt can be conducted, for example, by raising the temperature to the reflux temperature and continuously conducting the reaction for from 10 to 20 hours while removing a mixture of the organic acid such as acetic acid, water, and the organic solvent to be distilled and replenishing the same amount of the organic solvent.

Examples of a preferred embodiment of the method for producing a polymer solution of the present aspect may include the following production method (ε).

Production method (ε): a method in which a monomer mixture (ε1) containing the monomer (a3) and the macromonomer (b) is polymerized in an organic solvent to obtain a polymerization product or the polymerization product obtained by the polymerization is diluted with an organic solvent to obtain a polymer solution of the present aspect.

The monomer mixture (ε1) may further contain the monomer (a1), the monomer (a2), and the monomer (c). The composition of the monomer mixture (ε1) is the same as the composition of the copolymer (A-2).

The polymerization of the monomer mixture (ε1) can be conducted in the same manner as in the polymerization of the monomer mixture in the method for producing a (meth) acrylic copolymer of the sixth aspect to be described later except that it is essential to conduct the polymerization in an organic solvent (that is, to conduct the polymerization by a solution polymerization method).

As the organic solvent to be used in the copolymerization or dilution, a general organic solvent can be used, and examples thereof may include the same organic solvents as those mentioned as the organic solvent of the polymer solution. The organic solvent to be used in the copolymerization and the organic solvent to be used in the dilution may be the same as or different from each other.

In the case of obtaining the polymer solution as a polymerization product, it is preferable to conduct the copolymerization in an organic solvent to be 30% by mass or more with respect to the total amount of the whole reaction system excluding all the monomers. In this case, a preferred range of the proportion of the organic solvent with respect to the total amount of the reaction system excluding all the monomers is the same as a preferred content range of the organic solvent with respect to the total amount of the polymer solution excluding the copolymer (A-2).

The whole reaction system is the sum of all the materials to be used in the copolymerization (various monomers, organic solvent, and radical polymerization initiator, chain transfer agent, and the like to be used if necessary).

In the case of obtaining the polymer solution by diluting the polymerization product with an organic solvent, the copolymerization may be conducted in an organic solvent to be 30% by mass or more or less than 30% by mass with respect to the total amount of the whole reaction system excluding all the monomers.

In this case, the proportion of the organic solvent with respect to the total amount of the reaction system excluding all the monomers is lower than the content of the organic solvent with respect to the total amount of the polymer solution excluding the copolymer (A-2). The lower limit of the proportion of the organic solvent with respect to the total amount of the reaction system excluding all the monomers is not particularly limited, but it is preferably 20% by mass or more since the polymerization stability is more favorable as the viscosity of solution during the polymerization is lower.

(Effect)

The copolymer (A-2) is hydrolyzable in the sea water and the like since it has the constitutional unit (A3). Hence, the coating film containing the copolymer (A-2) exhibits self-polishing properties in the sea water and the like. In other words, the copolymer (A-2) has either or both of the —CO—O-M-O—CO— structure and the —CO—O-M-$R^{32}$ structure, the copolymer (A-2) does not dissolve in the sea water in this state, but the copolymer (A-2) dissolves in the sea water as a carboxyl group and the like are generated when this structure is hydrolyzed by contact with the sea water. The surface of the coating film gradually dissolves in the sea water to be renewed (self-polished). Hence, the coating film formed of the polymer-containing composition containing the polymer solution of the present aspect or the anti-fouling coating composition containing this also exhibits self-polishing properties. This coating film exhibits anti-fouling properties as the surface thereof is renewed in the sea water. Particularly in a case in which the coating film contains an anti-fouling agent, the anti-fouling agent is always exposed on the surface of the coating film and an excellent anti-fouling effect is exerted for a long period of time.

In addition, the polymer solution of the present aspect contains the copolymer (A-2) having the constitutional unit (A3) and the constitutional unit (B) and has a viscosity of $5 \times 10^4$ mPa·s or less, and the coating film to be formed thus exhibits excellent water resistance and hardness. Hence, damage or peeling off of the coating film to cause a decrease in the anti-fouling effect hardly occurs. In addition, the rate of dissolution (degree of consumption) of the coating film in the sea water and the like is sufficiently fast. Hence, the coating film exhibits excellent static anti-fouling properties in the sea water and the like and stably exerts an excellent anti-fouling effect over a long period of time.

In addition, with regard to the polymer solution of the present aspect, the polymer solution and the polymer-containing composition containing this can be prepared in the form of a solution having a high solid content but a low viscosity. An anti-fouling coating composition exhibiting paintability can be obtained even without adding an organic solvent at the time of production of the anti-fouling coating composition when the polymer-containing composition has a high solid content but a low viscosity. In addition, the polymer solution can be favorably mixed with an anti-fouling agent and the like without adding an organic solvent in the case of adding an anti-fouling agent and the like. Hence, an anti-fouling coating composition having a low VOC content (for example, 500 g/L or less) can be obtained.

Conventionally, the hardness of the coating film tends to decrease when it is attempted to obtain an anti-fouling coating composition having a high solid content but a low viscosity. By using the polymer solution of the present aspect in the anti-fouling coating composition, a coating film having an excellent hardness can be formed even in a case in which the anti-fouling coating composition has a high solid content but a low viscosity.

In addition, in the polymer solution of the present aspect, there is a tendency that the rate of increase in the hardness of the coating film immediately after painting is fast and the block resistance of the coating film is high when a coating containing this polymer solution is painted to form a coating film. It takes time to sufficiently increase the hardness of the coating film when this rate of increase is slow. The coating film is deformed and the appearance and the like deteriorate when the painted article is moved before the hardness of the coating film is sufficiently increased, and it thus takes time to advance the next step after painting. It is preferable that the rate of increase in the hardness of the coating film is fast from the viewpoint of productivity.

Hence, the polymer solution of the present aspect is suitable for an anti-fouling coating composition. However, the application of the polymer solution of the present aspect is not limited to an anti-fouling coating composition, and the polymer solution can also be used in other applications, for example, an anti-fogging coating composition.

[Polymer-Containing Composition]

A third aspect of the present invention is a polymer-containing composition (hereinafter also referred to as a "composition (B-1)") containing the copolymer (A-1) of the first aspect.

A fourth aspect of the present invention is a polymer-containing composition (hereinafter also referred to as a "composition (B-2)") containing the polymer solution of the second aspect.

<Composition (B-1)>

The copolymer (A-1) to be contained in the composition (B-1) may be one kind or two or more kinds.

The content of the copolymer (A-1) in the composition (B-1) is preferably 50% by mass or more, more preferably 57% by mass or more, and still more preferably 59% by mass or more with respect to the total mass of the composition (B-1). When the content of the copolymer (A-1) is equal to or higher than the lower limit value, the content of the organic solvent which can be relatively contained in the composition (B-1) decreases and an anti-fouling coating composition having a low VOC content can be easily obtained.

The upper limit of the content of the copolymer (A-1) is not particularly limited, and it may be 100% by mass. In a case in which the composition (B-1) contains an organic solvent, the content of the organic solvent is preferably an amount so that the viscosity of the composition (B-1) at 25° C. is $5 \times 10^4$ or less and it is preferably 80% by mass or less and more preferably 85% by mass or less although it depends on the weight average molecular weight of the copolymer (A-1), the glass transition temperature thereof, the presence or absence of a crosslinked structure therein, and the like as well.

(Organic Solvent)

It is preferable that the composition (B-1) further contains an organic solvent. When the composition (B-1) contains an organic solvent, the coating suitability of the anti-fouling coating composition containing the composition (B-1), the water resistance of the coating film to be formed, the film forming properties, and the like are superior.

The organic solvent is not particularly limited as long as it can dissolve the copolymer (A-1), and examples thereof may include hydrocarbon-based solvents such as toluene and xylene; ether-based solvents such as 1-alkenyl ether; ketone-based solvents such as methyl isobutyl ketone; and ester-based solvents such as n-butyl acetate, propylene glycol monomethyl ether acetate, and ethyl 3-ethoxypropionate. Any one of these may be used singly or two or more kinds thereof may be used in combination.

In a case in which the copolymer (A-1) has the constitutional unit (A1) having the structure (I), it is preferable that the composition (B-1) contains at least one kind of alkenyl compound selected from the group consisting of a compound represented by the formula (11), a compound represented by the formula (12), and a compound represented by the formula (13) as an organic solvent. The storage stability of the composition (B-1) and the anti-fouling coating composition containing this is improved as the composition (B-1) contains the alkenyl compound.

Examples of the alkenyl compound may include the same compounds as those mentioned above. As the alkenyl compound, one kind may be used singly or two or more kinds may be used in combination.

As the alkenyl compound, vinyl ethers such as butyl vinyl ether and isobutyl vinyl ether are preferable among those mentioned above from the viewpoint that the effect of improving the storage stability is superior.

1-Alkenyl ether and other organic solvents may be concurrently used.

The content of the alkenyl compound is preferably 20% by mole or more, more preferably from 30% to 1000% by mole, and still more preferably from 40% to 800% by mole with respect to the structure (I) of the copolymer (A-1). The effect of improving the storage stability is superior when the content of the alkenyl compound is within the above range.

The content of the organic solvent in the composition (B-1) is preferably 43% by mass or less, more preferably 41% by mass or less, and still more preferably 39% by mass or less with respect to the total mass of the composition (B-1).

The content of the organic solvent is preferably an amount so that the viscosity of the composition (B-1) at 25° C. is $5\times10^4$ or less, and it is preferably 30% by mass or more and more preferably 25% by mass or more although it depends on the weight average molecular weight of the copolymer (A-1), the glass transition temperature thereof, the presence or absence of a crosslinked structure therein, and the like as well.

(Other Components)

The composition (B-1) may further contain components other than the copolymer (A-1) and the organic solvent.

Examples of the other components may include the same components as the other components in the anti-fouling coating composition to be described later.

The content of the other components is preferably 300% by mass or less and may be 0% by mass with respect to the copolymer (A-1) (100% by mass).

(Viscosity)

The viscosity of the composition (B-1) at 25° C. is preferably $5\times10^4$ mPa·s or less in a case in which the composition (B-1) contains an organic solvent. A more preferred viscosity is the same as the viscosity of the polymer solution of the second aspect at 25° C.

It is preferable that the viscosity of the composition (B-1) is equal to or lower than the preferred upper limit value at least at a solid content of 55% by mass.

The viscosity of the composition (B-1) to be measured by using a Gardner bubble viscometer is preferably W or less, more preferably V or less, and still more preferably U or less. When the viscosity of the composition (B-1) is equal to or lower than the upper limit value, it is possible to blend an anti-fouling agent and the like or to paint the composition (B-1) even without adding an organic solvent thereto for dilution and to obtain an anti-fouling coating composition having a low VOC content. The lower limit of the viscosity is not particularly limited.

The viscosity of the composition (B-1) can be adjusted by the solid amount (the contents of the copolymer (A-1) and other components) in the composition (B-1), the weight average of the copolymer (A-1), the glass transition temperature thereof, the presence or absence of a crosslinked structure therein, and the like. For example, the viscosity tends to decrease as the solid amount, particularly the content of the copolymer (A-1) is smaller. In addition, the viscosity tends to decrease as the weight average molecular weight of the copolymer (A-1) is lower or the glass transition temperature thereof is lower.

In the composition (B-1), the ratio (VX) determined by the formula (i) is preferably 20 or less, more preferably 17 or less, and still more preferably 10 or less. When the ratio (VX) is equal to or smaller than the upper limit value, it is possible to blend an anti-fouling agent and the like or to paint the composition (B-1) even without adding an organic solvent thereto for dilution and to obtain an anti-fouling coating composition having a low VOC content.

The ratio (VX) is calculated by substituting the viscosity and solid amount of the polymer solution in the formula (i) with the viscosity and solid amount of the composition (B-1), respectively.

The composition (B-1) can be prepared by a known method. For example, the composition (B-1) can be prepared by synthesizing the copolymer (A-1) by the production method described above and, if necessary, blending the copolymer (A-1) thus obtained with an organic solvent and other components.

The composition (B-1) can be used as an anti-fouling coating composition as it is or can be prepared into an anti-fouling coating composition by being mixed with an anti-fouling agent and the like if necessary.

In addition to the anti-fouling coating composition, the composition (B-1) can also be used in an anti-fogging coating composition and the like.

<Composition (B-2)>

The composition (B-2) contains the polymer solution of the second aspect. Hence, the composition (B-2) contains the copolymer (A-2) and an organic solvent.

The composition (B-2) may be composed only of the polymer solution of the second aspect or may further contain other materials in addition to the polymer solution of the second aspect.

Examples of the other materials may include an organic solvent for dilution and other components. Examples of the organic solvent for dilution may include the same solvents as those mentioned as the organic solvent of the polymer solution. The organic solvent in the polymer solution and the organic solvent for dilution may be the same as or different from each other. The other components are the same as those described above.

In the composition (B-2), preferred values of the content of the copolymer (A-2), the content of other components, the viscosity at 25° C., and the ratio (VX) to be determined by the formula (i) are the same as those in the polymer solution, respectively.

The content of the organic solvent in the composition (B-2) is 30% by mass or more, preferably 45% by mass or more, and more preferably 50% by mass or more with respect to the total amount (100% by mass) of the composition (B-2) excluding the copolymer (A-2). The drying properties of the coating film to be obtained are excellent when the content of the organic solvent is equal to or higher than the lower limit value.

The upper limit of the content of the organic solvent is not particularly limited, but for example, it can be 100% by mass or less with respect to the copolymer (A-2). An anti-fouling coating composition having a low VOC content is obtained when the content of the organic solvent is equal to or lower than the upper limit value of the above range.

The content of this organic solvent is the total amount of all the organic solvents to be contained in the composition (B-2).

The water content in the composition (B-2) is preferably 15% by mass or less, and more preferably 10% by mass or less. The lower limit thereof is not particularly limited, and it may be 0% by mass. The water content is the proportion of water with respect to the total mass of the composition (B-2). When the water content is equal to or lower than the upper limit value, the water resistance and drying properties of the coating film to be formed of the anti-fouling coating composition containing the composition (B-2) are superior.

The composition (B-2) can be prepared by a known method. For example, the composition (B-2) can be prepared by producing the polymer solution of the second aspect by the production method described above and, if necessary, blending the polymer solution thus obtained with an organic solvent for dilution and other components.

The composition (B-2) can be used as an anti-fouling coating composition as it is or can be prepared into an anti-fouling coating composition by being mixed with an anti-fouling agent and the like if necessary.

In addition to the anti-fouling coating composition, the composition (B-2) can also be used in an anti-fogging coating composition and the like.

Examples of another aspect of the polymer-containing composition may include a polymer-containing composition (hereinafter also referred to as a "composition (B-3)") which contains the polymer solution of the second aspect and has a content of the organic solvent to be 30% by mass or more with respect to the copolymer (A-2).

The content of the organic solvent in the composition (B-3) is preferably 45% by mass or more and more preferably 50% by mass or more with respect to the copolymer (A-2).

The upper limit of the content of the organic solvent is not particularly limited, and for example, it may be the same as that in the composition (B-2).

The composition (B-3) may be composed only of the polymer solution of the second aspect or may further contain other materials in addition to the polymer solution of the second aspect.

Examples of the other materials may include an organic solvent for dilution and other components. Examples of each of these may include the same materials as those described above.

The water content in the composition (B-3) is preferably 15% by mass or less, and more preferably 10% by mass or less. The lower limit thereof is not particularly limited, and it may be 0% by mass.

The composition (B-3) can be prepared in the same manner as the composition (B-2).

The composition (B-3) can be used as an anti-fouling coating composition as it is or can be prepared into an anti-fouling coating composition by being mixed with an anti-fouling agent and the like if necessary.

In addition to the anti-fouling coating composition, the composition (B-3) can also be used in an anti-fogging coating composition and the like.

[Anti-Fouling Coating Composition]

A fifth aspect of the present invention is an anti-fouling coating composition containing the composition (B-1) or the composition (B-2).

The anti-fouling coating composition contains at least the copolymer (A-1) in a case in which the anti-fouling coating composition contains the composition (B-1). The anti-fouling coating composition contains at least the copolymer (A-2) and an organic solvent in a case in which the anti-fouling coating composition contains the composition (B-2).

It is preferable that the anti-fouling coating composition contains an organic solvent even in a case in which the composition (B) is the composition (B-1) and the anti-fouling coating composition does not contain the composition (B-2). In this case, the organic solvent in the anti-fouling coating composition may be an organic solvent derived from the composition (B-1), an organic solvent (one blended at the time of production of the anti-fouling coating composition) which is not derived from the composition (B-1), or a mixture thereof. Examples of the organic solvent which is not derived from the composition (B-1) may include the same organic solvents as those mentioned above.

In a case in which the anti-fouling coating composition contains the composition (B-2), the organic solvent in the anti-fouling coating composition may be only the organic solvent derived from the composition (B-2) or a mixture of the organic solvent derived from the composition (B-1) and an organic solvent (one blended at the time of production of the anti-fouling coating composition) which is not derived from the composition (B-1).

It is preferable that the anti-fouling coating composition of the present aspect further contains an anti-fouling agent.

The anti-fouling coating composition of the present invention may further contain components other than the copolymer (A-1), the copolymer (A-2), the organic solvent, and the anti-fouling agent. The other components may be those derived from the composition (B), those (those blended at the time of production of the anti-fouling coating composition) that are not derived from the composition (B), or a mixture thereof.

<Anti-Fouling Agent>

Examples of the anti-fouling agent may include an inorganic anti-fouling agent and an organic anti-fouling agent, and one kind or two or more kinds of anti-fouling agents can be appropriately selected and used according to the performance required.

Examples of the anti-fouling agent may include copper-based anti-fouling agents such as cuprous oxide, cuprous thiocyanate, and copper powder, compounds of other metals (lead, zinc, nickel, and the like), amine derivatives such as diphenylamine, nitrile compounds, benzothiazole-based compounds, maleimide-based compounds, and pyridine-based compounds. One kind of these may be used singly or two or more kinds thereof may be used in combination.

More specific examples of the anti-fouling agent may include 4-bromo-2-(4-chlorophenyl)-5-(trifluoromethyl)-1H-pyrrole-3-carbonitrile, manganese ethylenebisdithiocarbamate, zinc dimethyldithiocarbamate, 2-methylthio-4-t-butylamino-6-cyclopropylamino-s-triazine, 2,4,5,6-tetrachloroisophthalonitrile, N,N-dimethyldichlorophenyl urea, zinc ethylenebisdithiocarbamate, copper rhodanide, 4,5-dichloro-2-n-octyl-3(2H)isothiazolone, N-(fluorodichloromethylthio)phthalimide, N,N'-dimethyl-N'-phenyl-(N-fluorodichloromethylthio)-sulfamide, 2-pyridinethiol-1-oxide zinc salt, tetramethylthiuram disulfide, Cu-10% Ni solid solution alloy, 2,4,6-trichlorophenylmaleimide-2,3,5, 6-tetrachloro-4-(methylsulfonyl)-pyridine, 3-iodo-2-propynyl butylcarbamate, diiodomethyl paratrisulfone, bisdimethyl dithiocarbamoyl zinc ethylenebisdithiocarbamate, phenyl-(bispyridyl)-bismuth dichloride, 2-(4-thiazolyl)-benzimidazole, medetomidine, and pyridine-triphenylborane.

It is preferable that the anti-fouling agent contains at least one kind selected from the group consisting of cuprous oxide, 4-bromo-2-(4-chlorophenyl)-5-(trifluoromethyl)-1H-pyrrole-3-carbonitrile (hereinafter also referred to as an "anti-fouling agent (1)", pyridine-triphenylborane, and medetomidine among those mentioned above.

In the case of combining cuprous oxide with the anti-fouling agent (1), the blending ratio (mass ratio) therebetween is that cuprous oxide/anti-fouling agent (1) is preferably 80/20 to 99/1 and more preferably 90/10 to 99/1.

Either or both of cuprous oxide and the anti-fouling agent (1) may be combined with anti-fouling agents other than these.

The content of the anti-fouling agent in the anti-fouling coating composition is not particularly limited, but it is preferably from 10 to 200 parts by mass and more preferably from 50 to 150 parts by mass with respect to 100 parts by mass of the copolymer (A-1) or (A-2). The anti-fouling effect of the coating film to be formed is superior when the content of the anti-fouling agent is equal to or higher than the lower limit value of the above range. The self-polishing properties are excellent when the content of the anti-fouling agent is equal to or lower than the upper limit value of the above range.

<Other Components>

Examples of other components may include polymers other than the copolymer (A-1) and the copolymer (A-2).

Examples of other polymers may include a thermoplastic resin (thermoplastic polymer) other than the copolymer (A-1) and the copolymer (A-2).

It is preferable that the anti-fouling coating composition of the present aspect contains a thermoplastic resin other than the copolymer (A-1) and the copolymer (A-2). The physical properties of coating film such as crack resistance and water resistance are improved when the anti-fouling coating composition contains the thermoplastic resin.

Examples of the thermoplastic resin other than the copolymer (A-1) and the copolymer (A-2) may include chlorinated paraffin; chlorinated polyolefins such as chlorinated rubber, chlorinated polyethylene, and chlorinated polypropylene; polyvinyl ether; polypropylene sebacate; partially hydrogenated terphenyl; polyvinyl acetate; (meth)acrylic acid alkyl esters such as a methyl (meth)acrylate-based copolymer, an ethyl (meth)acrylate-based copolymer, a propyl (meth)acrylate-based copolymer, a butyl (meth)acrylate-based copolymer, and a cyclohexyl (meth)acrylate-based copolymer; polyether polyol; an alkyd resin; a polyester resin; vinyl chloride-based resins such as a vinyl chloride-vinyl acetate copolymer, a vinyl chloride-vinyl propionate copolymer, a vinyl chloride-isobutyl vinyl ether copolymer, a vinyl chloride-isopropyl vinyl ether copolymer, and a vinyl chloride-ethyl vinyl ether copolymer; silicone oil; waxes; oils and fats which are solid at normal temperature other than waxes; oils and fats which are liquid at normal temperature such as castor oil and purified products thereof; petrolatum; liquid paraffin; rosin, hydrogenated rosin, naphthenic acid, and fatty acids and divalent metal salts thereof. Examples of waxes may include waxes derived from animals such as beeswax; waxes derived from plants; semisynthetic waxes such as amide-based waxes; and synthetic waxes such as oxidized polyethylene-based wax. Only one kind of these thermoplastic resins may be used singly, or two or more kinds thereof may be used concurrently.

Chlorinated paraffin is preferable from the viewpoint of functioning as a plasticizer and obtaining an effect of improving the crack resistance and peeling resistance of the coating film.

Organic waxes such as semisynthetic waxes and synthetic waxes are preferable and polyethylene wax, oxidized polyethylene wax, and polyamide wax are more preferable from the viewpoint of functioning as an anti-settling agent and an anti-sagging agent and obtaining an effect of improving storage stability of the anti-fouling coating composition and pigment dispersibility.

The content of the thermoplastic resin other than the copolymer (A-1) and the copolymer (A-2) in the anti-fouling coating composition is not particularly limited, but it is preferably from 0.1 to 50 parts by mass and more preferably from 0.1 to 10 parts by mass with respect to 100 parts by mass of the copolymer (A-1) or (A-2). The physical properties of coating film such as crack resistance and water resistance are superior when the content of the thermoplastic resin is equal to or higher than the lower limit value of the above range, and the hydrolyzability is superior when the content is equal to or lower than the upper limit value of the above range.

The anti-fouling coating composition may contain a silicone compound such as dimethylpolysiloxane or silicone oil, a fluorine-containing compound such as fluorinated hydrocarbon, and the like for the purpose of imparting lubricity to the surface of coating film and preventing adhesion of organisms.

The anti-fouling coating composition may contain various kinds of pigments, a dehydrating agent, an anti-foaming agent, a leveling agent, a pigment dispersing agent (for example, an anti-settling agent), an anti-sagging agent, a matting agent, an ultraviolet absorber, an antioxidant, a heat resistance improver, a slipping agent, a preservative, a plasticizer, a viscosity control agent, and the like.

Examples of the pigment may include zinc oxide, talc, silica, barium sulfate, potash feldspar, aluminum hydroxide, magnesium carbonate, mica, carbon black, red iron oxide, titanium oxide, phthalocyanine blue, kaolin, and gypsum. Particularly, zinc oxide and talc are preferable.

Examples of the dehydrating agent may include silicate-based, isocyanate-based, orthoester-based, and inorganic dehydrating agents. More specific examples thereof may include methyl orthofonmate, ethyl orthoformate, methyl orthoacetate, an orthoboronic acid ester, tetraethyl orthosilicate, anhydrous gypsum, calcined gypsum, and synthetic zeolite (molecular sieve). Particularly, molecular sieve is preferable. By adding a dehydrating agent to the anti-fouling coating composition, water is supplemented and the storage stability can be improved.

Examples of the anti-settling agent and anti-sagging agent other than the thermoplastic resin may include a bentonite-based agent, fine powder silica-based agent, a stearate salt, a lecithin salt, and an alkyl sulfonate salt.

Examples of the plasticizer other than the thermoplastic resin may include phthalic acid ester-based plasticizers such as dioctyl phthalate, dimethyl phthalate, dicyclohexyl phthalate, and diisodecyl phthalate; aliphatic dibasic acid ester-based plasticizers such as isobutyl adipate and dibutyl sebacate; glycol ester-based plasticizers such as diethylene glycol dibenzoate and pentaerythritol alkyl ester; phosphoric acid ester-based plasticizers such as tricresyl phosphate (TCP), triaryl phosphate, and trichloroethyl phosphate; epoxy-based plasticizers such as epoxy soybean oil and octyl epoxy stearate; organotin-based plasticizers such as dioctyltin laurate and dibutyltin laurylate; trioctyl trimellitate, and triacetylene. By containing a plasticizer in the anti-fouling coating composition, it is possible to enhance the crack resistance and peeling resistance of the coating film. As the plasticizer, TCP is preferable among those mentioned above.

The anti-fouling coating composition may or may not contain water.

The water content in the anti-fouling coating composition is preferably 15% by mass or less and more preferably 10% by mass or less. The lower limit is not particularly limited, and it may be 0% by mass. The water content is the proportion of water with respect to the total mass of the anti-fouling coating composition. The water resistance and the drying properties of the coating film to be formed of the anti-fouling coating composition are superior when the water content is equal to or lower than the upper limit value.

<VOC Content>

The VOC content in the anti-fouling coating composition of the present invention is preferably 500 g/L or less, more preferably 420 g/L or less, still more preferably 400 g/L or less, and particularly preferably 380 g/L or less.

The VOC content is calculated by the following formula from the values of specific gravity of the anti-fouling coating composition and solid content therein.

$$\text{VOC content (g/L)} = \text{specific gravity of composition} \times 1000 \times (100 - \text{solid content})/100$$

The specific gravity of the anti-fouling coating composition and the solid content therein are each measured by the methods to be described in Examples later, respectively.

The VOC content can be adjusted by the content of the organic solvent.

<Heating Residue>

The heating residue of the anti-fouling coating composition is preferably from 70% to 100% by mass, more preferably from 70% to 90% by mass, and still more preferably from 75% to 80% by mass. The VOC content is sufficiently low when the heating residue of the anti-fouling coating composition is equal to or higher than the lower limit value of the above range. The viscosity of the anti-fouling coating composition is likely to decrease when the residual heating is equal to or lower than the upper limit value of the above range.

The heating residue is measured by the measurement method to be described in Examples later.

<Viscosity>

The viscosity of the anti-fouling coating composition of the present invention at 25° C. is preferably less than 5,000 mPa·s, more preferably less than 4,000 mPa·s, still more preferably less than 3,000 mPa·s, and particularly preferably less than 2,000 mPa·s. It is easy to paint the anti-fouling coating composition when the viscosity of the anti-fouling coating composition is equal to or lower than the upper limit value.

The lower limit of the viscosity of the anti-fouling coating composition at 25° C. is not particularly limited, but it is preferably 100 mPa·s or more, more preferably 200 mPa·s or more, even more preferably 300 mPa·s or more, and particularly preferably 1,000 mPa·s or more from the viewpoint of suppressing coating sag at the time of painting.

Hence, the viscosity of the anti-fouling coating composition at 25° C. is preferably 100 mPa·s or more and less than 5,000 mPa·s, more preferably 200 mPa·s or more and less than 4,000 mPa·s, still more preferably 300 mPa·s or more and less than 3,000 mPa·s, and particularly preferably 500 mPa·s or more and less than 2,000 mPa·s.

The viscosity of the anti-fouling coating composition can be adjusted by the viscosity of the composition (B), the amount of the organic solvent added to the composition (B), and the like.

The anti-fouling coating composition can be prepared by preparing the composition (B), adding an anti-fouling agent, other components, and if necessary, an organic solvent to the composition (B), and mixing these together.

The anti-fouling coating composition of the present aspect can be used in order to form a coating film (anti-fouling coating film) on the surface of a substrate such as a ship, various kinds of fishing nets, port facilities, and underwater structures such as oil fences, bridges, and sea-bottom base.

The coating film using the anti-fouling coating composition of the present aspect can be formed on the surface of a substrate directly or via a ground coating film.

The ground coating film can be formed by using a wash primer, a chlorinated rubber-based or epoxy-based primer, an intermediate coating, or the like.

The coating film can be formed by a known method. For example, coating film can be formed by coating the anti-fouling coating composition on the surface of a substrate or the ground coating film on the substrate by means of brush painting, spray painting, roller painting, immersion painting, or the like and drying the coated anti-fouling coating composition.

The amount of the anti-fouling coating composition coated can be generally set to an amount so that the thickness of the dry coating film is from 10 to 400 μm.

Drying of the coating film can be usually conducted at room temperature, and drying by heating may be conducted if necessary.

[Method for Producing (Meth)acrylic Copolymer]

A sixth aspect of the present invention is a method for producing a (meth)acrylic copolymer, which includes a step of polymerizing a monomer mixture containing at least one kind of monomer (a) selected from the group consisting of a monomer (a1), a monomer (a2), and a monomer (a3) and a macromonomer (b) to obtain a (meth)acrylic copolymer. The monomer mixture may further contain a monomer (c).

The composition of the monomer mixture is the same as the composition of the copolymer (A-2) to be set according to the composition of the (meth)acrylic copolymer to be produced. In other words, the kinds of monomers constituting the monomer mixture and the content (% by mass) of each monomer with respect to the total mass of all the monomers are set to be the same as the kinds of constitutional units derived from the respective monomers constituting the (meth)acrylic copolymer to be produced and the content (% by mass) of each constitutional unit with respect to the total mass of all the constitutional units.

The copolymer (A-1) or the copolymer (A-2) is preferable as the (meth)acrylic copolymer to be produced by the production method of the present aspect.

As a polymerization method of the monomer mixture, for example, it is possible to apply a known polymerization method such as a solution polymerization method, a suspension polymerization method, a bulk polymerization method, or an emulsion polymerization method. A solution polymerization method is preferable from the viewpoint of the productivity and the performance of coating film.

The polymerization may be conducted by a known method using a known polymerization initiator. Examples of the method may include a method in which the monomer mixture described above is reacted in the presence of a radical polymerization initiator at a reaction temperature of from 60° C. to 180° C. (further 60° C. to 120° C.) for from 4 to 14 hours (further from 5 to 10 hours). At the time of polymerization, a chain transfer agent may be used if necessary.

As the radical polymerization initiator, known ones can be used, and examples thereof may include azo-based compounds such as 2,2-azobisisobutyronitrile, 2,2-azobis(2,4-dimethylvaleronitrile), and 2,2-azobis(2-methylbutyronitrile); and organic peroxides such as lauryl peroxide, benzoyl peroxide, cumene hydroperoxide, lauryl peroxide, di-t-butyl peroxide, and t-butyl peroxy-2-ethylhexanoate.

The content of the polymerization initiator is not particularly limited and can be appropriately set. Typically, the content is about from 0.1 to 20 parts by mass with respect to 100 parts by mass of the polymerizable monomer.

As the chain transfer agent, known ones can be used, and examples thereof may include mercaptans such as n-dodecyl mercaptan, thioglycolic acid esters such as octyl thioglycolate, α-methylstyrene dimer, and terpinolene.

The content of the chain transfer agent is not particularly limited and can be appropriately set. Typically, the content is about from 0.0001 to 10 parts by mass with respect to 100 parts by mass of the polymerizable monomer.

The solvent to be used in the solution polymerization is not particularly limited, and a general organic solvent can be used. For example, the solvent can be appropriately selected from the organic solvents mentioned above.

(Effect)

In the method for producing a (meth)acrylic copolymer of the present aspect, a monomer mixture containing the monomer (a) and the macromonomer (b) is polymerized, and the (meth)acrylic copolymer to be obtained can thus exert the same effect as the copolymer (A-1) of the first aspect and the polymer solution of the second aspect. For example, the coating film using this (meth)acrylic copolymer exhibits excellent hardness and water resistance. This coating film also exhibits excellent static anti-fouling properties in the sea water and the like and stably exerts an excellent anti-fouling effect over a long period of time.

By using the production method of the present aspect for the production of the copolymer (A-1) or the copolymer (A-2), it is possible to impart superior hardness and water resistance to the coating film to be formed.

As the reason for that the hardness of the coating film using a (meth)acrylic copolymer obtained by the production method of the present aspect is excellent, a fact that the (meth)acrylic copolymer has a constitutional unit derived from the macromonomer (b) is mentioned. As the reason for that the coating film exhibits excellent water resistance, a fact that the hardness of the coating film is high is considered.

In Patent Literature 2 described above, a monomer mixture which contains a macromonomer and a carboxyl group-containing ethylenically unsaturated monomer but does not contain a divalent metal-containing ethylenically unsaturated monomer is polymerized, a monomer mixture containing a divalent metal-containing ethylenically unsaturated monomer is added dropwise to this polymer and polymerized to obtain a vinyl-based polymer, and water is then added to this vinyl-based polymer to obtain an aqueous resin composition for anti-fouling coating in which a vinyl-based polymer is dispersed in water. The coating film formed of the aqueous resin composition for anti-fouling coating obtained by this method exhibits poor water resistance. It is considered that this is affected by the fact that the macromonomer and the divalent metal-containing ethylenically unsaturated monomer are blended in different monomer mixtures and an amine is contained in order to obtain an aqueous dispersion. In addition, the hardness of the coating film after 1 day is also poor. It is considered that this is because the drying properties of the coating film are low since the resin composition is an aqueous resin composition.

EXAMPLES

Hereinafter, the present invention will be described in more detail with reference to Examples and Comparative Examples, but the present invention is not limited by these examples in any way. Incidentally, parts in Examples represent parts by mass.

The evaluation in Examples was carried out by the following method.

(Solid Content (Heating Residue))

On an aluminum dish, 0.50 g of measurement sample (polymer solution, polymer-containing composition, anti-fouling coating composition, or the like) weighed was put, 3 mL of toluene was added thereto by using a dropping pipet, the mixture was uniformly spread on the bottom of the dish and subjected to preliminary drying. The preliminary drying is a treatment for spreading the measurement sample on the entire dish and facilitating the volatilization of the organic solvent in the main drying. In the preliminary drying, the measurement sample and toluene were heated and dissolved on a water bath at from 70° C. to 80° C. to be evaporated, dried, and hardened. After the preliminary drying, main drying was conducted in a hot air dryer at 105° C. for 2 hours. The heating residue was determined by the following formula from the mass (mass before drying) of the measurement sample before the preliminary drying and the mass (mass after drying) thereof after the main drying, and the value was taken as the solid content.

Heating residue (% by mass)=mass after drying/mass before drying×100

(Gardner Viscosity)

The measurement sample was filled in a dried Gardner bubble viscosity tube (hereinafter also simply referred to as a viscosity tube) to the pointing line of the viscosity tube, and of the viscosity tube was capped with a cork stopper. The viscosity tube containing the measurement sample was vertically immersed in a constant temperature water bath adjusted to a prescribed temperature (25.0±0.1° C.) for at least 2 hours so that the temperature of the measurement sample became constant, a viscosity tube serving as a reference tube and the viscosity tube containing the measurement sample were rotated at the same time by 180°, and the bubble rising rate of the measurement sample was compared to that of the reference tube, thereby determining the viscosity (Gardner viscosity).

(B-Type Viscosity)

The viscosity of the measurement sample was measured at 25° C. by using a B-type viscometer and the value was presented as the B-type viscosity.

(Weight Average Molecular Weight (Mw) and Number Average Molecular Weight (Mn))

(Meth)acrylic copolymer containing constitutional unit (A-3):

The measurement was conducted by using a gel permeation chromatographic (GPC) instrument (HLC-8220 manufactured by Tosoh Corporation). A N,N-dimethylformamide (DMF) solution was prepared so as to contain the (meth)acrylic copolymer at 0.4% by mass, 100 µl of the solution was injected into a device equipped with a column manufactured by Tosoh Corporation (TSK gel α-M (manufactured by Tosoh Corporation, 7.8 mm×30 cm), TSK guard column α (manufactured by Tosoh Corporation, 6.0 mm×4 cm)), and the measurement was conducted at 40° C. The weight average molecular weight (Mw) or the number average molecular weight (Mn) was calculated in terms of standard polystyrene.

(Meth)acrylic copolymer containing at least one kind of constitutional unit selected from the group consisting of constitutional units (A1) and (A2) and macromonomer (b):

The measurement was conducted by using a gel permeation chromatographic (GPC) instrument (HLC-8320 manufactured by Tosoh Corporation). A tetrahydrofuran solution was prepared so as to contain the copolymer and the macromonomer at 0.2% by mass, 10 µl of the solution was injected into a device equipped with a column manufactured by Tosoh Corporation (TSK gel Super HZM-M×HZM-M× HZ 2000, TSK guard column Super HZ-L), the measurement was conducted under the conditions of a flow rate: 0.35 ml/min, an eluent: tetrahydrofuran (stabilizer: BHT), and a column temperature: 40° C., and the weight average molecular weight (Mw) or the number average molecular weight (Mn) was calculated in terms of standard polystyrene.

(Acid Value)

About 0.5 g of the measurement sample was precisely weighed (A (g)) in a beaker, and 50 mL of a toluene/ethanol solution was added thereto. Several drops of phenolphthalein were added to the mixture, and the titration using 0.5 N KOH solution was conducted. (Titre=B (mL), potency of KOH solution=f). The blank measurement was conducted in the same manner (titre=C (mL)), and the calculation was conducted by the following formula.

Acid value (mg KOH/g)={($B-C$)×0.2×56.11×$f$}/$A$/solid content (VOC Content)

The VOC content in the measurement sample was calculated by the following formula.

VOC content (g/L)=specific gravity of measurement sample×1000×(100−solid content)/100

The specific gravity of the measurement sample was calculated by filling the measurement sample in a specific gravity cup having a capacity of 100 mL at 25° C. and measuring the mass.

(Hardness of Coating Film)

The polymer-containing composition was coated on a glass substrate by using a 500 μm applicator and dried at 25° C. for 1 week to form a coating film, thereby obtaining a test plate. The Martens hardness (HM) of the coating film of this test plate was measured by using an ultramicro hardness meter (sample manufactured by FISCHER INSTRUMENTS K.K., trade name: HM 2000). The measurement conditions were dQRST(F)/dt=constant, F (test force)=10 mN/10 s, C (creep time at maximum load)=5 s, maximum indentation load=10 mN, and maximum indentation depth=6 μm. The Martens hardness was measured at three different places of the same coating film, and the average value thereof was taken as the hardness of the coating film.

Incidentally, the Martens hardness (HM) is preferably in a range of from 1.2 to 15.0 N/mm$^2$ and more preferably in a range of from 2.0 to 10.0 N/mm$^2$.

(Hardness of Coating Film After 1 Day)

The hardness of coating film % as measured in the same manner as above except that the drying time was set to 1 day at 25° C.

(Paintability)

The smoothness of the coating film after painting was visually confirmed and paintability was evaluated according to the following criteria.

○: coating film is smooth.

Δ: coating film is slightly uneven.

X: stripes remain on coating film.

(Water Resistance 1 (Whitening))

A sample (polymer-containing composition) was coated on a glass substrate by using a 500 μm applicator and dried at room temperature for 1 week to form a coating film, thereby obtaining a test plate. This test plate was immersed in the sterilized and filtered sea water for 1 month and then dried at room temperature of 20° C. for 1 week. With regard to the degree of whitening, the surface of coating film of the test plate was visually observed. The evaluation was carried out according to the following criteria.

○: whitening is not observed.

Δ: whitening is slightly observed.

X: whitening is considerably observed.

(Water Resistance 2 (Haze))

A sample (polymer-containing composition or anti-fouling coating composition) was coated on a glass substrate by using a 500 μm applicator and dried at room temperature for 1 week to form a coating film, thereby obtaining a test plate. This test plate was immersed in the sterilized and filtered sea water for 1 month and then dried at room temperature of 20° C. for 1 week. The haze of the test plate after drying was measured by using a haze meter (manufactured by MURAKAMI COLOR RESEARCH LABORATORY CO., LTD., trade name: HM-150). It indicates that the degree of whitening of the surface of coating film is lower and the water resistance of coating film is superior as the haze value is smaller.

(Degree of Consumption of Coating Film)

The anti-fouling coating composition was coated on a hard vinyl chloride plate of 50 mm×50 mm×2 mm (thickness) by using an applicator so as to have a dry film thickness of 120 μm and dried to form a coating film, thereby obtaining a test plate. This test plate was attached to a rotating drum installed in the sea water and rotated at a peripheral speed of 7.7 m/s (15 knots), and the film thickness of the coating film after 3 months was measured. The film thickness consumed per month ((120 μm−measured film thickness (μm))/3) was calculated from the measured film thicknesses, and the value was taken as the degree of consumption. The degree of consumption is preferably from 1 to 30 μm/M.

(Static Anti-Fouling Properties)

The anti-fouling coating composition was coated on a sandblasted steel plate of 150 mm×70 mm×1.6 mm (thickness) coated with a rust proof coating in advance by using a brush so as to have a dry film thickness of 120 μm and dried to form a coating film, thereby obtaining a test plate. This test plate was immersed in the sea and allowed to stand still for 3 months, then the proportion (the area occupied by marine organisms) (%) of the area in which the marine organisms adhered with respect to the entire area of the coating film was determined, and it was judged that the static anti-fouling properties were favorable in a case in which the area occupied by marine organisms was 30% or less.

The materials used in the following respective examples are as follows.

Monomer (a1-1): 1-butoxyethyl methacrylate (synthetic product synthesized in Production Example a1-1 to be described later).

Monomer (a1-2): 1-isobutoxyethyl methacrylate (synthetic product synthesized in Production Example a1-2 to be described later).

Monomer (a1-3): 1-(2-ethylhexyloxy)ethyl methacrylate (synthetic product synthesized in Production Example a1-3 to be described later).

Monomer (a2-1): triisopropylsilyl acrylate (TIPX).

Monomer (a3-1): a metal-containing monomer mixture (a synthesized product synthesized in Production Example a3-1 to be described later).

Monomer (a3-2): a metal-containing monomer mixture (synthetic product synthesized in Production Example a3-2 to be described later).

Macromonomer (MM1): a macromonomer which had a number average molecular weight of 1600 and was obtained in Production Example MM1 to be described later.

Macromonomer (MM2): a macromonomer which had a number average molecular weight of 2500 and was obtained in Production Example MM2 to be described later.

Macromonomer (MM3): a macromonomer which had a number average molecular weight of 3,600 and was obtained in Production Example MM3 to be described later.

Macromonomer (MM4): a macromonomer which had a number average molecular weight of 6700 and was obtained in Production Example MM4 to be described later.

MMA: methyl methacrylate.

MA: methyl acrylate.

EA: ethyl acrylate.

BA: n-butyl acrylate.

MTMA: 2-methoxyethyl methacrylate.

MTA: 2-methoxyethyl acrylate.

MAA: methacrylic acid.

AIBN: 2,2'-azobisisobutyronitrile.

AMBN: 2,2'-azobis(2-methylbutyronitrile).

NOFMER MSD: trade name, manufactured by NOF Corporation, α-methylstyrene dimer.

Anti-fouling agent (1): 4-bromo-2-(4-chlorophenyl)-5-(trifluoromethyl)-1H-pyrrole-3-carbonitrile.

Additive (1): TOYOPARAX (registered trademark) 150 (manufactured by Tosoh Corporation, chlorinated paraffin).

Additive (2): DISPARLON (registered trademark) 4200-20 (manufactured by Kusumoto Chemicals, Ltd., oxidized polyethylene wax).

Additive (3): DISPARLON A603-20X (manufactured by Kusumoto Chemicals, Ltd., polyamide wax).

Additive (4): KF-56 (manufactured by Shin-Etsu Chemical Co., Ltd., silicone oil).

Production Example a1-1

With 150.2 parts (1.5 mol) of butyl vinyl ether, 0.24 part of hydroquinone, and 0.47 part of phenothiazine were stirred at room temperature and mixed until the mixture became homogeneous. While blowing air (10 mL/min), 86.1 parts (1.0 mol) of methacrylic acid was added dropwise to the mixture while keeping the temperature of the reaction solution at 60° C. or lower. After the dropwise addition, the temperature of the reaction solution was raised to 80° C. and the reaction was conducted for 5 hours. To the reaction solution, 264.5 parts (3.0 mol) of t-butyl methyl ether was added, these were mixed together, and the organic phase was washed with 350 parts of a 20% by mass aqueous solution of potassium carbonate one time. To the organic phase, 0.06 part of 4-benzoyloxy-2,2,6,6-tetramethylpiperidine-N-oxyl was added, and the low boiling point fraction was distilled off by using an evaporator. The residue thus obtained was distilled under reduced pressure, thereby obtaining 166.9 parts (0.91 mol) of 1-butoxyethyl methacrylate (monomer (a1-1)) having a boiling point of 70° C./5 torr (667 Pa).

Production Example a1-2

With 90.1 parts (0.9 mol) of isobutyl vinyl ether, 0.14 parts of hydroquinone and 0.28 part of phenothiazine were stirred at room temperature and mixed until the mixture became homogeneous. While blowing air (10 mL/min), 51.7 parts (0.6 mol) of methacrylic acid was added dropwise to the mixture while keeping the temperature of the reaction solution at 60° C. or lower. After the dropwise addition, the temperature of the reaction solution was raised to 80° C., and the reaction was conducted for 6 hours. To the reaction solution, 158.7 parts (1.8 mol) of t-butyl methyl ether was added, these were mixed together, and the organic phase was washed with 200 parts of a 20% by mass aqueous solution of potassium carbonate one time. To the organic phase, 0.03 part of 4-benzoyloxy-2,2,6,6-tetramethylpiperidine-N-oxyl was added, and the low boiling point fraction was distilled off by using an evaporator. The residue thus obtained was distilled under reduced pressure, thereby obtaining 97.5 parts (0.52 mol) of 1-isobutoxyethyl methacrylate (monomer (a1-2)) having a boiling point of 60° C./3 torr.

Production Example a1-3

With 171.9 parts (1.1 mol) of 2-ethylhexyl vinyl ether, 0.32 parts of hydroquinone, and 0.61 part of phenothiazine were stirred at room temperature and mixed until the mixture became homogeneous. While blowing air (10 mL/min), 86.1 parts (1.0 mol) of methacrylic acid was added dropwise to the mixture while keeping the temperature of the reaction solution at 60° C. or lower. After the dropwise addition, the temperature of the reaction solution was raised to 80° C., and the reaction was conducted for 5 hours. To the reaction solution, 264.5 parts (3.0 mol) oft-butyl methyl ether was added, these were mixed together, and the organic phase was washed with 135 parts of a 20% by mass aqueous solution of potassium carbonate one time. To the organic phase, 0.07 part of 4-benzoyloxy-2,2,6,6-tetramethylpiperidine-N-oxyl was added, and the low boiling point fraction was distilled off by using an evaporator. The residue thus obtained was distilled under reduced pressure, thereby obtaining 207.0 parts (0.85 mol) of 1-(2-ethylhexyloxy)ethyl methacrylate (monomer (a1-3)) having a boiling point of 99° C./3 torr.

Production Example a3-1

In a four-necked flask equipped with a condenser, a thermometer, a dropping funnel, and a stirrer, 85.4 parts of propylene glycol methyl ether (PGM) and 40.7 parts of zinc oxide were charged, and the temperature of the mixture was raised to 75° C. while stirring it. Subsequently, a mixture composed of 43.1 parts of methacrylic acid, 36.1 parts of acrylic acid, and 5 parts of water was added dropwise from the dropping funnel to the mixture at a constant rate over 3 hours. After the dropwise addition was completed, the state of the reaction solution changed from an opalescent state to a transparent state. After the reaction solution was further stirred for 2 hours, 36 parts of n-butanol was added thereto, thereby obtaining a metal-containing monomer mixture (monomer (a3-1)). The solid content therein was 44.8% by mass.

Production Example a3-2

In a four-necked flask equipped with a condenser, a thermometer, a dropping funnel, and a stirrer, 100 parts of propylene glycol methyl ether (PGM) and 40.7 parts of zinc oxide were charged, and the temperature of the mixture was raised to 75° C. while stirring it. Subsequently, a mixture composed of 30.1 parts of methacrylic acid, 25.2 parts of acrylic acid, and 43.3 parts of octylic acid was added dropwise from the dropping funnel to the mixture at a constant rate over 3 hours. After the dropwise addition was completed, the state of the reaction solution changed from an opalescent state to a transparent state. After the reaction solution was further stirred for 2 hours, 21.3 parts of propylene glycol methyl ether (PGM) was added thereto, thereby obtaining a metal-containing monomer mixture (monomer (a3-2)). The solid content therein was 55.0% by mass.

Production Example MM1

(Production of Dispersing Agent 1)

In a polymerization apparatus equipped with a stirrer, a cooling tube, and a thermometer, 900 parts of deionized water, 60 parts of sodium 2-sulfoethyl methacrylate, 10 parts of potassium methacrylate, and 12 parts of methyl methacrylate (MMA) were charged and stirred, and the temperature of the mixture was raised to 50° C. while purging the interior of the polymerization apparatus with nitrogen. To this, 0.08 part of 2,2'-azobis(2-methylpropionamidine) dihydrochloride was added as a polymerization initiator, and the temperature of the mixture was further raised to 60° C. After the temperature was raised, MMA was continuously added dropwise to the mixture at a rate of 0.24 part/min for 75 minutes by using a dropping pump. The reaction solution was kept at 60° C. for 6 hours and then cooled to room temperature, thereby obtaining a dispersing agent 1 having a solid content of 10% by mass of a transparent aqueous solution.

(Production of Chain Transfer Agent 1)

In a synthesis apparatus equipped with a stirring device, 1.00 g of cobalt(II) acetate tetrahydrate, 1.93 g of diphenyl glyoxime, and 80 ml of diethyl ether which was deoxidized in advance by nitrogen bubbling were charged in a nitrogen atmosphere and stirred at room temperature for 30 minutes. Subsequently, 10 ml of boron trifluoride-diethyl ether complex was added thereto, and the mixture was further stirred for 6 hours. The mixture was filtered, and the solid was washed with diethyl ether and dried in a vacuum for 15 hours, thereby obtaining 2.12 g of a chain transfer agent 1 of a reddish brown solid.

(Production of Macromonomer (MM1))

In a polymerization apparatus equipped with a stirrer, a cooling tube, and a thermometer, 145 parts of deionized water, 0.1 part of sodium sulfate, and 0.25 part of the dispersing agent 1 (solid content: 10% by mass) were charged and stirred to obtain a homogeneous aqueous solution. Next, 100 parts of MMA, 0.008 part of the chain transfer agent 1, and 0.8 part of 1,1,3,3-tetramethylbutylperoxy 2-ethylhexanoate (PEROCTA O (registered trademark) manufactured by NOF CORPORATION) were added to the aqueous solution to prepare an aqueous suspension.

Next, the interior of the polymerization apparatus was purged with nitrogen, the temperature of the aqueous suspension was raised to 80°, the reaction thereof was conducted for 1 hour, and the temperature of the resultant mixture was raised to 90° C. and kept at 90° C. for 1 hour in order to further increase the rate of polymerization. Thereafter, the reaction solution was cooled to 40° C. to obtain an aqueous suspension containing a polymer. This aqueous suspension was filtered through a nylon filter cloth having an opening of 45 μm, the filtered product was washed with deionized water, dehydrated, and dried at 40° C. for 16 hours, thereby obtaining a macromonomer (MM1). The number average molecular weight of the macromonomer (MM1) was 1,600.

Production Example MM2

In a polymerization apparatus equipped with a stirrer, a cooling tube, and a thermometer, 145 parts of deionized water, 0.1 part of sodium sulfate, and 0.25 part of the dispersing agent 1 (solid content: 10% by mass) were charged and stirred to obtain a homogeneous aqueous solution. Next, 100 parts of MMA, 0.004 part of the chain transfer agent 1, and 0.4 part of 1,1,3,3-tetramethylbutylperoxy 2-ethylhexanoate (PEROCTA O manufactured by NOF CORPORATION) were added to the aqueous solution to prepare an aqueous suspension.

Next, the interior of the polymerization apparatus was purged with nitrogen, the temperature of the aqueous suspension was raised to 800, the reaction thereof was conducted for 1 hour, and the temperature of the resultant mixture was raised to 90° C. and kept at 90° C. for 1 hour in order to further increase the rate of polymerization. Thereafter, the reaction solution was cooled to 40° C. to obtain an aqueous suspension containing a polymer. This aqueous suspension was filtered through a nylon filter cloth having an opening of 45 μm, the filtered product was washed with deionized water, dehydrated, and dried at 40° C. for 16 hours, thereby obtaining a macromonomer (MM2). The number average molecular weight of the macromonomer (MM2) was 2,500.

Production Example MM3

In a polymerization apparatus equipped with a stirrer, a cooling tube, and a thermometer, 145 parts of deionized water, 0.1 part of sodium sulfate, and 0.25 part of the dispersing agent 1 (solid content: 10% by mass) were charged and stirred to obtain a homogeneous aqueous solution. Next, 100 parts of MMA, 0.003 part of the chain transfer agent 1, and 0.3 part of 1,1,3,3-tetramethylbutylperoxy 2-ethylhexanoate (PEROCTA O manufactured by NOF CORPORATION) were added to the aqueous solution to prepare an aqueous suspension.

Next, the interior of the polymerization apparatus was purged with nitrogen, the temperature of the aqueous suspension was raised to 80°, the reaction thereof was conducted for 1 hour, and the temperature of the resultant mixture was raised to 90° C. and kept at 90° C. for 1 hour in order to further increase the rate of polymerization. Thereafter, the reaction solution was cooled to 40° C. to obtain an aqueous suspension containing a polymer. This aqueous suspension was filtered through a nylon filter cloth having an opening of 45 μm, the filtered product was washed with deionized water, dehydrated, and dried at 40° C. for 16 hours, thereby obtaining a macromonomer (MM3). The number average molecular weight of the macromonomer (MM3) was 3,600.

Production Example MM4

In a polymerization apparatus equipped with a stirrer, a cooling tube, and a thermometer, 145 parts of deionized water, 0.1 part of sodium sulfate, and 0.25 part of the dispersing agent 1 (solid content: 10% by mass) were charged and stirred to obtain a homogeneous aqueous solution. Next, 100 parts of MMA, 0.0015 part of the chain transfer agent 1, and 0.15 part of 1,1,3,3-tetramethylbutylperoxy 2-ethylhexanoate (PEROCTA O manufactured by NOF CORPORATION) were added to the aqueous solution to prepare an aqueous suspension.

Next, the interior of the polymerization apparatus was purged with nitrogen, the temperature of the aqueous suspension was raised to 80°, the reaction thereof was conducted for 1 hour, and the temperature of the resultant mixture was raised to 90° C. and kept at 90° C. for 1 hour in order to further increase the rate of polymerization. Thereafter, the reaction solution was cooled to 40° C. to obtain an aqueous suspension containing a polymer. This aqueous suspension was filtered through a nylon filter cloth having an opening of 45 μm, the filtered product was washed with deionized water, dehydrated, and dried at 40° C. for 16 hours, thereby obtaining a macromonomer (MM4). The number average molecular weight of the macromonomer (MM4) was 6,700.

Production Example MM5

In a polymerization apparatus equipped with a stirrer, a cooling tube, and a thermometer, 145 parts of deionized water, 0.1 part of sodium sulfate, and 0.25 part of the dispersing agent 1 (solid content: 10% by mass) were charged and stirred to obtain a homogeneous aqueous solution. Next, 75 parts of MMA, 25 parts of MTMA, 0.01 part of the chain transfer agent 1, and 1.5 parts of 1,1,3,3- tetramethylbutylperoxy 2-ethylhexanoate (PEROCTA O manufactured by NOF CORPORATION) were added to the aqueous solution to prepare an aqueous suspension.

Next, the interior of the polymerization apparatus was purged with nitrogen, the temperature of the aqueous suspension was raised to 80°, the reaction thereof was conducted for 1 hour, and the temperature of the resultant mixture was raised to 90° C. and kept at 90° C. for 1 hour in order to further increase the rate of polymerization. Thereafter, the reaction solution was cooled to 40° C. to obtain an aqueous suspension containing a polymer. This aqueous suspension was filtered through a nylon filter cloth having an opening of 45 μm, the filtered product was washed with deionized water, dehydrated, and dried at 40° C. for 16 hours, thereby obtaining a macromonomer (MM5). The number average molecular weight of the macromonomer (MM5) was 2,000.

Example 1

In a reaction vessel equipped with a stirrer, a temperature controller, and a dropping funnel, 48.3 parts of xylene was charged, and the temperature of the xylene was raised to 85° C. while stirring it in a nitrogen atmosphere. Subsequently, a mixture composed of 25 parts of the monomer (a1-1), 10 parts of the macromonomer (MM1), 7.5 parts of MMA, 20 parts of EA, 37.5 parts of MTMA, and 1.5 parts of AIBN was added dropwise thereto from the dropping funnel at a constant rate over 4 hours. In 30 minutes after the dropwise addition was competed, 2.0 parts of t-butylperoxy 2-ethylhexanoate and 9 parts of xylene were added dropwise to the resultant mixture four times at an interval of 30 minutes, and the mixture was further stirred for 1 hour, and 6.7 parts of butyl vinyl ether and 2 parts of butyl acetate were then added to the resultant mixture, thereby obtaining a polymer-containing composition (polymer solution) A-1 in the form of a solution having a solid content of 59.7% by mass and a Gardner viscosity of TU.

Examples 2 to 9 and Comparative Examples 1 and 2

Polymer-containing compositions A-2 to A-11 in the form of a solution were produced in the same manner as in Example 1 except that the amounts (parts) of the monomer and the initiator AIBN charged were changed as presented in Table 1.

The values of properties (solid content (% by mass), Gardner viscosity, B-type viscosity, and the number average molecular weight (Mn) and weight average molecular weight (Mw) of the copolymer contained in each of the polymer-containing compositions) of the polymer-containing compositions A-1 to A-11 thus obtained are presented in Table 1. The solid content in the polymer-containing compositions A-1 to A-11 is equal to the content of the copolymer. In addition, the performance (water resistance 1 and hardness) of the coating films formed of the polymer-containing compositions are presented in Table 1.

TABLE 1

| Polymer-containing composition | | Example 1 A-1 | Example 2 A-2 | Example 3 A-3 | Example 4 A-4 | Example 5 A-5 | Comparative Example 1 A-6 | Example 6 A-7 | Example 7 A-8 | Example 8 A-9 | Example 9 A-10 | Comparative Example 2 A-11 |
|---|---|---|---|---|---|---|---|---|---|---|---|---|
| Monomer (a1) | M1 (BEMA) | 25 | 25 | 25 | 25 | 25 | 25 | 25 | 50 | — | — | 25 |
| | M2 (IBEMA) | — | — | — | — | — | — | — | — | 25 | — | — |
| | M3 (EHEMA) | — | — | — | — | — | — | — | — | — | 32.5 | — |
| Macromonomer (b) | MM1 (low Mn 1600) | 10 | — | 17.5 | — | 17.5 | — | 36 | 22 | 36 | 36 | — |
| | MM3 (high Mn 3600) | — | 10 | — | 17.5 | — | — | — | — | — | — | — |
| Monomer (c) | MMA | 7.5 | 7.5 | — | — | — | 17.5 | — | — | — | — | 36 |
| | EA | 20 | 20 | 20 | 20 | 20 | 20 | 39 | 28 | 39 | 32.5 | 39 |
| | MTMA | 37.5 | 37.5 | 37.5 | 37.5 | 37.5 | 37.5 | — | — | — | — | — |
| Initiator | AIBN | 1.5 | 1.5 | 1.5 | 1.5 | 2.5 | 1.5 | 0.9 | 0.9 | 0.9 | 0.9 | 1.5 |
| Alkenyl compound | Butyl vinyl ether | 6.7 | 6.7 | 6.7 | 6.7 | 6.7 | 6.7 | 6.7 | 7.3 | — | — | 6.7 |
| | Isobutyl vinyl ether | — | — | — | — | — | — | — | — | 6.7 | — | — |
| | 2-Ethylhexyl vinyl ether | — | — | — | — | — | — | — | — | — | 10.5 | — |
| Values of properties | Solid content (% by mass) | 59.7 | 59.8 | 59.3 | 59.7 | 59.2 | 59.5 | 54.8 | 54.9 | 55.3 | 55 | 55.1 |
| | Gardner viscosity | TU | −W | PQ | +V | N | −X | +I | LM | K | +J | P |
| | B-type viscosity (mPa · s) | 620 | 990 | 420 | 910 | 340 | 1250 | 230 | 330 | 300 | 260 | 400 |
| | Mn | 4100 | 4800 | 3800 | 4800 | 2900 | 5400 | 5400 | 5200 | 5300 | 5000 | 7700 |
| | Mw | 14000 | 18000 | 12000 | 16000 | 9400 | 22000 | 13000 | 13000 | 13000 | 12000 | 21000 |
| Performance of coating film | Water resistance 1 | ○ | ○ | ○ | ○ | ○ | Δ | ○ | ○ | ○ | ○ | Δ |
| | Hardness (N/mm²) | 1.49 | 1.96 | 1.26 | 2.24 | 1.23 | 1.52 | 2.4 | 2.8 | 3.2 | 2.6 | 0.2 |

In Table 1, the numerical values described in the columns for the monomer (a1), the macromonomer, the monomer (c), and the initiator indicate the charged amount (parts). The content of butyl vinyl ether in each polymer-containing composition is 50% by mole with respect to the sum of the structure (I) of the copolymer contained in each polymer-containing composition.

The polymer-containing compositions A-1 to A-5 and A-7 to A-10 of Examples 1 to 9 had a low viscosity while having a high solid content. In addition, the hardness and water resistance of the coating film formed were favorable.

The polymer-containing compositions A-6 and A-11 of Comparative Examples 1 and 2 in which the macromonomer was not used had a higher viscosity as compared to those of Examples 1 to 9 although these had a solid content at the same level as those of Examples 1 to 9. In addition, the coating film formed exhibited a low hardness and poor water resistance.

Examples 10 to 20 and Comparative Examples 3 to 4

One obtained in advance by charging the respective components in a metal can according to the composition presented in Table 2, adding 70 g of glass beads thereto, and mixing them together by using a stirring rod was pigment-dispersed by using a rocking shaker, thereby obtaining an anti-fouling coating composition.

The evaluation results for the anti-fouling coating composition thus obtained are presented in Table 2.

TABLE 2

| | | | Example 10 | Example 11 | Example 12 | Example 13 | Example 14 | Example 15 | Example 16 |
|---|---|---|---|---|---|---|---|---|---|
| Composition | Polymer-containing composition (solid content of polymer charged is 25 parts) | A-1 | 42 | — | — | — | — | — | — |
| | | A-2 | — | 42 | — | — | — | — | — |
| | | A-3 | — | — | 42 | — | — | — | — |
| | | A-4 | — | — | — | 42 | — | 42 | 42 |
| | | A-5 | — | — | — | — | 42 | — | — |
| | | A-6 | — | — | — | — | — | — | — |
| | | A-7 | — | — | — | — | — | — | — |
| | | A-8 | — | — | — | — | — | — | — |
| | | A-9 | — | — | — | — | — | — | — |
| | | A-10 | — | — | — | — | — | — | — |
| | | A-11 | — | — | — | — | — | — | — |
| | Pigment | Talc | — | — | — | — | — | 20 | 20 |
| | | Zinc oxide | — | — | — | — | — | 20 | 20 |
| | Anti-fouling agent | Cuprous oxide | 48 | 48 | 48 | 48 | 48 | — | — |
| | | Zinc pyrithione | 0.5 | 0.5 | 0.5 | 0.5 | 0.5 | 3 | 3 |
| | | Copper pyrithione | — | — | — | — | — | — | — |
| | | Medetomidine | — | — | — | — | — | — | 5 |
| | | Anti-fouling agent (1) | — | — | — | — | — | 5 | — |
| | Thermoplastic resin | Additive (1) | 1 | 1 | 1 | 1 | 1 | 2 | 2 |
| | | Additive (2) | 3 | 3 | 3 | 3 | 3 | 2 | 2 |
| | | Additive (3) | — | — | — | — | — | 1.5 | 1.5 |
| | Organic solvent | Xylene | 5.5 | 5.5 | 5.5 | 5.5 | 5.5 | 4.5 | 4.5 |
| Properties of coating | | Sum | 100 | 100 | 100 | 100 | 100 | 100 | 100 |
| | | Heating residue (% by mass) | 77.7 | 77.7 | 77.7 | 77.7 | 77.7 | 77.7 | 77.7 |
| | | B-type viscosity (mPa · s) | 3400 | 3920 | 1650 | 3590 | 1380 | 3600 | 3600 |
| | | Paintability | ○ | ○ | ○ | ○ | ○ | ○ | ○ |
| | | VOC (g/L) | 306 | 386 | 386 | 386 | 386 | 386 | 386 |
| Performance of coating film | | Degree of consumption (3 months) (μm/M) | 6.7 | 4.7 | 5.3 | 5.0 | 2.7 | 9.0 | 5.3 |

| | | | Comparative Example 3 | Example 17 | Example 18 | Example 19 | Example 20 | Comparative Example 4 |
|---|---|---|---|---|---|---|---|---|
| Composition | Polymer-containing composition (solid content of polymer charged is 25 parts) | A-1 | — | — | — | — | — | — |
| | | A-2 | — | — | — | — | — | — |
| | | A-3 | — | — | — | — | — | — |
| | | A-4 | — | — | — | — | — | — |
| | | A-5 | — | — | — | — | — | — |
| | | A-6 | 42 | — | — | — | — | — |
| | | A-7 | — | 46 | — | — | — | — |
| | | A-8 | — | — | 46 | — | — | — |
| | | A-9 | — | — | — | 46 | — | — |
| | | A-10 | — | — | — | — | 46 | — |
| | | A-11 | — | — | — | — | — | 46 |
| | Pigment | Talc | — | — | — | — | — | — |
| | | Zinc oxide | — | — | — | — | — | — |
| | Anti-fouling agent | Cuprous oxide | 48 | 48 | 48 | 48 | 48 | 48 |
| | | Zinc pyrithione | 0.5 | — | — | — | — | — |
| | | Copper pyrithione | — | 0.5 | 0.5 | 0.5 | 0.5 | 0.5 |
| | | Medetomidine | — | — | — | — | — | — |
| | | Anti-fouling agent (1) | — | — | — | — | — | — |
| | Thermoplastic resin | Additive (1) | 1 | 1 | 1 | 1 | 1 | 1 |
| | | Additive (2) | 3 | 3 | 3 | 3 | 3 | 3 |
| | | Additive (3) | — | — | — | — | — | — |

TABLE 2-continued

|  |  |  |  |  |  |  |  |
|---|---|---|---|---|---|---|---|
| Organic solvent | Xylene | 5.5 | 1.5 | 1.5 | 1.5 | 1.5 | 1.5 |
|  | Sum | 100 | 100 | 100 | 100 | 100 | 100 |
| Properties of coating | Heating residue (% by mass) | 77.7 | 77.7 | 77.7 | 77.7 | 77.7 | 77.7 |
|  | B-type viscosity (mPa·s) | 5300 | 3200 | 3800 | 3400 | 3300 | 5400 |
|  | Paintability | Δ | ○ | ○ | ○ | ○ | Δ |
|  | VOC (g/L) | 386 | 386 | 386 | 386 | 386 | 386 |
| Performance of coating film | Degree of consumption (3 months) (μm/M) | 7.3 | 5.0 | 6.7 | 5.0 | 4.0 | 5.7 |

In Table 2, the numerical values described in the column for the composition indicate the blended amount (parts). In Table 2, the amount of the polymer-containing composition blended is the total amount of the polymer-containing composition.

The anti-fouling coating compositions of Examples 10 to 20 had a low viscosity while having a high solid content and a low VOC, and the paintability thereof was favorable. In addition, the degree of consumption of the coating films formed was favorable, and it can be judged that the hardness and water resistance of the coating films are also favorable from the results for Examples 1 to 9.

The anti-fouling coating composition of Comparative Example 3 using a copolymer which did not contain a constitutional unit based on a macromonomer had a higher coating viscosity and poor paintability as compared to Examples 10 to 14 having the same composition except the polymer-containing composition although it had a heating residue and VOC at the same level as those of Examples 10 to 14. The same tendency was found in comparison between Comparative Example 4 and Examples 18 to 20 as well.

The static anti-fouling properties of the anti-fouling coating compositions of Example 10 and Comparative Example 3 were evaluated, and the results for both of them were favorable.

Example 21

In a reaction vessel equipped with a stirrer, a temperature controller, and a dropping funnel, 40 parts of xylene and 10 parts of macromonomer (MM2) were charged, and the temperature of the mixture was raised to 90° C. while stirring it. Subsequently, a mixture composed of 50 parts of TIPX, 25 parts of MMA, 10 parts of EA, 5 parts of MTA, and 1.0 part of AMBN was added dropwise thereto from the dropping funnel at a constant rate over 4 hours in a nitrogen atmosphere. In 30 minutes after the dropwise addition was competed, 1.0 part of t-butylperoxy 2-ethylhexanoate and 10 parts of xylene were added dropwise to the resultant mixture over 1.5 hours, and the mixture was further stirred for 1 hour, thereby obtaining a polymer-containing composition (polymer solution) A-12 in the form of a solution having a solid content of 61.1% by mass and a B-type viscosity of 760 mPa·s.

Examples 22 to 23 and Comparative Example 5

Polymer-containing compositions A-13, A-14, and A-16 were produced in the same manner as in Example 21 except that the amounts (parts) of the monomer and the initiator AMBN charged were changed as presented in Table 3.

Example 24

In a reaction vessel equipped with a stirrer, a temperature controller, and a dropping funnel, 40 parts of xylene was charged, and the temperature of the xylene was raised to 90° C. while stirring it. Subsequently, a mixture composed of 50 parts of TIPX, 10 parts of macromonomer (MM2), 25 parts of MMA, 10 parts of EA, 5 parts of MTA, and 1.0 part of AMBN was added dropwise thereto from the dropping funnel at a constant rate over 4 hours funnel in a nitrogen atmosphere. In 30 minutes after the dropwise addition was competed, 1.0 part of t-butylperoxy 2-ethylhexanoate and 26 parts of xylene were added dropwise to the resultant mixture over 1.5 hours, and the mixture was further stirred for 1 hour, thereby obtaining a polymer-containing composition (polymer solution) A-15 in the form of a solution having a solid content of 61.1% by mass and a B-type viscosity of 690 mPa·s.

The values of properties (solid content (% by mass), amount of organic solvent (% by mass), B-type viscosity, and the number average molecular weight (Mn), weight average molecular weight (Mw), and acid value of the copolymer contained in each of the polymer-containing compositions) of the polymer-containing compositions A-12 to A-16 thus obtained are presented in Table 3. The solid content in the polymer-containing compositions A-12 to A-16 is equal to the content of the copolymer. In addition, the performance (hardness, hardness after 1 day, and water resistance 2) of the coating films formed of the polymer-containing compositions are presented in Table 3.

TABLE 3

| Polymer-containing composition | | Example 21 A-12 | Example 22 A-13 | Example 23 A-14 | Example 24 A-15 | Comparative Example 5 A-16 |
|---|---|---|---|---|---|---|
| Monomer (a2) | TIPX | 50 | 50 | 50 | 50 | 50 |
| Macromonomer (b) | MM1 (low Mn 1600) | — | — | 20 | — | — |
|  | MM2 (high Mn 2500) | 10 | 20 | — | 10 | — |

TABLE 3-continued

| Polymer-containing composition | | Example 21 A-12 | Example 22 A-13 | Example 23 A-14 | Example 24 A-15 | Comparative Example 5 A-16 |
|---|---|---|---|---|---|---|
| Monomer (c) | MMA | 25 | 15 | 15 | 25 | 35 |
| | EA | 10 | 10 | 10 | 10 | 10 |
| | MTA | 5 | 5 | 5 | 5 | 5 |
| Initiator | AMBN | 1 | 1 | 1 | 1 | 1 |
| Values of properties | Solid content (% by mass) | 61.1 | 61.2 | 61.1 | 61.1 | 61.8 |
| | Amount of organic solvent (% by mass) | 38.9 | 38.8 | 38.9 | 38.9 | 38.2 |
| | B-type viscosity (mPa · s) | 760 | 870 | 720 | 690 | 1010 |
| | Mw | 19200 | 15500 | 13300 | 19000 | 25000 |
| | Mn | 6400 | 6000 | 4900 | 6500 | 7600 |
| Performance of coating film | Acid value (mgKOH/g) | 0.4 | 0.6 | 0.6 | 0.6 | 0.53 |
| | Hardness (N/mm$^2$) | 7.4 | 9.0 | 7.3 | 7.5 | 6.2 |
| | Hardness after 1 day (N/mm$^2$) | 3.6 | 4.3 | 3.8 | 3.8 | 2.9 |
| | Water resistance 2 (haze value (%)) | 7 | 6.4 | 6.8 | 7.2 | 14.7 |

In Table 3, the numerical values described in the columns for the monomer (a2), the macromonomer, the monomer (c), and the initiator indicate the charged amount (parts). Incidentally, the amount of xylene to be finally added was adjusted so as to have the amount of organic solvent and the solid content described in the table.

The polymer-containing compositions A-12 to A-15 of Examples 21 to 24 had a low viscosity while having a high solid content. In addition, the hardness and water resistance of the coating films formed were favorable.

The polymer-containing composition A-16 of Comparative Example 5 in which a macromonomer was not used had a higher viscosity as compared to those of Examples 21 to 24 although it had a solid content at the same level as those of Examples 21 to 24. In addition, the hardness of coating film and the hardness of coating film in 1 day after painting were low. The water resistance of the coating film was favorable but inferior to those of Examples 21 to 24.

Examples 25 to 28 and Comparative Example 6

One obtained in advance by charging the respective components in a metal can according to the composition presented in Table 4, adding 70 g of glass beads thereto, and mixing them together by using a stirring rod was pigment-dispersed by using a rocking shaker, thereby obtaining an anti-fouling coating composition.

The evaluation results for the anti-fouling coating composition thus obtained are presented in Table 4.

In Table 4, the numerical values described in the column for the composition indicate the blended amount (parts). In Table 4, the amount of the polymer-containing composition blended is the total amount of the polymer-containing composition.

The anti-fouling coating compositions of Examples 25 to 28 had a sufficient degree of consumption. In addition, it can be judged that the hardness, hardness after 1 day, and water resistance of the coating films are excellent from the results for Examples 21 to 24.

The coating film formed of the anti-fouling coating composition of Comparative Example 6 had a sufficient degree of consumption, but it can be judged that the hardness, hardness after 1 day, and water resistance of the coating film are inferior to those of Examples 25 to 28 from the results for Comparative Example 5.

The static anti-fouling properties of the anti-fouling coating compositions of Examples 25 to 28 and Comparative Example 6 were evaluated, and the results for all of them were favorable.

Example 29

In a four-necked flask equipped with a condenser, a thermometer, a dropping funnel, and a stirrer, 15 parts of PGM (propylene glycol methyl ether), 30 parts of xylene, and 4.0 parts of EA were charged, and the temperature of the mixture was raised to 100° C. while stirring it. Subsequently, a mixture composed of 23.0 parts of MMA methyl meth-

TABLE 4

| | | | Example 25 | Example 26 | Example 27 | Example 28 | Comparative Example 6 |
|---|---|---|---|---|---|---|---|
| Composition | Polymer-containing composition | A-12 | 100 | — | — | — | — |
| | | A-13 | — | 100 | — | — | — |
| | | A-14 | — | — | 100 | — | — |
| | | A-15 | — | — | — | 100 | — |
| | | A-16 | — | — | — | — | 100 |
| | Anti-fouling agent | Cuprous oxide | 150 | 150 | 150 | 150 | 150 |
| | | Copper pyrithione | 6.9 | 6.9 | 6.9 | 6.9 | 6.9 |
| | | Medetomidine | 0.1 | 0.1 | 0.1 | 0.1 | 0.1 |
| | Additive | Additive (1) | 1 | 1 | 1 | 1 | 1 |
| | | Additive (2) | 2 | 2 | 2 | 2 | 2 |
| | Solvent | Xylene | 10 | 10 | 10 | 10 | 10 |
| Properties of coating | | Heating residue (% by mass) | 78.8 | 78.9 | 79.1 | 78.1 | 80.2 |
| | | B-type viscosity (mPa · s) | 3900 | 4000 | 3500 | 3400 | 5100 |
| | | VOC (g/L) | 377 | 377 | 377 | 377 | 377 |
| Performance of coating film | | Degree of consumption (3 months) (μm/M) | 1.8 | 1.5 | 1.7 | 1.9 | 2.3 | acrylate, 10 parts of EA, 30 parts of BA, 28.8 parts (total amount including organic solvent) of the monomer (a3-1) obtained in Production Example a3-1, 20 parts of the macromonomer (MM1) obtained in Production Example MM1, 1.5 parts of a chain transfer agent (NOFMER (registered trademark) MSD manufactured by NOF CORPORATION), and 13.0 parts of AMBN was added dropwise thereto from the dropping funnel at a constant rate over 6 hours. After the dropwise addition was completed, 0.5 part of t-butyl peroctoate and 8 parts of xylene were added dropwise to the resultant mixture over 30 minutes, and the mixture was further stirred for 1 hour and 30 minutes, thereby obtaining a polymer-containing composition (polymer solution) A-17 in the form of a solution having a solid content of 57.2% by mass and a B-type viscosity of 390 mPa·s.

Examples 30 to 34 and 42 to 46 and Comparative Example 7

Polymer-containing compositions (polymer solutions) A-18 to A-22. A-30 to A-33, A-35, and A-36 in the form of a solution were produced in the same manner as in Example 29 except that the amounts of the monomers charged were changed as presented in Tables 5 to 6.

Incidentally, only the solid amount is described as the amount of the monomer (a3) blended in Tables 5 to 6.

Example 35

In a pressure-polymerizable autoclave equipped with a condenser, a thermometer, a dropping tank, and a stirrer, 15 parts of PGM (propylene glycol methyl ether), 30 parts of xylene, and 4 parts of EA were charged, and the pressure in the autoclave was increased to 350 kPa and the temperature of the mixture was raised to 145° C. while stirring the mixture. Subsequently, a transparent mixture composed of 35 parts of MMA, 5 parts of EA, 30 parts of BA, 28.8 parts (total amount including organic solvent) of the monomer (a3-1) obtained in Production Example a3-1, 1.5 parts of a chain transfer agent (NOFMER MSD manufactured by NOF Corporation), and 6 parts of AMBN was added dropwise thereto from the dropping tank at a constant rate over 4 hours. After the dropwise addition was completed, 0.5 part of t-butyl peroctoate and 7 parts of xylene were added dropwise to the resultant mixture over 30 minutes, the mixture was further stirred for 1 hour 30 minutes, 8 parts of xylene was then added to the resultant mixture, and the resultant mixture was filtered through a 300 mesh, thereby obtaining a polymer-containing composition (polymer solution) A-23 in the form of a solution.

Examples 36 to 41 and 47

Polymer-containing compositions (polymer solutions) A-24 to A-29 and A-37 in the form of a solution were produced in the same manner as in Example 35 except that the amounts of the monomers charged were changed as presented in Tables 5 to 6.

Incidentally, only the solid amount is described as the amount of the monomer (a3) blended in Tables 5 to 6.

Comparative Example 8

In a reaction vessel equipped with a stirrer, a temperature controller, and a dropping device, 15 parts of xylene was charged, and the temperature of the xylene was raised to 130° C. while stirring it. Thereafter, a mixture composed of the following raw materials was added dropwise thereto at a constant rate over 2 hours, and the copolymerization reaction was further conducted for 0.5 hour.
Macromonomer (MM1): 20 parts
BA: 20 parts,
MAA: 7 parts, and
AMBN: 3 parts.
Subsequently, a mixture composed of the following raw materials was added dropwise to the resultant mixture at a constant rate over 3 hours, and the copolymerization reaction was further conducted for 0.5 hour.
Monomer (a3-1): 28.8 parts
MMA: 16 parts,
EA: 9 parts,
BA: 10 parts.
NOFMER MSD (manufactured by NOF Corporation): 1.5 parts, and
AMBN: 10 parts.
Subsequently, 0.5 part of PERBUTYL O was added to the resultant mixture, and the polymerization reaction was continuously conducted for 1 hour, the resultant mixture was then heated to 80° C., 7.0 parts of dimethylethanolamine (DMEA) was added thereto, and the mixture was mixed until to be homogeneous, thereby obtaining a polymer solution. The B-type viscosity of this polymer solution at 25° C. was 2000 Pa·s or more. Thereafter, 110 parts of deionized water was gradually added to this polymer solution to obtain an aqueous polymer-containing composition A-33.

The kinds and amounts of the materials used in the production of the polymer-containing compositions and the values of properties (solid content (% by mass), amount of organic solvent (% by mass), B-type viscosity, and the number average molecular weight (Mn), weight average molecular weight (Mw), and acid value of the copolymer contained in each of the polymer-containing compositions) of the polymer-containing compositions A-17 to A-37 thus obtained are presented in Tables 5 to 6. The solid content in the polymer-containing compositions A-17 to A-37 is equal to the content of the copolymer. In addition, the performance (hardness, hardness after 1 day, and water resistance 2) of the coating films formed of the polymer-containing compositions are presented in Tables 5 to 6.

TABLE 5

| Polymer-containing composition | | Example 29 A-17 | Example 30 A-18 | Example 31 A-19 | Example 32 A-20 | Example 33 A-21 | Example 34 A-22 | Example 35 A-23 | Example 36 A-24 | Example 37 A-25 | Example 38 A-26 | Example 39 A-27 |
|---|---|---|---|---|---|---|---|---|---|---|---|---|
| Monomer (a3) | a3-1 | 13 | 13 | 13 | 13 | 13 | 13 | 6 | 18 | 21 | 13 | 18 |
|  | a3-2 | — | — | — | — | — | — | — | — | — | — | — |
| Macromonomer (b) | MM1 (low Mn 1600) | 20 | — | — | — | — | — | 20 | 20 | 20 | 20 | 5 |
|  | MM2 (High Mn 2500) | — | 20 | — | 40 | 40 | 40 | — | — | — | — | — |

TABLE 5-continued

| Polymer-containing composition | | Example 29 A-17 | Example 30 A-18 | Example 31 A-19 | Example 32 A-20 | Example 33 A-21 | Example 34 A-22 | Example 35 A-23 | Example 36 A-24 | Example 37 A-25 | Example 38 A-26 | Example 39 A-27 |
|---|---|---|---|---|---|---|---|---|---|---|---|---|
| | MM4 (high Mn 6700) | — | — | 20 | — | — | — | — | — | — | — | — |
| Monomer (c) | MMA | 23 | 23 | 23 | — | — | — | 35 | 23 | 23 | — | 38 |
| | EA | 14 | 14 | 14 | 17 | 17 | 17 | 9 | 8 | 5 | 13 | 8 |
| | BA | 30 | 30 | 30 | 30 | 30 | 30 | 30 | 30 | 30 | 21.5 | 30 |
| | MA | — | — | — | — | — | — | — | — | — | 30.7 | — |
| Initiator | AMBN | 13 | 13 | 13 | 13 | 7 | 18 | 6 | 6 | 6 | 6 | 6 |
| Chain transfer agent | NOFMER MSD | 1.5 | 1.5 | 1.5 | 1.5 | 1.5 | 1.5 | 1.5 | 1.5 | 1.5 | 1.5 | 1.5 |
| Values of properties | Solid content (% by mass) | 57.2 | 57.3 | 52.2 | 57.0 | 57.3 | 56.4 | 56.0 | 55.9 | 56.0 | 57.9 | 55.9 |
| | Amount of organic solvent (% by mass) | 41.9 | 41.8 | 46.9 | 42.1 | 41.8 | 42.7 | 43.6 | 43.2 | 42.6 | 41.2 | 42.9 |
| | B-type viscosity (mPa·s) | 390 | 600 | 1200 | 480 | 840 | 350 | 300 | 670 | 1100 | 430 | 610 |
| | Mw | 4000 | 4800 | 6000 | 5700 | 6300 | 5200 | 4500 | 4200 | 4100 | 4300 | 4200 |
| | Mn | 1500 | 1700 | 2300 | 1700 | 2300 | 1500 | 1300 | 1300 | 1200 | 1300 | 1300 |
| | Acid value (mgKOH/g) | 31.6 | 32.5 | 31.1 | 32.4 | 32.3 | 32.1 | 16.4 | 46.2 | 53.8 | 37.3 | 45.3 |
| | Hardness (N/mm$^2$) | 18 | 24.0 | 31.0 | 33.0 | 38.0 | 30.0 | 10.0 | 18.0 | 31.0 | 20.0 | 5.7 |
| Performance of coating film | Hardness after 1 day | 8.9 | 13.0 | 17.0 | 18.0 | 20.0 | 15.0 | 6.7 | 9.7 | 14.0 | 10.9 | 3.1 |
| | Water resistance 2 (haze value (%)) | 9.7 | 8.4 | 7.6 | 7.2 | 7.4 | 7.1 | 9.1 | 7.0 | 6.8 | 12.2 | 22.2 |

TABLE 6

| Polymer-containing composition | | Example 40 A-28 | Example 41 A-29 | Example 42 A-30 | Example 43 A-31 | Example 44 A-32 | Comparative Example 7 A-33 | Comparative Example 8 A-34 | Example 45 A-35 | Example 46 A-36 | Example 47 A-37 |
|---|---|---|---|---|---|---|---|---|---|---|---|
| Monomer (a3) | a3-1 | 18 | 18 | 18 | 13 | — | 13 | 13 | 13 | 18 | 13 |
| | a3-2 | — | — | — | — | 21 | — | — | — | — | — |
| Monomer (a2) | TIPX | — | — | — | — | — | — | — | — | — | 10 |
| Macromonomer (b) | MM1 (low Mn 1600) | 10 | 15 | 20 | 20 | 20 | 0 | 20 | — | 20 | 20 |
| | MM5 (MMA/MTMA) | — | — | — | — | — | — | — | 20 | — | — |
| Monomer (c) | MMA | 33 | 28 | — | 15 | 23 | 10 | 16 | 23 | — | 19 |
| | EA | 8 | 8 | 26.5 | 27 | 8 | 62 | 14 | 14 | 56.6 | 8 |
| | BA | 30 | 30 | — | 25 | 30 | 15 | 30 | 30 | — | 30 |
| | MTA | — | — | 30 | — | — | — | — | — | — | — |
| | MAA | — | — | — | — | — | — | 7 | — | — | — |
| Initiator | AMBN | 6 | 6 | 11 | 16 | 4 | 13 | 13 | 13 | 12 | 6 |
| Chain transfer agent | NOFMER MSD | 1.5 | 1.5 | 1.5 | 1.5 | 1.5 | 1.5 | 1.5 | 1.5 | 1.5 | 1.5 |
| Values of properties | Solid content (% by mass) | 56.1 | 57.5 | 56.8 | 61.0 | 56.0 | 56.0 | 40.0 | 56.0 | 56.8 | 56.2 |
| | Amount of organic solvent (% by mass) | 42.7 | 41.3 | 42.0 | 38.1 | 43.1 | 43.1 | 1.5 | 43.1 | 42.0 | 42.9 |
| | B-type viscosity (mPa·s) | 530 | 480 | 1300 | 800 | 820 | 1300 | 940 | 600 | 960 | 620 |
| | Mw | 4300 | 4700 | 5200 | 4800 | 5500 | 3600 | 5800 | 4600 | 4800 | 4300 |
| | Mn | 1300 | 1400 | 1600 | 1700 | 1700 | 1300 | 2300 | 1600 | 1700 | 1300 |
| | Acid value (mgKOH/g) | 45.8 | 46.0 | 45.8 | 33.3 | 44.9 | 31.0 | 43.0 | 32.5 | 46.1 | 30.3 |
| | Hardness (N/mm$^2$) | 7.4 | 14.0 | 14.0 | 19.0 | 21.0 | 1.8 | 4.9 | 28.0 | 13.0 | 16.0 |
| Performance of coating film | Hardness after 1 day | 3.8 | 6.7 | 8.1 | 9.9 | 10.1 | 0.9 | 1.5 | 16.0 | 7.8 | 8.2 |
| | Water resistance 2 (haze value (%)) | 14.5 | 10.1 | 14.1 | 10.1 | 9.6 | 65.1 | 70.4 | 9.0 | 12.2 | 6.5 |

In Tables 5 to 6, the numerical values described in the columns for the monomer and the initiator indicate the charged amount (parts). Only the solid amount is described as the amount of the monomer (a3) blended. Incidentally, an organic solvent is contained in the monomers (a3-1) and (a3-2), the amount of xylene to be finally added was thus adjusted so as to have the amount of organic solvent and the solid amount described in the table.

The coating films formed of the polymer-containing compositions of Examples 29 to 47 exhibited excellent hardness and water resistance. In addition, the hardness of coating films after 1 day was high.

The coating film formed of the resin composition of Comparative Example 7 in which a macromonomer was not used exhibited poor hardness and water resistance. In addition, the viscosity of the polymer-containing composition was high.

The coating film formed of the polymer-containing composition of Comparative Example 8 which was an aqueous dispersion obtained by dispersing a polymer solution having a B-type viscosity of higher than 5×10⁴ mPa·s at 25° C. in water and had a content of organic solvent to be less than 30% by mass with respect to the total amount of the polymer-containing composition excluding the copolymer exhibited a low hardness after 1 day and poor water resistance. In addition, the polymer solution had a high viscosity and low handling properties.

It is required to decrease the viscosity of the polymer-containing composition when it is attempted to decrease the VOC of the anti-fouling coating composition and the like. However, the water resistance and hardness of the coating film decrease as in Comparative Example 7 when the molecular weight of the polymer is decreased or the glass transition temperature (Tg) is decreased in order to decrease the viscosity of the polymer-containing composition. By using a macromonomer, it is possible to decrease the viscosity of the polymer-containing composition and to form a coating film exhibiting a high hardness and favorable water resistance.

Examples 48 to 68 and Comparative Examples 9 to 10

Anti-fouling coating compositions were obtained by mixing the respective components according to the composition presented in Tables 7 to 8 by using a high-speed disperser. The evaluation results on the performance (degree of consumption) of the coating films formed of the anti-fouling coating compositions thus obtained are presented in Tables 7 to 8.

TABLE 7

| | | | Example 48 | Example 49 | Example 50 | Example 51 | Example 52 | Example 53 |
|---|---|---|---|---|---|---|---|---|
| Composition | Polymer-containing composition | A-17 | 100 | — | — | — | — | — |
| | | A-18 | — | 100 | — | — | — | — |
| | | A-19 | — | — | 100 | — | — | — |
| | | A-20 | — | — | — | 100 | — | — |
| | | A-21 | — | — | — | — | 100 | — |
| | | A-22 | — | — | — | — | — | 100 |
| | | A-23 | — | — | — | — | — | — |
| | | A-24 | — | — | — | — | — | — |
| | | A-25 | — | — | — | — | — | — |
| | | A-26 | — | — | — | — | — | — |
| | | A-27 | — | — | — | — | — | — |
| | | A-28 | — | — | — | — | — | — |
| | Pigment | Talc | 30 | 30 | 30 | 30 | 30 | 30 |
| | | Zinc oxide | 60 | 60 | 60 | 60 | 60 | 60 |
| | Anti-fouling agent | Zinc pyrithione | 5 | 5 | 5 | 5 | 5 | 5 |
| | | Medetomidine | 0.1 | 0.1 | 0.1 | 0.1 | 0.1 | 0.1 |
| | | Anti-fouling agent (1) | 8 | 8 | 8 | 8 | 8 | 8 |
| | Additive | Additive (1) | 1 | 1 | 1 | 1 | 1 | 1 |
| | | Additive (2) | 2 | 2 | 2 | 2 | 2 | 2 |
| | Solvent | BuOH | 5 | 5 | 5 | 5 | 5 | 5 |
| Properties of coating | | Heating residue (% by mass) | 72 | 72.2 | 70.1 | 70.1 | 70.5 | 72.1 |
| | | B-type viscosity (mPa·s) | 1500 | 2200 | 3900 | 1600 | 2500 | 1200 |
| | | VOC (g/L) | 395 | 395 | 430 | 395 | 395 | 395 |
| Performance of coating film | | Degree of consumption (3 months) (μm/M) | 2.4 | 2.3 | 2.3 | 2.2 | 2.1 | 2.1 |

| | | | Example 54 | Example 55 | Example 56 | Example 57 | Example 58 | Example 59 |
|---|---|---|---|---|---|---|---|---|
| Composition | Polymer-containing composition | A-17 | — | — | — | — | — | — |
| | | A-18 | — | — | — | — | — | — |
| | | A-19 | — | — | — | — | — | — |
| | | A-20 | — | — | — | — | — | — |
| | | A-21 | — | — | — | — | — | — |
| | | A-22 | — | — | — | — | — | — |
| | | A-23 | 100 | — | — | — | — | — |
| | | A-24 | — | 100 | — | — | — | — |
| | | A-25 | — | — | 100 | — | — | — |
| | | A-26 | — | — | — | 100 | — | — |
| | | A-27 | — | — | — | — | 100 | — |
| | | A-28 | — | — | — | — | — | 100 |
| | Pigment | Talc | 30 | 30 | 30 | 30 | 30 | 30 |
| | | Zinc oxide | 60 | 60 | 60 | 60 | 60 | 60 |
| | Anti-fouling agent | Zinc pyrithione | 5 | 5 | 5 | 5 | 5 | 5 |
| | | Medetomidine | 0.1 | 0.1 | 0.1 | 0.1 | 0.1 | 0.1 |
| | | Anti-fouling agent (1) | 8 | 8 | 8 | 8 | 8 | 8 |
| | Additive | Additive (1) | 1 | 1 | 1 | 1 | 1 | 1 |
| | | Additive (2) | 2 | 2 | 2 | 2 | 2 | 2 |
| | Solvent | BuOH | 5 | 5 | 5 | 5 | 5 | 5 |

TABLE 7-continued

| | | | | | | | |
|---|---|---|---|---|---|---|---|
| Properties of coating | Heating residue (% by mass) | 71.4 | 73.5 | 71.1 | 72.6 | 73.1 | 72.9 |
| | B-type viscosity (mPa·s) | 1200 | 2200 | 3700 | 1800 | 1800 | 1800 |
| | VOC (g/L) | 395 | 395 | 395 | 395 | 395 | 395 |
| Performance of coating film | Degree of consumption (3 months) (μm/M) | 1.6 | 3.6 | 4.7 | 5.2 | 2.1 | 2.2 |

TABLE 8

| | | | Example 60 | Example 61 | Example 62 | Example 63 | Example 64 | Comparative Example 9 |
|---|---|---|---|---|---|---|---|---|
| Composition | Polymer-containing composition | A-17 | — | — | — | — | 100 | — |
| | | A-29 | 100 | — | — | — | — | — |
| | | A-30 | — | 100 | — | — | — | — |
| | | A-31 | — | — | 100 | — | — | — |
| | | A-32 | — | — | — | 100 | — | — |
| | | A-33 | — | — | — | — | — | 100 |
| | | A-34 | — | — | — | — | — | — |
| | | A-35 | — | — | — | — | — | — |
| | | A-36 | — | — | — | — | — | — |
| | | A-37 | — | — | — | — | — | — |
| | Pigment | Talc | 30 | 30 | 30 | 30 | — | 30 |
| | | Zinc oxide | 60 | 60 | 60 | 60 | — | 60 |
| | Anti-fouling agent | Cuprous oxide | — | — | — | — | 120 | — |
| | | Copper pyrithione | — | — | — | — | 1.5 | — |
| | | Zinc pyrithione | 5 | 5 | 5 | 5 | — | 5 |
| | | Medetomidine | 0.1 | 0.1 | 0.1 | 0.1 | — | 0.1 |
| | | Anti-fouling agent (1) | 8 | 8 | 8 | 8 | — | 8 |
| | | Pyridine-triphenylborane | — | — | — | — | — | — |
| | Additive | Additive (1) | 1 | 1 | 1 | 1 | 2 | 1 |
| | | Additive (2) | 2 | 2 | 2 | 2 | 5 | 2 |
| | | Additive (4) | — | — | — | — | — | — |
| | Organic solvent | BuOH | 5 | 5 | 5 | 5 | 5 | 5 |
| | | Water | — | — | — | — | — | — |
| Properties of coating | Heating residue (% by mass) | | 71.3 | 70.9 | 75.1 | 72.4 | 73.5 | 70.7 |
| | B-type viscosity (mPa·s) | | 1600 | 4400 | 2300 | 2300 | 4400 | 4400 |
| | VOC (g/L) | | 395 | 395 | 375 | 395 | 420 | 395 |
| Performance of coating film | Degree of consumption (3 months) (μm/M) | | 2.4 | 20.0 | 2.4 | 2.1 | 1.7 | 4.9 |

| | | | Comparative Example 10 | Example 65 | Example 66 | Example 67 | Example 68 |
|---|---|---|---|---|---|---|---|
| Composition | Polymer-containing composition | A-17 | — | — | — | — | 100 |
| | | A-29 | — | — | — | — | — |
| | | A-30 | — | — | — | — | — |
| | | A-31 | — | — | — | — | — |
| | | A-32 | — | — | — | — | — |
| | | A-33 | — | — | — | — | — |
| | | A-34 | 100 | — | — | — | — |
| | | A-35 | — | 100 | — | — | — |
| | | A-36 | — | — | 100 | — | — |
| | | A-37 | — | — | — | 100 | — |
| | Pigment | Talc | 30 | 30 | 30 | 30 | 30 |
| | | Zinc oxide | 60 | 60 | 60 | 60 | 60 |
| | Anti-fouling agent | Cuprous oxide | — | — | — | — | — |
| | | Copper pyrithione | — | — | — | — | — |
| | | Zinc pyrithione | 5 | 5 | 5 | 5 | 5 |
| | | Medetomidine | 0.1 | 0.1 | 0.1 | 0.1 | 0.1 |
| | | Anti-fouling agent (1) | 8 | 8 | 8 | 8 | — |
| | | Pyridine-triphenylborane | — | — | — | — | 8 |
| | Additive | Additive (1) | 1 | 1 | 1 | 1 | 1 |
| | | Additive (2) | 2 | 2 | 2 | 2 | 2 |
| | | Additive (4) | — | — | — | — | 1 |
| | Organic solvent | BuOH | — | 5 | 5 | 5 | 5 |
| | | Water | 5 | — | — | — | — |
| Properties of coating | Heating residue (% by mass) | | 65.1 | 73.5 | 70.8 | 70.7 | 70.7 |

TABLE 8-continued

| | | | | | | |
|---|---|---|---|---|---|---|
| | B-type viscosity (mPa·s) | 4000 | 2000 | 3100 | 1900 | 1500 |
| | VOC (g/L) | 270 | 395 | 395 | 395 | 395 |
| Performance of coating film | Degree of consumption (3 months) (μm/M) | 1.4 | 3.2 | 10.1 | 3.1 | 2.0 |

In Tables 7 to 8, the numerical values described in the column for the composition indicate the blended amount (parts). In Tables 7 to 8, the amount of the polymer-containing composition blended is the total amount of the polymer-containing composition.

The coating films formed of the anti-fouling coating compositions of Examples 48 to 68 had a sufficient degree of consumption. In addition, it can be judged that the hardness, the hardness after 1 day, and water resistance of the coating films are excellent from the results for Examples 29 to 47.

The coating film formed of the anti-fouling coating composition of Comparative Example 9 had a sufficient degree of consumption, but it can be judged that the hardness, hardness after 1 day, and water resistance of the coating film are low from the results for Comparative Example 7.

The coating film formed of the anti-fouling coating composition of Comparative Example 10 had a lower degree of consumption as compared to those of Examples 48 to 68. Hence, it can be judged that the anti-fouling properties are poor. In addition, it can be judged that the water resistance is low from the result for Comparative Example 8.

The static anti-fouling properties of the anti-fouling coating compositions of Examples 48 and 51 and Comparative Example 6 were evaluated, and the results for all of them were favorable.

INDUSTRIAL APPLICABILITY

The (meth)acrylic copolymer, the polymer solution, and the polymer-containing composition of the present invention can be used in anti-fouling coating compositions, anti-fogging coating compositions, and the like, and these can be suitably used particularly in anti-fouling coating compositions.

The invention claimed is:

1. A polymer-containing composition comprising:
 a solvent; and
 a methacrylic copolymer comprising:
  at least one kind of constitutional unit selected from the group consisting of
  (i) a constitutional unit (A1) having at least one structure selected from the group consisting of structures represented by formula (1), formula (2), or formula (3);

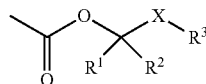
(1)

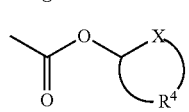
(2)

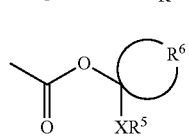
(3)

wherein, X represents —O—, —S—, or —NR$^{14}$—, R$^{14}$ represents a hydrogen atom or an alkyl group, R$^1$ and R$^2$ each represent a hydrogen atom or an alkyl group having from 1 to 10 carbon atoms, R$^3$ and R$^5$ each represent an alkyl group having from 1 to 20 carbon atoms, a cycloalkyl group, or an aryl group, and R$^4$ and R$^6$ each represent an alkylene group having from 1 to 10 carbon atoms;

(ii) a constitutional unit (A2) having a triorganosilyloxycarbonyl group; and (iii) a constitutional unit (A3) having at least one structure selected from the group consisting of structures represented by formula (4) or (5);

(4)

(5)

wherein, M represents Zn, Cu, Mg, or Ca and R$^{32}$ represents an organic acid residue other than a (meth)acryloyloxy group;

and a constitutional unit (B) derived from a macromonomer (b)

having two or more constitutional units represented formula (b') and a number average molecular weight of from 500 to 50000:

(b')

wherein, R$^{41}$ represents a hydrogen atom, a methyl group, or CH$_2$OH and R$^{42}$ represents OR$^{43}$, a halogen atom, COR$^{44}$COOR$^{45}$, CN, CONR$^{46}$R$^{47}$ or R$^{48}$ where R$^{43}$ to R$^{47}$ each independently represent a hydrogen atom, an unsubstituted or substituted alkyl group, an unsubstituted or substituted alicyclic group, an unsubstituted or substituted aryl group, an unsubstituted or substituted heteroaryl group, an unsubstituted or substituted non-aromatic heterocyclic group, an unsubstituted or substituted aralkyl group, an unsubstituted or substituted alkaryl group, or an unsubstituted or substituted organosilyl group and R$^{48}$ represents an unsubstituted or substituted aryl group or an unsubstituted or substituted heteroaryl group;

wherein a content of the organic solvent is 30% by mass or more with respect to a total amount of the polymer-containing composition excluding the (meth)acrylic copolymer, and wherein a water content is 15% by mass or less.

2. The polymer-containing composition according to claim 1,
 wherein a viscosity of the polymer solution at 25° C. is 5×10$^4$ mPa·s or less.

3. The polymer-containing composition according to claim 1, further comprising at least one kind of alkenyl compound selected from the group consisting of a compound represented by the following formula (11), a compound represented by the following formula (12), and a compound represented by the following formula (13), wherein the (meth)acrylic copolymer has the constitutional unit (A1):

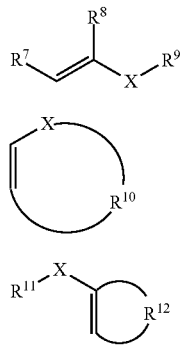

wherein

X represents —O—, —S—, or —NR$^{14}$—, R$^{14}$ represents a hydrogen atom or an alkyl group, R$^7$ represents a hydrogen atom or an alkyl group having from 1 to 9 carbon atoms, R$^8$ represents a hydrogen atom or an alkyl group having from 1 to 10 carbon atoms, R$^9$ and R$^{11}$ each represent an alkyl group having from 1 to 20 carbon atoms, a cycloalkyl group, or an aryl group, R$^{10}$ represents a single bond or an alkylene group having from 1 to 9 carbon atoms, and R$^{12}$ represents an alkylene group having from 1 to 9 carbon atoms.

4. An anti-fouling coating composition comprising the polymer-containing composition according to claim 1.

5. The anti-fouling coating composition according to claim 4, further comprising an anti-fouling agent.

6. The anti-fouling coating composition according to claim 5, wherein the anti-fouling agent contains at least one kind selected from the group consisting of cuprous oxide, 4-bromo-2-(4-chlorophenyl)-5-(trifluoromethyl)-1H-pyrrole-3-carbonitrile, pyridine-triphenylborane, and medetomidine.

7. The anti-fouling coating composition according to claim 4, wherein a VOC content is 500 g/L or less.

* * * * *